United States Patent
Shah

(10) Patent No.: US 11,792,143 B1
(45) Date of Patent: Oct. 17, 2023

(54) PRESENTING RELEVANT CHAT MESSAGES TO LISTENERS OF MEDIA PROGRAMS

(71) Applicant: Amazon Technologies, Inc., Seattle, WA (US)

(72) Inventor: Aamir Shah, Irvine, CA (US)

(73) Assignee: Amazon Technologies, Inc., Seattle, WA (US)

( * ) Notice: Subject to any disclaimer, the term of this patent is extended or adjusted under 35 U.S.C. 154(b) by 179 days.

(21) Appl. No.: 17/353,600

(22) Filed: Jun. 21, 2021

(51) Int. Cl.
| | |
|---|---|
| *H04L 51/046* | (2022.01) |
| *G06F 40/30* | (2020.01) |
| *G06F 16/33* | (2019.01) |
| *G06F 16/38* | (2019.01) |
| *H04L 65/60* | (2022.01) |
| *H04L 65/401* | (2022.01) |

(Continued)

(52) U.S. Cl.
CPC .......... *H04L 51/046* (2013.01); *G06F 16/337* (2019.01); *G06F 16/3334* (2019.01); *G06F 16/38* (2019.01); *G06F 40/30* (2020.01); *H04L 65/4015* (2013.01); *H04L 65/60* (2013.01); *H04L 65/611* (2022.05)

(58) Field of Classification Search
CPC ...... G06F 16/337; G06F 16/38; G06F 16/334; G06F 40/30; H04L 65/60; H04L 51/046
See application file for complete search history.

(56) References Cited

U.S. PATENT DOCUMENTS

| | | |
|---|---|---|
| 8,023,800 B2 | 9/2011 | Concotelli |
| 8,560,683 B2 | 10/2013 | Funk et al. |
| 8,572,243 B2 | 10/2013 | Funk et al. |

(Continued)

FOREIGN PATENT DOCUMENTS

| | | |
|---|---|---|
| AU | 2013204532 B2 | 11/2014 |
| CA | 2977959 A1 | 9/2016 |

(Continued)

OTHER PUBLICATIONS

Hoegen, Rens, et al. "An End-to-End Conversational Style Matching Agent." Proceedings of the 19th ACM International Conference on Intelligent Virtual Agents. 2019, pp. 1-8. (Year: 2019).

(Continued)

*Primary Examiner* — Kristie D Shingles
(74) *Attorney, Agent, or Firm* — Athorus, PLLC

(57) ABSTRACT

When a media program hosted by a creator is played, text-based chat sessions are conducted in parallel with the playing of the media program. As a media program is played via devices, listeners provide chat messages to a creator of the media program, or to other listeners, through widgets or other applications on user interfaces. Chat messages are filtered for objectionable content and ranked or scored for listeners, objectively or subjectively, and presented on the user interface, and listeners are able to interact with or provide feedback in response to each of such chat messages. When a previously recorded media program is played to a listener, chat messages or interactions with such chat messages recorded as the media program was previously played are also displayed to the listener at times, with respect to the media program, at which the chat messages or interactions were received.

20 Claims, 28 Drawing Sheets

(51) Int. Cl.
*G06F 16/335* (2019.01)
*H04L 65/611* (2022.01)

(56) References Cited

U.S. PATENT DOCUMENTS

| | | | |
|---|---|---|---|
| 8,768,782 B1 | 7/2014 | Myslinski | |
| 8,850,301 B1 | 9/2014 | Rose | |
| 9,003,032 B2 | 4/2015 | Funk et al. | |
| 9,369,740 B1 | 6/2016 | Funk et al. | |
| 9,613,636 B2 | 4/2017 | Gibbon et al. | |
| 9,706,253 B1 | 7/2017 | Funk et al. | |
| 9,729,596 B2 | 8/2017 | Sanghavi et al. | |
| 9,781,491 B2 | 10/2017 | Wilson | |
| 9,872,069 B1 | 1/2018 | Funk et al. | |
| 10,083,169 B1 | 9/2018 | Ghosh et al. | |
| 10,091,547 B2 | 10/2018 | Sheppard et al. | |
| 10,110,952 B1 | 10/2018 | Gupta et al. | |
| 10,135,887 B1 | 11/2018 | Esser et al. | |
| 10,140,364 B1 | 11/2018 | Diamondstein | |
| 10,178,422 B1 | 1/2019 | Panchaksharaiah et al. | |
| 10,178,442 B2 | 1/2019 | Shkedi | |
| 10,313,726 B2 | 6/2019 | Woods et al. | |
| 10,356,476 B2 | 7/2019 | Dharmaji | |
| 10,432,335 B2 | 10/2019 | Bretherton | |
| 10,489,395 B2 | 11/2019 | Lakkur et al. | |
| 10,685,050 B2 | 6/2020 | Krishna et al. | |
| 10,698,906 B2 | 6/2020 | Hargreaves et al. | |
| 10,719,837 B2 | 7/2020 | Kolowich et al. | |
| 10,769,678 B2 | 9/2020 | Li | |
| 10,846,330 B2 | 11/2020 | Shilo | |
| 10,985,853 B2 | 4/2021 | Bretherton | |
| 10,986,064 B2 | 4/2021 | Siegel et al. | |
| 10,997,240 B1 | 5/2021 | Aschner et al. | |
| 11,431,660 B1* | 8/2022 | Leeds | G10L 15/22 |
| 11,451,863 B1 | 9/2022 | Benjamin et al. | |
| 11,463,772 B1 | 10/2022 | Wanjari et al. | |
| 11,521,179 B1 | 12/2022 | Shetty | |
| 11,580,982 B1 | 2/2023 | Karnawat et al. | |
| 11,586,344 B1 | 2/2023 | Balagurunathan et al. | |
| 2002/0042920 A1 | 4/2002 | Thomas et al. | |
| 2002/0056087 A1 | 5/2002 | Berezowski et al. | |
| 2006/0268667 A1 | 11/2006 | Jellison et al. | |
| 2007/0124756 A1 | 5/2007 | Covell et al. | |
| 2007/0271518 A1 | 11/2007 | Tischer et al. | |
| 2007/0271580 A1 | 11/2007 | Tischer et al. | |
| 2008/0086742 A1 | 4/2008 | Aldrey et al. | |
| 2009/0044217 A1 | 2/2009 | Lutterbach et al. | |
| 2009/0076917 A1 | 3/2009 | Jablokov et al. | |
| 2009/0100098 A1 | 4/2009 | Feher et al. | |
| 2009/0254934 A1 | 10/2009 | Grammens | |
| 2010/0088187 A1 | 4/2010 | Courtney et al. | |
| 2010/0280641 A1 | 11/2010 | Harkness et al. | |
| 2011/0063406 A1 | 3/2011 | Albert et al. | |
| 2011/0067044 A1 | 3/2011 | Albo | |
| 2012/0040604 A1 | 2/2012 | Amidon et al. | |
| 2012/0191774 A1 | 7/2012 | Bhaskaran et al. | |
| 2012/0304206 A1 | 11/2012 | Roberts et al. | |
| 2012/0311618 A1 | 12/2012 | Blaxland | |
| 2012/0331168 A1 | 12/2012 | Chen | |
| 2013/0074109 A1 | 3/2013 | Skelton et al. | |
| 2013/0247081 A1 | 9/2013 | Vinson et al. | |
| 2013/0253934 A1 | 9/2013 | Parekh et al. | |
| 2014/0019225 A1 | 1/2014 | Guminy et al. | |
| 2014/0040494 A1 | 2/2014 | Deinhard et al. | |
| 2014/0068432 A1 | 3/2014 | Kucharz et al. | |
| 2014/0073236 A1 | 3/2014 | Iyer | |
| 2014/0108531 A1 | 4/2014 | Klau | |
| 2014/0123191 A1 | 5/2014 | Hahn et al. | |
| 2014/0228010 A1 | 8/2014 | Barbulescu et al. | |
| 2014/0325557 A1 | 10/2014 | Evans et al. | |
| 2014/0372179 A1 | 12/2014 | Ju et al. | |
| 2015/0163184 A1 | 6/2015 | Kanter et al. | |
| 2015/0242068 A1 | 8/2015 | Losey et al. | |
| 2015/0248798 A1 | 9/2015 | Howe et al. | |
| 2015/0289021 A1 | 10/2015 | Miles | |
| 2015/0319472 A1 | 11/2015 | Kotecha et al. | |
| 2015/0326922 A1 | 11/2015 | Givon et al. | |
| 2016/0093289 A1 | 3/2016 | Pollet | |
| 2016/0188728 A1 | 6/2016 | Gill et al. | |
| 2016/0217488 A1* | 7/2016 | Ward | G06Q 30/0256 |
| 2016/0266781 A1 | 9/2016 | Dandu et al. | |
| 2016/0293036 A1 | 10/2016 | Niemi et al. | |
| 2016/0330529 A1 | 11/2016 | Byers | |
| 2017/0127136 A1 | 5/2017 | Roberts et al. | |
| 2017/0164357 A1 | 6/2017 | Fan et al. | |
| 2017/0213248 A1 | 7/2017 | Jing et al. | |
| 2017/0289617 A1 | 10/2017 | Song et al. | |
| 2017/0329466 A1* | 11/2017 | Krenkler | G06F 9/453 |
| 2017/0366854 A1 | 12/2017 | Puntambekar et al. | |
| 2018/0025078 A1 | 1/2018 | Quennesson | |
| 2018/0035142 A1 | 2/2018 | Rao et al. | |
| 2018/0205797 A1 | 7/2018 | Faulkner | |
| 2018/0227632 A1 | 8/2018 | Rubin et al. | |
| 2018/0255114 A1 | 9/2018 | Dharmaji | |
| 2018/0293221 A1 | 10/2018 | Finkelstein et al. | |
| 2018/0322411 A1 | 11/2018 | Wang et al. | |
| 2018/0367229 A1 | 12/2018 | Gibson et al. | |
| 2019/0065610 A1 | 2/2019 | Singh | |
| 2019/0132636 A1 | 5/2019 | Gupta et al. | |
| 2019/0156196 A1 | 5/2019 | Zoldi et al. | |
| 2019/0171762 A1 | 6/2019 | Luke et al. | |
| 2019/0273570 A1 | 9/2019 | Bretherton | |
| 2019/0327103 A1 | 10/2019 | Niekrasz | |
| 2019/0385600 A1 | 12/2019 | Kim | |
| 2020/0021888 A1 | 1/2020 | Brandao et al. | |
| 2020/0160458 A1* | 5/2020 | Bodin | G06F 8/33 |
| 2020/0226418 A1 | 7/2020 | Dorai-Raj et al. | |
| 2020/0279553 A1 | 9/2020 | McDuff et al. | |
| 2021/0104245 A1 | 4/2021 | Alas et al. | |
| 2021/0105149 A1 | 4/2021 | Roedel et al. | |
| 2021/0125054 A1 | 4/2021 | Banik et al. | |
| 2021/0160588 A1 | 5/2021 | Joseph et al. | |
| 2021/0210102 A1 | 7/2021 | Huh et al. | |
| 2021/0217413 A1 | 7/2021 | Tushinskiy et al. | |
| 2021/0232577 A1 | 7/2021 | Ogawa et al. | |
| 2021/0256086 A1 | 8/2021 | Askarian et al. | |
| 2021/0281925 A1 | 9/2021 | Shaikh et al. | |
| 2021/0366462 A1 | 11/2021 | Yang et al. | |
| 2022/0038783 A1 | 2/2022 | Wee | |
| 2022/0038790 A1 | 2/2022 | Duan et al. | |
| 2022/0159377 A1 | 5/2022 | Wilberding et al. | |
| 2022/0223286 A1 | 7/2022 | Lach et al. | |
| 2022/0230632 A1 | 7/2022 | Maitra et al. | |
| 2022/0254348 A1 | 8/2022 | Tay et al. | |
| 2022/0369034 A1 | 11/2022 | Kumar et al. | |
| 2023/0217195 A1 | 7/2023 | Poltorak | |

FOREIGN PATENT DOCUMENTS

| | | |
|---|---|---|
| CN | 104813305 A | 7/2015 |
| KR | 20170079496 A | 7/2017 |
| WO | 2019089028 A1 | 5/2019 |

OTHER PUBLICATIONS

Github, "Spotify iOS SDK," GitHub.com, GitHub Inc. and GitHub B.V., Feb. 17, 2021, available at URL: https://github.com/spotify/ios-sdk#how-do-app-remote-calls-work, 10 pages.

Stack Overflow, "Audio mixing of Spotify tracks in IOS app," stackoverflow.com, Stack Overflow Network, Jul. 2012, available at URL: https://stackoverflow.com/questions/11396348/audio-mixing-of-spotify-tracks-in-ios-app, 2 pages.

Arora, S. et al., "A Practical Algorithm for Topic Modeling with Provable Guarantees," Proceedings in the 30th International Conference on Machine Learning, JMLR: W&CP vol. 28, published 2013 (Year: 2013), 9 pages.

Tengeh, R. K., & Udoakpan, N. (2021). Over-the-Top Television Services and Changes in Consumer Viewing Patterns in South Africa. Management Dynamics in the Knowledge Economy. 9(2), 257-277. DOI 10.2478/mdke-2021-0018 ISSN: 2392-8042 (online)

(56) References Cited

OTHER PUBLICATIONS www.managementdynamics.ro; URL: https://content.sciendo.com/view/journals/mdke/mdke-overview.xml.

* cited by examiner

CHAT MESSAGES RANKED ACCORDING TO RULES

SUMMARY OF CHAT MESSAGES DISPLAYED TO CREATOR

INTERACTIONS WITH CHAT MESSAGES RECEIVED FROM LISTENERS AND CREATOR

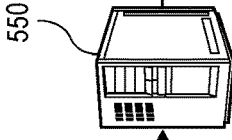

| Author | Time | + | − | Interaction with Chat |
|---|---|---|---|---|
| Tracey | 3:39 | | x | New Haven! Yes! |
| Carla | 3:40 | x | | New Haven? Heck no. Hartford |
| Brendan | 3:41 | x | | New Haven? Heck no. Hartford |
| Kelly | 3:42 | x | | I agree Tracey! Hartford is the best! |
| Brendan | 3:43 | x | | I agree Tracey! Hartford is the best! |
| Tracey | 3:43 | x | | I agree Tracey! Hartford is the best! |
| Carla | 3:43 | | x | New Haven apizza is the best |
| Justin | 3:44 | x | | I agree Tracey! Hartford is the best! |
| Justin | 3:45 | x | | I agree Tracey! Hartford is the best! |
| Johanna | 3:45 | | x | New York is gross |
| David | 3:48 | x | | I agree Tracey! Hartford is the best! |
| Mario | 3:50 | | x | New Haven it is! #clam |

| Rank | Author | Time | Chat |
|---|---|---|---|
| 1 | Carla | 3:41 | I agree Tracey! Hartford is the best! |
| 2 | Tracey | 3:36 | New Haven? Heck no. Hartford |
| 3 | Johanna | 3:36 | NYC is to New Haven as Jersey is to NYC |
| 4 | Brendan | 3:31 | Colorado style #handrolled #honey |
| 5 | James | 3:33 | New Haven apizza is the best |
| 6 | Rashad | 3:45 | New York. Game set match |
| 7 | Mario | 3:37 | Boston baby Boston |
| 8 | Jen | 3:30 | New Haven it is! #clam |
| 9 | Kelly | 3:37 | Detroit sheet pan pie, love it |
| 10 | Greg | 3:41 | St. Louis?! Like ketchup on bread #NYC |
| 11 | Peter | 3:34 | New York is gross |
| 12 | Bill | 3:44 | California pizza is underrated |
| 13 | David | 3:35 | New Haven! Yes! |
| 14 | Teresa | 3:31 | St. Louis #thincrust #oregano #provel |
| 15 | Mark | 3:40 | Chicago #deepdish #noother |
| 16 | Justin | 3:31 | Virginia is for pizza lovers |

CHAT MESSAGES RE-RANKED BASED ON INTERACTIONS

FIG. 5G

PRESENTING RELEVANT CHAT MESSAGES TO LISTENERS OF MEDIA PROGRAMS

BACKGROUND

Today, many media programs are broadcast to viewers or listeners over the air, e.g., on radio or television, or streamed or otherwise transmitted to the viewers or listeners over one or more computer networks, which may include the Internet in whole or in part. When a media program is popular among multiple viewers or listeners, fan groups or other collections of such viewers or listeners may form, on an informal or formal basis. In some such groups, fans may share information, commentary or opinions on recent episodes, or predictions of plots or other features of episodes that are to be aired, streamed or transmitted in the future.

Recently, as messaging and communications platforms have evolved over time, listeners or viewers of media programs are able to communicate with one another, directly or indirectly, over such platforms in real time or in near-real time, e.g., as such media programs are being aired, streamed or otherwise transmitted. For example, a social media platform may dedicate one or more pages or accounts to a media program, or to viewers or listeners of the media program, who may elect to share their comments on the media program or a specific episode via the pages or accounts in an open or public setting, as one or more episodes of a media program are being aired, streamed or transmitted, or at any other time. For example, a fan may mark a post, a comment, or another statement via social media with a hashtag or other insignia or indicator that the post, the comment or the statement is affiliated with a media program, or one or more characters, elements or features of the media program. Subsequently, other fans who are associated with that fan may read or review the post, the comment or the statement directly, while still other fans who are not associated with that fan may access the post, the comment or the statement via the hashtag or the other insignia or indicator.

Alternatively, viewers or listeners of a media program may communicate in a more private manner or setting, via messages such as short or multimedia messaging service (SMS or MMS) text messages, social media messages, electronic mail (or "E-mail"), or other modes. For example, as one or more episodes of a media program are being aired, streamed or transmitted, or prior to or after such episodes have been aired, streamed or transmitted, fans may text or otherwise message each other to share their comments on the media program or a specific episode in a closed or private setting.

Existing techniques for enabling viewers or listeners of a media program to communicate with one another suffer from a number of limitations. First, because any number of social media platforms or messaging platforms may include any number of fans of a media program, multiple fan groups may be formed on a given platform, or on multiple platforms, and fans in the different groups may not readily communicate with one another. Second, because such techniques are not typically affiliated with a media program, a creator of the media program, or a broadcast system that airs, streams or transmits the media program, any number of such groups may be formed, and the creator, the broadcast system or any other entity associated with the media program must engage with such platforms in order to accurately determine or receive information, commentary or opinions of fans regarding the media program. Moreover, when feedback from fans of a media program is shared during a "live" (or initial) airing, streaming or transmission of the media program, e.g., in real time or near-real time, the collaborative experience marked by the collective sharing of feedback is typically lost to viewers or listeners who receive and play the media program "on demand," or at a later time of their choosing.

BRIEF DESCRIPTION OF THE DRAWINGS

FIGS. 5A through 5H are views of aspects of one system for presenting chat messages to listeners in accordance with embodiments of the present disclosure.

DETAILED DESCRIPTION

Figure 1A:
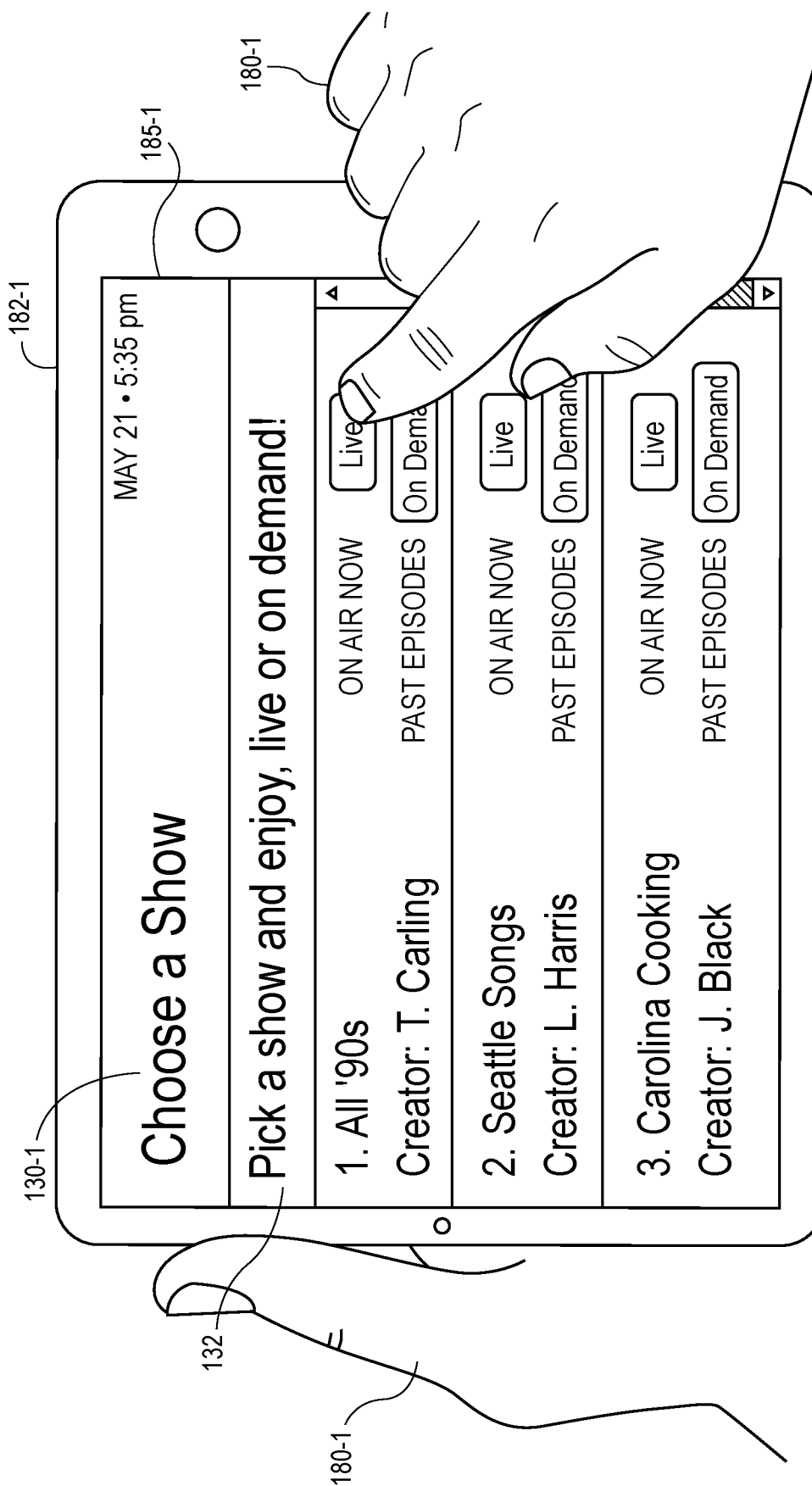
FIGS. 1A through 1F are views of aspects of one system for presenting chat messages to listeners in accordance with embodiments of the present disclosure.

As is set forth in greater detail below, the present disclosure is directed to systems and methods for presenting chat messages (or text-based messages) to listeners to (or subscribers of) media programs that are aired, broadcast, streamed or otherwise transmitted to systems or devices over computer networks, such as the Internet. More specifically, the systems and methods of the present disclosure are directed to enabling listeners to media programs, or creators of the media programs, to provide information, commentary, opinions or other feedback in the form of chat messages via one or more user interfaces provided by computer devices or systems, or interactions with such user interfaces, devices or systems, that the creators may operate to generate, transmit or control the media programs, or that listeners may operate to receive and view or listen to the media programs.

Chat messages received from a creator or one or more listeners may be filtered for objectionable content and ranked or scored according to one or more rules. One or more highly ranking or particularly relevant chat messages may be selected for each of the listeners, e.g., based on one or more attributes of the listeners, and data for presenting the chat messages may be transmitted to devices of the listeners for display in user interfaces rendered thereon. The user interfaces may be configured to enable such listeners to interact with chat messages provided by others, e.g., the creator or other listeners, by executing gestures or other interactions with the user interface. A set of chat messages may be re-ranked or re-scored as other chat messages are received from the creator or listeners, or in response to interactions with such chat messages that are received from the creator or listeners. Furthermore, times at which chat messages or interactions are received may be recorded with respect to a media program, e.g., as durations following a beginning or start of the media program, when the media program is initially aired, streamed or transmitted to listeners. When other listeners request the media program at a later time, e.g., to play the media program in a pre-recorded format "on demand," the chat messages or interactions may be presented to such listeners at times with respect to the media program at which such chat messages or interactions were received, thereby enabling such listeners to simulate a live viewing or listening experience with other listeners despite viewing or listening to the media program after the media program was already recorded. Moreover, in some implementations, chat messages received from a listener, or interactions with chat messages provided by the listener, may be processed and interpreted to identify additional information regarding the listener, and such information or data may be utilized for any purpose. For example, such as to identify recommendations of one or more items (e.g., goods, services, products, media, or other items of any type or form) for the listener, or to more accurately score chat messages displayed to the listener in the future.

Referring to FIGS. 1A through 1F, views of aspects of one system for presenting chat messages to listeners in accordance with embodiments of the present disclosure are shown. As is shown in FIG. 1A, a listener 180-1 operates a mobile device 182-1 (e.g., a tablet computer or smartphone, or any other computer device or system) to select one of a plurality of media programs. For example, as is shown in FIG. 1A, the mobile device 182-1 includes a display 185-1 having a user interface 130-1 rendered thereon. The user interface 130-1 includes a section 132 having a plurality of elements, each of which may be associated with a media program available to listeners, e.g., the listener 180-1 via the mobile device 182-1. For example, each of the elements corresponding to media programs in the section 132 may include one or more selectable elements or features that, when selected, permit the listener 180-1 to select one of the media programs, e.g., in an initial broadcast or streaming (or "live"), or in a pre-recorded format (or "on demand"). Each of the elements may identify one or more attributes of a media program, including a name or title of the media program, a creator associated with the media program, or any other descriptors or characteristics of the media program. Alternatively, each of the elements may include any other information regarding a media program or a creator. Each of the elements may further include one or more selectable features for adding a reminder to a calendar application or program, or otherwise scheduling or initiating a playing of the media program by the mobile device 182-1.

Figure 1B:
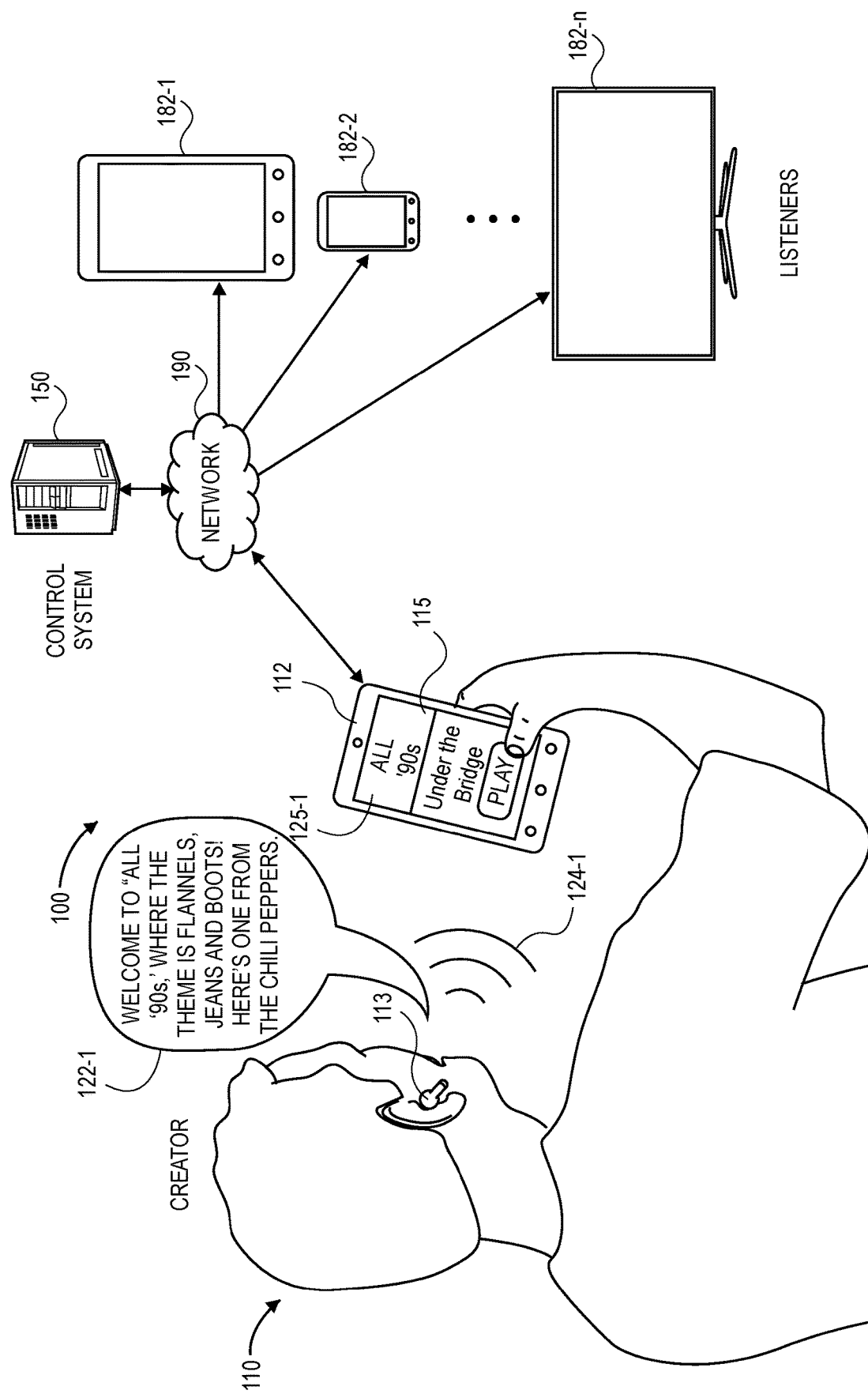

As is shown in FIG. 1B, a system 100 includes a mobile device 112 (e.g., a smartphone, a tablet computer, a laptop computer, or any other computer device or system) of a creator 110 (e.g., a user, or a host), a control system 150 (e.g., one or more servers or other computer systems) and a plurality of computer devices 182-1, 182-2 . . . 182-n or other systems associated with any number n of listeners (or subscribers), including the mobile device 182-1. The mobile device 112, the control system 150 and the computer devices 182-1, 182-2 . . . 182-n are connected to one another over one or more networks 190, which may include the Internet in whole or in part. The creator 110 wears one or more ear buds 113 (or earphones, or headphones) or other communication systems or devices which may be in communication with the mobile device 112, and may exchange (e.g., transfer or receive) data relating to audio signals or any other data with the mobile device 112. The computer device 182-2 is a smartphone or like system. The computer device 182-n is a television or like system. However, the computer systems or devices that may be operated or utilized by the creator 110 or listeners in accordance with the present disclosure are not limited to any of the devices or systems shown in FIG. 1B.

As is shown in FIG. 1B, the mobile device 112 includes a display 115 (e.g., a touchscreen) having a user interface 125-1 rendered thereon. The user interface 125-1 may include one or more interactive or selectable features that enable the creator 110 to construct a media program from one or more sets of media content, or to control the transmission or receipt of media content in accordance with the media program, e.g., by the control system 150 or from any other source, to or from the computer devices 182-1, 182-2 . . . 182-n over the networks 190. In some implementations, the control system 150 may establish a two-way or bidirectional channel or connection with the mobile device 112, and one-way or unidirectional channels or connections with the devices 182-1, 182-2 . . . 182-n. Alternatively, in some other implementations, the control system 150 may establish two-way or bidirectional channels with the mobile device 112, and any number of the devices 182-1, 182-2 . . . 182-n.

In some implementations, the display 115 may be a capacitive touchscreen, a resistive touchscreen, or any other system for receiving interactions by the creator 110. Alternatively, or additionally, the creator 110 may interact with the user interface 125-1 or the mobile device 112 in any other manner, such as by way of any input/output ("I/O") devices, including but not limited to a mouse, a stylus, a touchscreen, a keyboard, a trackball, or a trackpad, as well as any voice-controlled devices or software (e.g., a personal assistant), which may capture and interpret voice commands using one or more microphones or acoustic sensors provided on the mobile device 112, the ear buds 113, or any other systems (not shown). In accordance with implementations of the present disclosure, the user interface 125-1, or other user interfaces, may include any number of buttons, text boxes, checkboxes, drop-down menus, list boxes, toggles, pickers, search fields, tags, sliders, icons, carousels, or any other interactive or selectable elements or features that are configured to display information to the creator 110 or to receive interactions from the creator 110 via the display 115.

As is further shown in FIG. 1B, the creator 110 provides an utterance 122-1 of one or more words that are intended to be heard by one or more listeners using the computer devices 182-1, 182-2 . . . 182-n. In particular, the creator 110 identifies a theme of the media program and a title or selection of an author or artist of media content to be played during the media program, viz., "Welcome to 'All '90s,' where the theme is Flannels, Jeans & Boots! Here's one from the Chili Peppers," in accordance with a broadcast plan for the media program or spontaneously. The mobile device 112 and/or the ear buds 113 may capture acoustic data 124-1 representing the utterance 122-1 of the creator 110, and transmit the data 124-1 to the control system 150 over the one or more networks 190. The control system 150 may then cause data, e.g., some or all of the data 124-1 to be transmitted to one or more computer systems or devices of listeners over one or more networks 190, in order to present the utterance 122-1 of the creator 110 to such listeners.

In some implementations, the user interfaces of the present disclosure (viz., the user interface 125-1, or others) may include one or more features enabling the creator 110 to exercise control over the media content being played by the devices 182-1, 182-2 . . . 182-n of the listeners. For example, such features may enable the creator 110 to manipulate a volume or another attribute or parameter (e.g., treble, bass, or others) of audio signals represented in data transmitted to the respective devices 182-1, 182-2 . . . 182-*n* of the listeners by one or more gestures or other interactions with user interfaces rendered on the mobile device 112. In response to instructions received from the mobile device 112 by such gestures or interactions, the control system 150 may modify the data transmitted to the respective devices 182-1, 182-2 . . . 182-*n* of the listeners accordingly. Likewise, in some implementations, similar features may also enable a listener to manipulate a volume or another attribute or parameter (e.g., treble, bass, or others) of audio signals presented by the respective devices 182-1, 182-2 . . . 182-*n*, such as by one or more gestures or other interactions with a user interface rendered on the respective devices 182-1, 182-2 . . . 182-*n*. Any of the user interfaces described herein may include one or more elements or features for playing, pausing, stopping, rewinding or fast-forwarding media content transmitted to a device from any source, or played by the device, in response to gestures or other interactions with such elements or features, as well as one or more visual cues such as "on the air!" or other identifiers of media content that is currently being played, and from which source. The user interfaces may further include one or more clocks, timers or other representations of durations for which media content has been played, times remaining until the playing of media content is expected to end or be terminated, or times at which other media content is to be played.

Figure 1C:
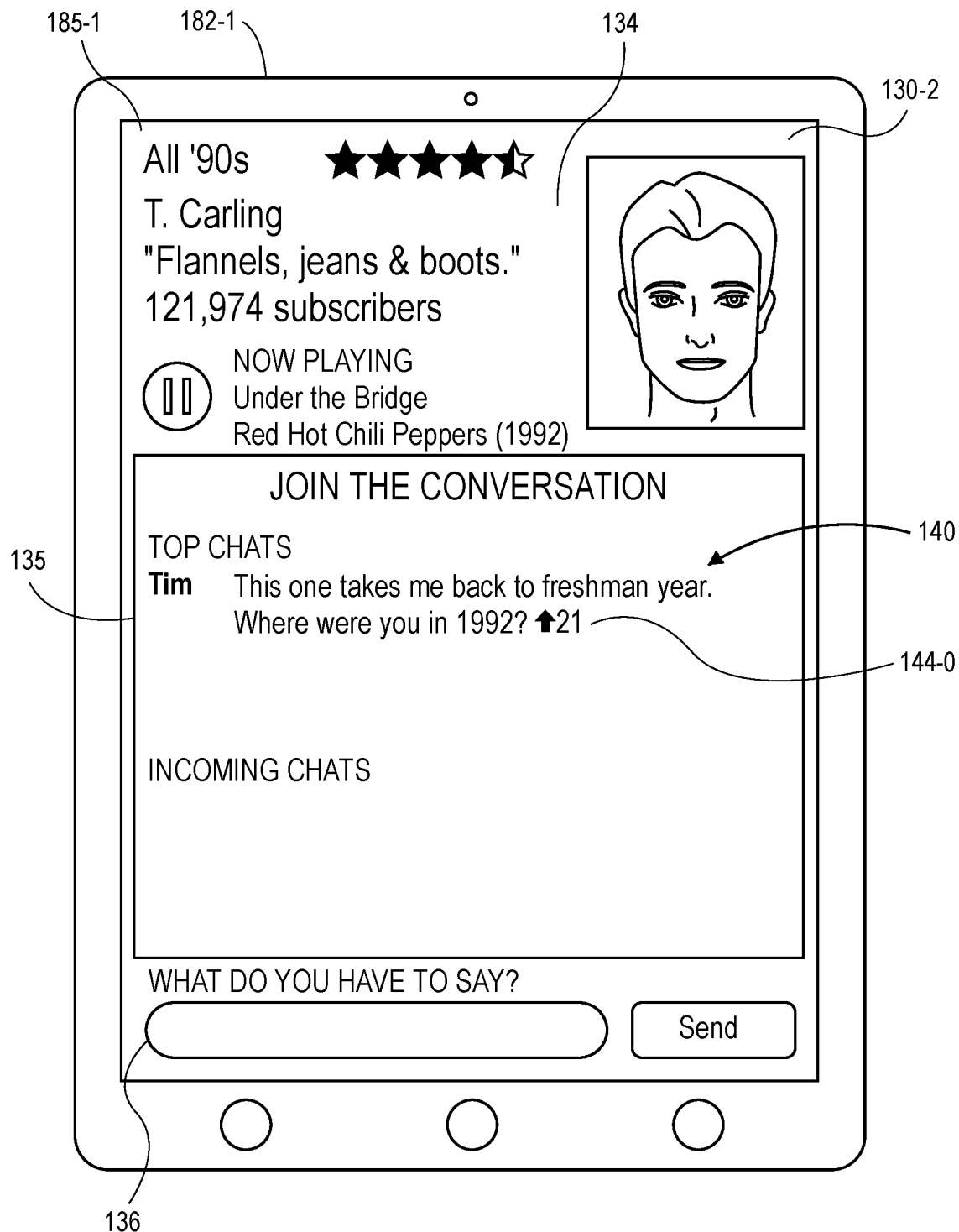

As is shown in FIG. 1C, during the playing of the media program by the control system 150 shown in FIG. 1B, the mobile device 182-1 displays a user interface 130-2 including a plurality of sections 134, 135, 136 rendered thereon. The section 134 of the user interface 130-2 is provided at an upper edge or area of the display 185-1, and includes one or more identifiers or information regarding the media program, including but not limited to a title of the media program, a rating of the media program (e.g., a qualitative or quantitative rating that may visually express a quality of the media program as rated by listeners in numbers, stars or other visual features), and a name of the creator 110 of the media program. The section 134 further includes the motto of the media program, as well as a number of subscribers to the media program (e.g., listeners or potential listeners who have registered to receive or otherwise requested one or more episodes of the media program), a title or other description of any media content being played in accordance with the media program, viz., the 1992 song Under the Bridge, by the Red Hot Chili Peppers, and one or more elements or features for playing, pausing, stopping, rewinding or fast-forwarding media content.

The section 135 is provided in a substantially central area of the display 185-1, and includes portions for displaying highly ranked or relevant chat messages (viz., "Top Chats") received from the creator 110 or any listeners, as well as any number of other chat messages (viz., "Incoming Chats") received from the creator 110 or other listeners. For example, as is shown in FIG. 1C, the section 135 includes a chat message 140 received from the creator 110, viz., "Tim," that references the title of the media content currently being played in accordance with the media program, and states, "This one takes me back to freshman year. Where were you in 1992?"

The section 135 further includes an interactive feature 144-0 identifying a number of interactions, viz., twenty-one, with the chat message 140 by the creator 110 or any listeners. The interactive feature 144-0 may be a selectable element that, when rendered on a display of a device of a listener or the creator 110, not only provides a visual indication of the number of interactions with the chat message 140 but also enables the listener or the creator 110 to record an interaction with the chat message 140, or to cancel (or otherwise withdraw or remove) an interaction with the chat message 140. For example, in some implementations, the interactive feature 144-0 may be toggled by alternating contact with the user interface 130-2, e.g., by a selection or a deselection of the interactive feature 144-0, to record or cancel an interaction with the chat message 140. Although the interactive feature 144-0 is shown as including an icon or symbol visually suggestive of a positive interaction, viz., an upwardly pointing arrow, those of ordinary skill in the pertinent arts will recognize interactive features may include any type or form of icons or symbols for visually suggesting an interaction in general, or a specific type of interaction in particular, such as emoji, arrows pointing in various directions, hearts, thumbs, stars, or others, and an emotion or a sentiment associated with an interaction may be inferred based on the icon or symbol associated with an interactive feature selected by a listener or a creator in order to record the interaction. Moreover, in some implementations, a user interface may include multiple interactive features, each of which may be independently selected in order to express a different emotion or sentiment by an interaction.

The section 136 is provided at a lower edge or area of the display 185-1, and includes a text box or a like feature that enables the listener 180-1 or any other user of the mobile device 182-1 to provide a chat message to the creator 110 or other listeners, e.g., by executing one or more gestures or other interactions with a physical keyboard in communication with the device 182-1 (not shown), a virtual keyboard rendered on the display 185-1 (not shown), or any other input/output device, as well as a button or another selectable feature for transmitting the chat message provided within the text box to the creator 110 or the control system 150. Alternatively, the listener 180-1 may provide a chat message or other information to the mobile device 182-1 for transmission to the creator 110 or the control system 150 in any other manner, e.g., by one or more voice commands or utterances, or by gestures or interactions with a drop-down menu.

The user interface 130-2 may be rendered by the mobile device 182-1 in any manner. For example, code for rendering the user interface 130-2 may be retrieved from one or more memory components provided on the mobile device 182-1, or transmitted to the mobile device 182-1 by the control system 150 or from any other source, and the mobile device 182-1 may execute the code to render the user interface 130-2 and any of the sections 134, 135, 136 within the user interface 130-2 or on the display 185-1 accordingly. The code may be programmed in HTML, or any other language, e.g., Java or JavaScript, and may be executed by a widget, an application programming interface (or "API"), or any other application or feature of the mobile device 182-1.

Figure 1D:
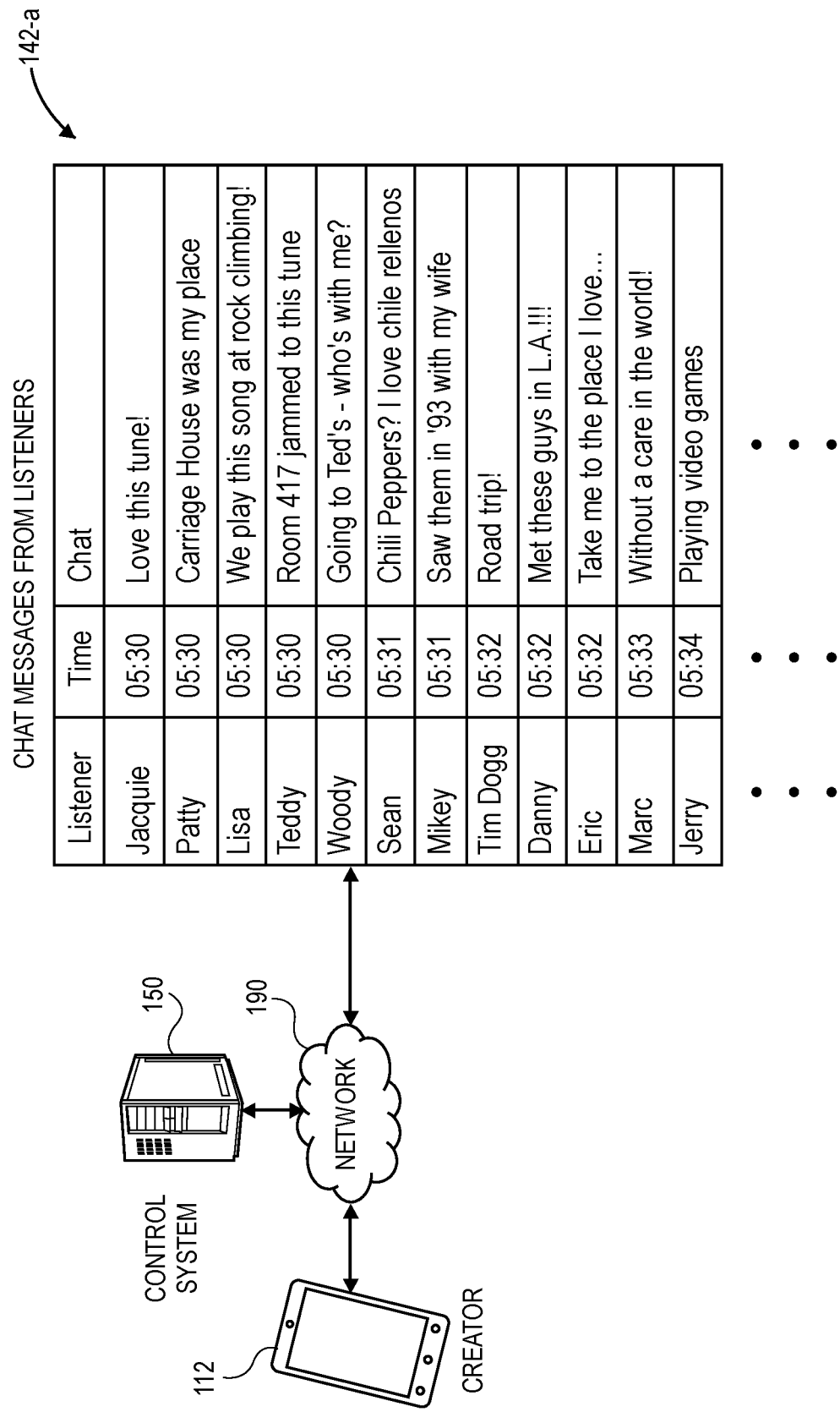

As is shown in FIG. 1D, during the playing of the media program, any number of chat messages 142-*a* may be received from the mobile device 112 of the creator 110 or any of the devices 182-1, 182-2 . . . 182-*n* of listeners. Each of the chat messages 142-*a* may include up to a finite, limited number of characters, or include any number of characters, and may be transmitted via a communications channel established between a respective one of the devices 182-1, 182-2 . . . 182-*n* and the control system 150 or any other device or system over the network 190. Each of the chat messages 142-*a* may be stored by the control system 150 or any other device or system over the network 190, along with any other information, data or metadata, such as identifiers of listeners that provided the chat messages 142-*a* and dates or times on which the chat messages 142-*a* were provided.

Figure 1E:
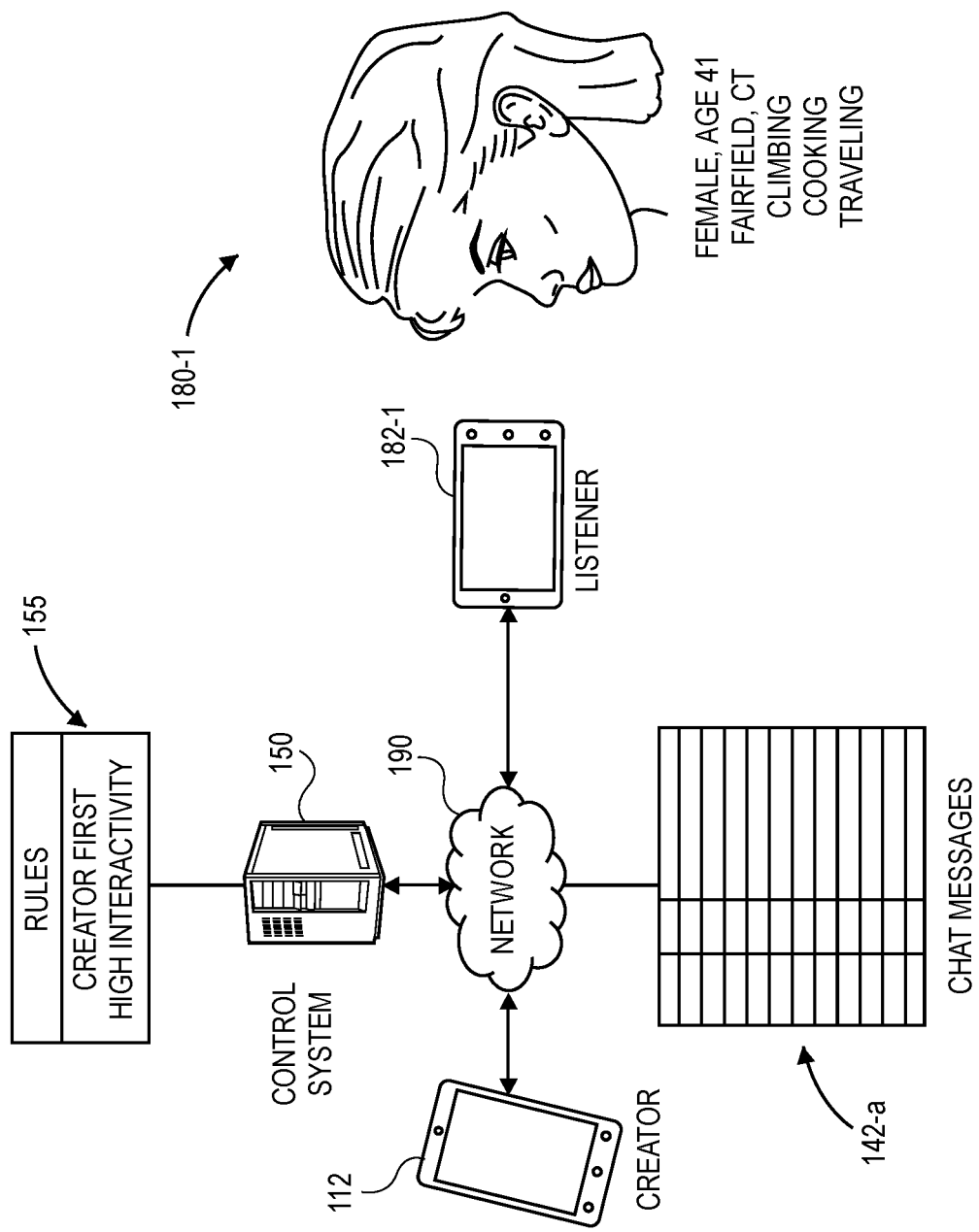

As is shown in FIG. 1E, the chat messages 142-*a* may be ranked or scored according to a set of rules 155 maintained by or in association with the control system 150 or the creator 110. Such rules may, for example, apply one or more qualitative rankings or scores to each of the chat messages 142-*a*, or otherwise preferentially rank (or score) the set of chat messages with respect to one another. In some implementations, the preferential ranking may be objective in nature, e.g., a ranking or scoring for each of the chat messages of the set and with respect to all listeners. In some other implementations, however, the preferential ranking may be subjective in nature, e.g., a discrete ranking or scoring of each of the chat messages of the set with respect to a specific listener, based on one or more attributes of that listener.

Rankings or scorings of the chat messages 142-*a* may be assigned to a chat message in any manner, and on any basis, or on any number of objective or subjective factors. In some implementations, the chat messages 142-*a* may be ranked or scored based on numbers of interactions with the chat messages 142-*a* that are received from the listeners or the creator 110. For example, the chat messages 142-*a* may be ranked based on numbers of interactions received in the aggregate, or numbers of interactions received in one or more discrete periods of time. Alternatively, or additionally, the chat messages 142-*a* may be ranked based on numbers of interactions conveying a specific emotion or sentiment, or class of emotions or sentiments.

The chat messages 142-*a* may also be ranked or scored based on the emotions or sentiments expressed therein, with chat messages conveying one emotion or sentiment (e.g., "happy" or "sad"), or one type of emotion or sentiment (e.g., "positive," "negative" or "neutral"), ranked above other emotions or sentiments, or types of emotions or sentiments. For example, in some implementations, where an emotion or a sentiment of a listener may be determined based on a chat message provided by that listener, or an interaction by that listener with a chat message, the chat messages 142-*a* that match or are otherwise consistent with the emotion or the sentiment of the listener may be ranked more highly or above the chat messages 142-*a* that do not match or are otherwise inconsistent with the emotion or the sentiment of the listener.

The chat messages 142-*a* may be ranked or scored based on an artist, a genre, a mood, a playlist or a title of media that was being played at a time at which the chat messages 142-*a* were received. The chat messages 142-*a* may also be ranked or scored based on an identity of a listener or the creator 110 that authored each of the chat messages 142-*a*, as well as a status of the identity of the listener or the creator 110 with respect to the listener 180-1, including but not limited to whether the listener 180-1 is a follower of any of the listener or the creator 110 that authored the chat messages 142-*a*, or whether the listener 180-1 has previously purchased, listened to or requested media content by the listener or the creator 110 that authored the chat messages 142-*a*. The chat messages 142-*a* may be further ranked or scored on their recency, e.g., a time at which each of the chat messages 142-*a* was received, as well as whether the chat messages 142-*a* were received during an initial playing of the media program (e.g., "live") or a subsequent, pre-recorded playing of the media program (e.g., "on demand").

Alternatively, the chat messages 142-*a* may also be ranked or scored based on their particular relevance or appropriateness for the listener 180-1 who, as is shown in FIG. 1E, is a female of age 41, who lives in Fairfield, Conn., and enjoys climbing, cooking and traveling. For example, chat messages that reference a topic of interest to the listener may be ranked or scored more highly than chat messages that do not reference any topics of interest to the listener, while chat messages that reference items purchased by a listener or locations visited by the listener may be ranked or scored more highly than chat messages that reference items or locations other than those that were purchased or visited, respectively, by the listener. A level or measure of appropriateness or relevance of a specific chat message to a specific listener may be calculated or otherwise determined on any basis, for any number of chat messages and for any number of listeners.

Figure 1F:
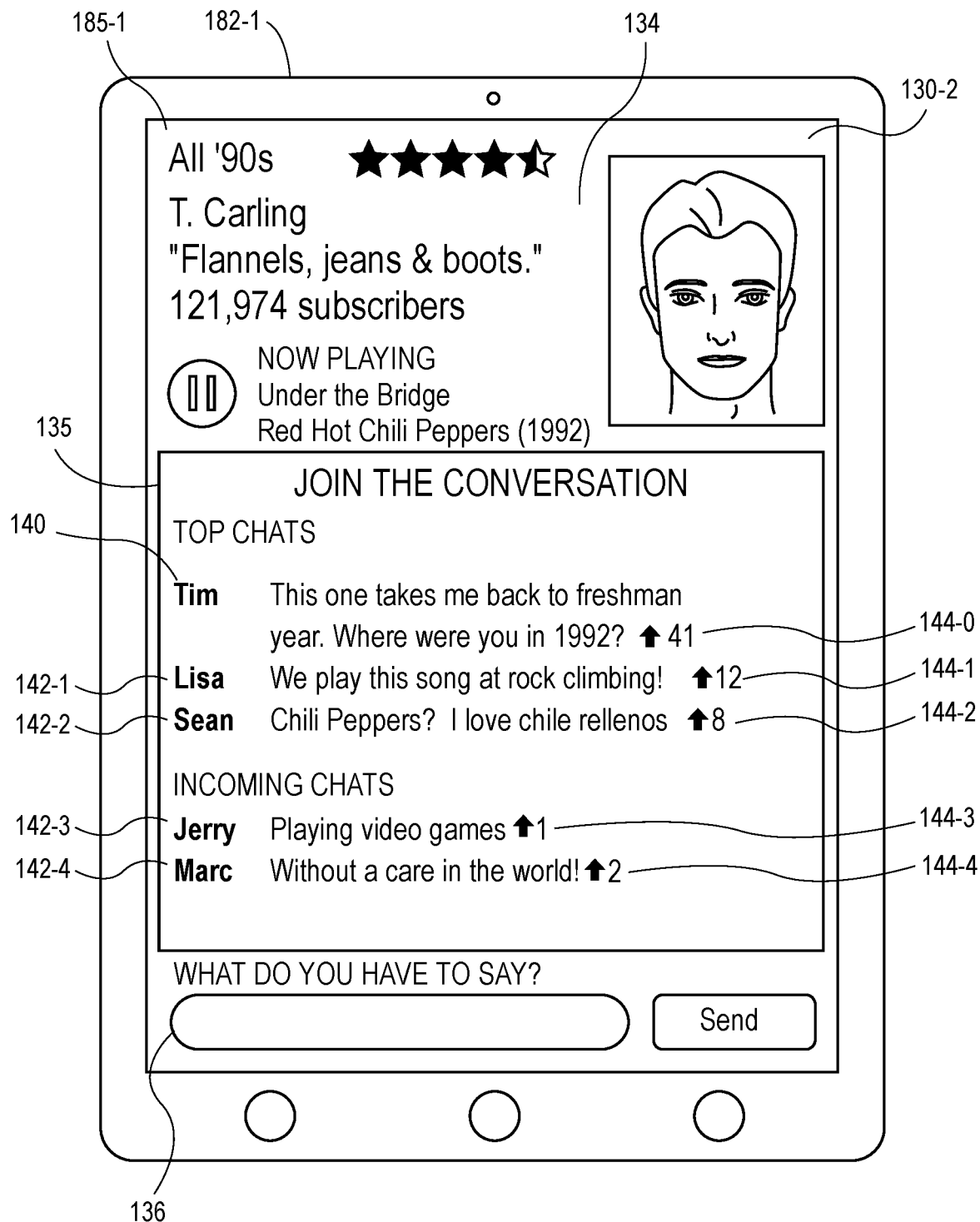

After the chat messages 142-*a* have been ranked or scored, any number of the chat messages 142-*a* may be selected and transmitted to a device of a given listener. For example, as is shown in FIG. 1F, a pair of highly ranked chat messages 142-1, 142-2 are displayed in the section 135 of the user interface 130-2 beneath the chat message 140 and the interactive feature 144-0, which indicates that forty-one interactions with the chat message 140 have been received from listeners. The chat message 142-1 that immediately follows the chat message 140 received from the creator 110 in the "Top Chats" portion of section 135 was authored by a listener named "Lisa," and states, "We play this song at rock climbing!" The chat message 142-1 is accompanied by an interactive feature 144-1, which indicates that twelve interactions with the chat message 142-1 have been received from listeners. The chat message 142-2 that immediately follows the chat message 142-1 in the "Top Chats" portion of section 135 was authored by a listener named "Sean," and states, "Chili Peppers? I love chile rellenos." The chat message 142-2 is accompanied by an interactive feature 144-2, which indicates that eight interactions with the chat message 142-2 have been received from listeners.

The chat messages 142-1, 142-2 may have been identified as appropriate for the listener 180-1 on any basis. For example, the chat messages 142-1, 142-2 may have been ranked or scored on their respective content, or any emotions or sentiments expressed therein, as well as the respective numbers of interactions (viz., twelve and eight) with the chat messages 142-1, 142-2 that have been received from listeners or the creator 110. The chat messages 142-1, 142-2 may have also been ranked or scored based on their appropriateness for the listener 180-1. For example, the chat message 142-1 may be identified as appropriate for the listener 180-1 and transmitted to the mobile device 182-1 based on the fact that the author of the chat message 142-1 is also a female, or the fact that the chat message 142-1 refers to "rock climbing," which is similar to an interest of the listener 180-1 in climbing. The chat message 142-2 may also be identified as appropriate for the listener 180-1 based on the fact that the chat message 142-2 references a food product having a name similar to that of the group that played the media content then being transmitted in accordance with the media program, e.g., Red Hot Chili Peppers and chile rellenos, or the fact that the chat message 142-2 refers to food, which relates to an interest of the listener 180-1 in cooking.

Additionally, in the "Incoming Chats" portion of section 135, a chat message 142-3 received from a listener named "Jerry" states, "Playing video games," and a chat message 142-4 received from a listener named "Marc" states, "Without a care in the world!" The chat messages 142-3, 142-4 are accompanied by interactive features 144-3, 144-4 which indicate that one and two interactions, respectively, with each of the chat messages 142-3, 142-4 have been received from listeners or the creator 110. The chat messages 142-3, 142-4 may be two chat messages of the chat messages 142-*a* that were most recently received from listeners, or otherwise selected on any other basis.

Upon reviewing the chat messages 140, 142-1, 142-2, 142-3, 142-4 on the user interface 130-2, the listener 180-1 may then enter text for inclusion in one or more chat messages in the section 136, or continue to listen to the media program without entering any chat messages. Alternatively, or additionally, the listener 180-1 may interact with any of the chat messages 140, 142-1, 142-2, 142-3, 142-4, such as by executing one or more gestures or other interactions with any of the interactive features 144-0, 144-1, 144-2, 144-3, 144-4.

Additionally, as chat messages are subsequently received from the creator 110 or any other listeners, such chat messages may be preferentially ranked or scored in accordance with the rules set 155, or otherwise processed to identify one or more of such chat messages that are appropriate for the listener 180-1, or any other listeners. The chat messages, or interactions with the chat messages, and times with respect to the media program at which such chat messages or interactions were received, may be stored in association with the media program in one or more data stores. Subsequently, when the media program is requested by and transmitted to the listener, the chat messages and any associated interactions may also be transmitted to a device of the listener, and displayed in a section of a user interface by the device at the times with respect to the playing of the media program at which such chat messages or interactions were received.

Any number of the n listeners to the media program may provide chat messages, or decline to provide any such chat messages. The number of the n listeners that subscribe to the media program, or receive audio signals from the creator 110 or the control system 150 and provide chat messages or interactions with such chat messages, may be any number, such as several, dozens, hundreds, thousands or more listeners. Moreover, chat messages or interactions may be displayed within user interfaces on any number of devices of any of such listeners, in a manner similar to that shown in FIG. 1C or FIG. 1F. Alternatively, where one or more of such devices is not equipped with a display, chat messages received by such devices may be spoken aloud, e.g., at a volume level different from that of a voice of a creator or any other media content then being played by such devices.

Moreover, in some implementations, chat messages received from the creator 110 or any listeners may be processed to determine any emotions or sentiments of the listeners expressed in such chat messages, or to determine whether any of the chat messages includes objectionable (e.g., obscene, indecent, profane or divisive) content. For example, one or more of the chat message 140 or the chat messages 142-*a* may be provided as inputs to a machine learning algorithm (e.g., an artificial neural network) trained to identify any words represented in the chat message 140 or the chat messages 142-*a* or to determine whether any of such words include or constitute objectionable content. Alternatively, or additionally, other types of machine learning algorithms, systems or techniques, or multiple machine learning algorithms, systems or techniques, may be utilized to determine sentiments, evaluate chat messages for objectionable content, or determine any other attributes of the chat messages. Moreover, in some implementations, whether a chat message includes any objectionable content may be determined in any other manner, including but not limited by one or more algorithms, systems or techniques that need not rely on machine learning or like applications. For example, in some implementations, a set of words that has been identified and designated as objectionable in nature, e.g., words that are known to be or are designated as either obscene, indecent, profane or divisive. When a set of words is identified in a chat message received from a creator or a listener, one or more of the words may be compared to a set of words that has been identified and designated as objectionable in nature. In some implementations, whether a set of words in a chat message is objectionable may be determined based on a number of words in the set of words that have been identified and designated as objectionable in nature.

In some implementations, chat messages may be processed to determine an emotion or a sentiment of a creator or a listener that provided the chat messages, or one or more evaluations, attitudes, appraisals, emotions, moods or judgments represented within the chat messages. For example, an emotion or a sentiment (or any evaluations, attitudes, appraisals, emotions, moods or judgments) may be identified or classified with respect to a chat message as a whole, or with respect to one or more individual portions (e.g., passages, paragraphs or sentences) of the chat message. When analyzing chat messages received from a creator or a listener, or a portion thereof, in order to identify an emotion or a sentiment expressed therein, the chat messages may be bifurcated or otherwise divided into sections containing objective, fact-based statements or components, and sections containing subjective, opinion-based statements or components, the latter of which is considered or emphasized in a sentiment analysis context. Subjective, opinion-based statements or components may further be subdivided into groups of express opinions (e.g., "I like Siberian Huskies") or opinions of a comparative nature (e.g., "I prefer the colors blue and white over the colors burgundy and gold").

Additionally, an emotion or a sentiment of a chat message may be identified broadly in terms of polarity, i.e., whether the chat message is generally positive, negative or neutral, or in terms of grades or degrees. For example, a chat message may be classified as "happy" or "sad," "inspirational" or "depressing," "peaceful" or "disturbed," "angry" or "content," or with any other identifier or pair of identifiers, and to any extent or degree thereof, which may be expressed in one or more qualitative or quantitative terms. Moreover, sentiment analyses may be trained or restricted to a specific topic or category, or otherwise directed to obtaining an emotion or a sentiment of a focused nature, e.g., emotions or sentiments regarding the economy, sports or politics.

In order to identify and obtain an emotion or a sentiment from a chat message, text or any data associated with the chat message may be analyzed in any manner. For example, one or more machine learning algorithms or techniques may be provided to determine an emotion or a sentiment from a chat message by one or more nearest neighbor methods or analyses, artificial neural networks, factorization methods or techniques, K-means clustering analyses or techniques, similarity measures such as log likelihood similarities or cosine similarities, Bayesian classifiers, singular value decomposition methods, latent Dirichlet allocations or other topic models, linear or non-linear models, or latent semantic analyses, which may be used to review and assess the chat message, and to identify any pertinent keywords maintained therein, which may be analyzed and associated with one or more emotions or sentiments thereof.

As is discussed above, where a user interface includes an interactive feature for executing an interaction with a chat message, and where the interactive feature includes an icon or symbol that is visually suggestive of an interaction in general, or a specific type of interaction in particular, e.g., emoji, arrows pointing in various directions, hearts, thumbs, stars, or others, an emotion or a sentiment associated with an interaction may be inferred based on the icon or symbol associated with the interactive feature. Alternatively, in some implementations, an emotion or a sentiment of an interaction with a chat message may be determined based on the emotion or the sentiment of the chat message. For example, where a listener or a creator executes a generally positive interaction with a chat message, it may be inferred that the listener or the creator agrees with the chat message. Therefore, an emotion or a sentiment of the chat message may be determined, and associated with the interaction, or with the listener or the creator. Conversely, where a listener or a creator executes a generally negative interaction with a chat message, it may be inferred that the listener or the creator disagrees with the chat message. Therefore, an emotion or a sentiment of the chat message may be determined, and an emotion or a sentiment that is opposite to or otherwise stands in contrast with the emotion or the sentiment of the chat message may be associated with the interaction, or with the listener or the creator.

One or more of the embodiments disclosed herein may overcome limitations of existing systems and methods for presenting media programs or other content, e.g., radio programs, to listeners. Unbounded by traditional frequency bands or broadcast protocols, the systems and methods of the present disclosure may receive designations of media content from a creator of a media program, e.g., in a broadcast plan, and the media program may be transmitted over one or more networks to any number of listeners in any locations and by way of any devices. Creators of media programs may designate one or more types or files of media content to be broadcast to listeners via a user interface rendered on a display or by any type or form of computer device, in accordance with a broadcast plan or other schedule. A control system, or a mixing system, a conference system or a broadcast system, may retrieve the designated media content from any number of sources, or initiate or control the designated media content to any number of listeners, by opening one or more connections between computer devices or systems of the creator and computer devices or systems of the sources or listeners.

In some implementations of the present disclosure, one-way communication channels, or unidirectional channels, may be established between a broadcast system (or a control system) and any number of other computer devices or systems. For example, broadcast channels may be established between a broadcast system (or a control system) and sources of media or other content, or between a broadcast system (or a control system) and devices of any number of listeners, for providing media content. Two-way communication channels, or bidirectional channels, may also be established between a conference system (or a control system) and any number of other computer devices or systems. For example, a conference channel may be established between a computer device or system of a creator or another source of media and a conference system (or a control system). Furthermore, one-way or two-day communication channels may be established between a conference system and a mixing system, or between a mixing system and a broadcast system, as appropriate.

Communication channels may be established in any manner, in accordance with implementations of the present disclosure. Those of ordinary skill in the pertinent arts will recognize that computer networks, such as the Internet, may operate based on a series of protocols that are layered on top of one another. Such protocols may be collectively referred to as an Internet Protocol suite (or IP suite). One underlying layer of the IP suite is sometimes referred to in the abstract as a link layer, e.g., physical infrastructure, or wired or wireless connections between one or more networked computers or hosts. A second layer atop the link layer is a network layer, which is sometimes called an Internet Protocol layer, and is a means by which data is routed and delivered between two disparate physical locations.

A third layer in an IP suite is a transport layer, which may be analogized to a recipient's mailbox. The transport layer may divide a host's network interface into one or more channels, or ports, with each host having as many ports available for establishing simultaneous network connections. A socket is a combination of an IP address describing a host for which data is intended and a port number indicating a channel on the host to which data is directed. A socket is used by applications running on a host to listen for incoming data and send outgoing data. One standard transport layer protocol is the Transmission Control Protocol, or TCP, which is full-duplex, such that connected hosts can concurrently send and receive data. A fourth and uppermost layer in the IP suite is referred to as an application layer. Within the application layer, familiar protocols such as Hypertext Transfer Protocol (or "HTTP"), are found. HTTP is built on a request/response model in which a client sends a request to a server, which may be listening for such requests, and the server parses the request and issues an appropriate response, which may contain a network resource.

One application-layer protocol for communicating between servers and clients is called Web Socket, which provides TCP-like functionality at the application layer. Like TCP, WebSocket is full-duplex, such that once an underlying connection is established, a server may, of its own volition, push data to client devices with which the server is connected, and clients may continue to send messages to the server over the same channel. Additionally, a pure server-push technology is also built into HTML5, one version of Hypertext Markup Language. This technology, which is known as Server-Sent Events (or SSE), or operates over standard HTTP, and is a novel use of an existing application-layer protocol. Server-Sent Events works by essentially sending partial responses to an initial HTTP request, such that a connection remains open, enabling further data to be sent at a later time. In view of its unidirectional nature, Server-Sent Events is useful in situations in which a server will be generating a steady stream of updates without requiring anything further from a client.

Communications channels of the present disclosure may be associated with any type of content and established computer devices and systems associated with any type of entity, and in accordance with a broadcast plan or sequence of media content, or at the control or discretion of one or more creators. One or more user interfaces rendered by or on a computer system or device may permit a creator to control the synchronization or mixing of media content by the broadcast system or the mixing system. Gestures or other interactions with the user interfaces may be translated into commands to be processed by the broadcast system or the mixing system, e.g., to play a specific song, to insert a specific advertisement, or to take any other relevant actions, such as to adjust a volume or another attribute or parameter of media content. Moreover, a broadcast system or the mixing system may provide any relevant information to a creator via such user interfaces, including information regarding attributes or parameters of media content that was previously played, that is being played, or that is scheduled to be played in accordance with a broadcast plan or during a media program. The broadcast system or the mixing system may further execute one or more instructions in response to rules, which may define or control media content that is to be played at select times during a media program, e.g., to automatically increase or decrease volumes or other attributes or parameters of a voice of a creator, or of other media content from other sources, on any basis. Any rules governing the playing of media content of a media program by the broadcast system or the mixing system may be overridden by a creator, e.g., by one or more gestures or other interactions with a user interface of an application in communication with the broadcast system or the mixing system that may be associated with the playing of the media content or the media program.

Figure 2A:
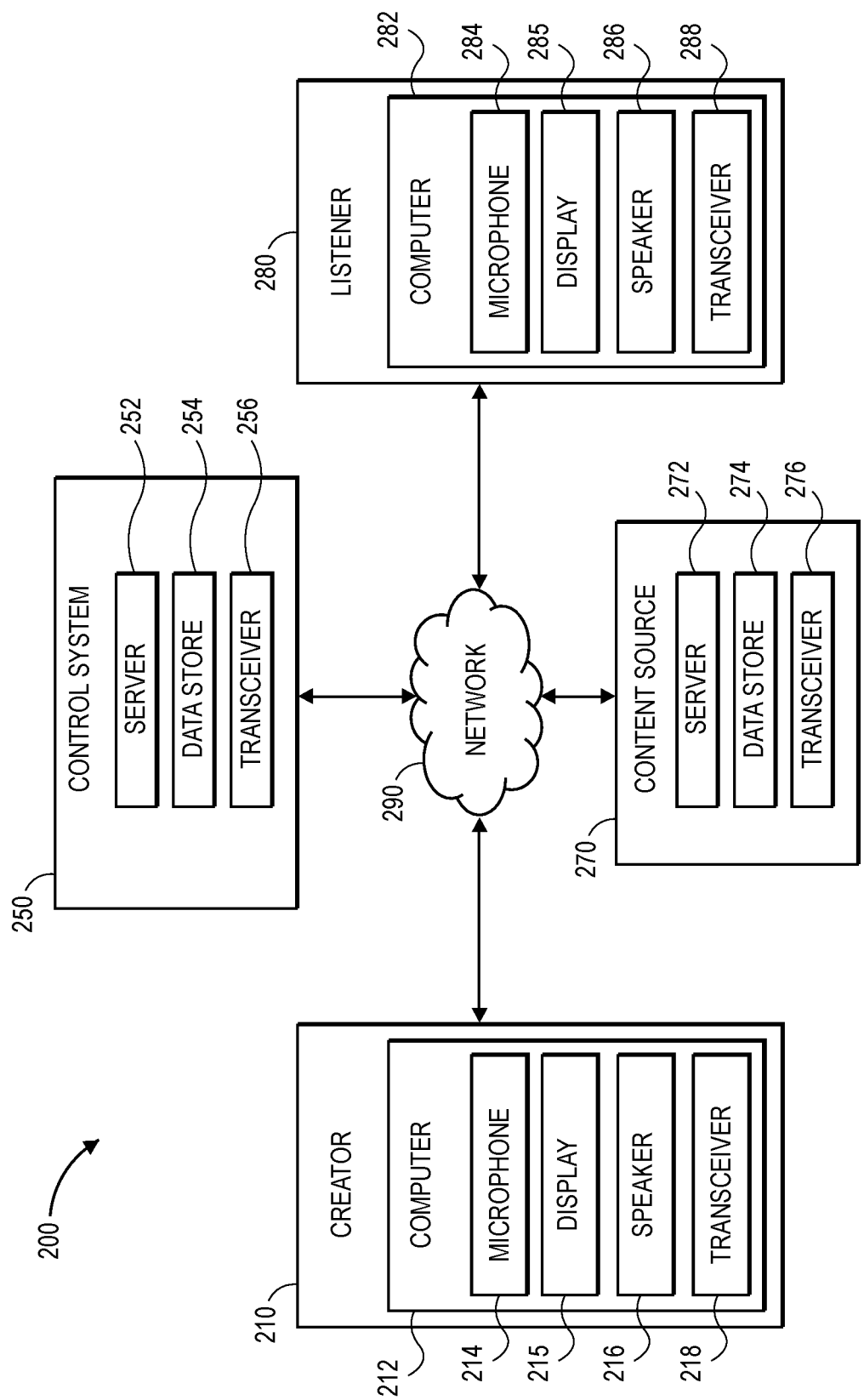
FIGS. 2A and 2B are block diagrams of components of one system for presenting chat messages to listeners in accordance with embodiments of the present disclosure.
Figure 2B:
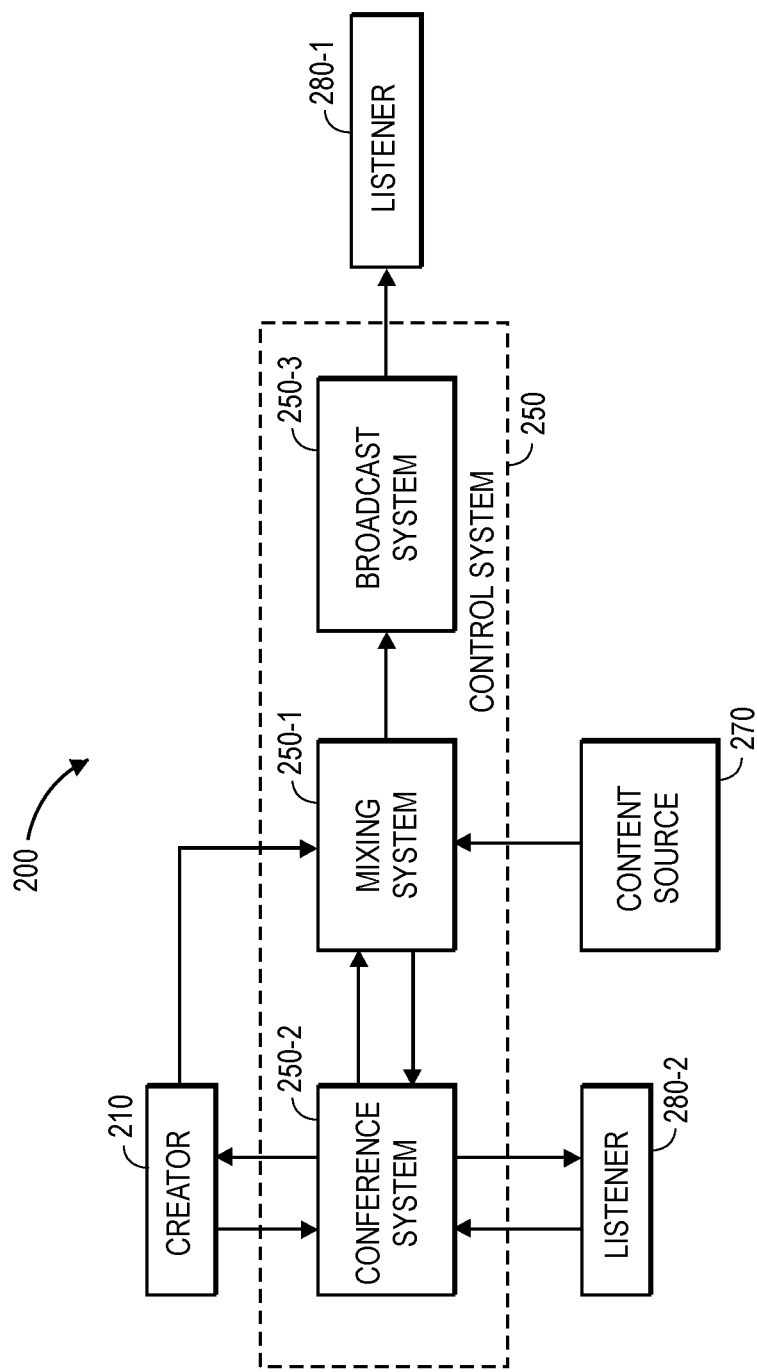

Referring to FIGS. 2A and 2B, block diagrams of components of one system 200 for presenting chat messages to listeners in accordance with embodiments of the present disclosure is shown. Except where otherwise noted, reference numerals preceded by the number "2" shown in FIG. 2A or FIG. 2B indicate components or features that are similar to components or features having reference numerals preceded by the number "1" shown in FIGS. 1A through 1F.

As is shown in FIG. 2A, the system 200 shown in FIG. 2A includes a creator 210, a control system 250, a content source 270, and a listener 280 that are connected to one another over one or more networks 290.

The creator 210 may be any individual or entity that expresses an interest or an intent in constructing a media program including media content, and providing the media program to the listener 280 over the network 290. As is shown in FIG. 2A, the creator 210 is associated with or operates a computer system 212 having a microphone 214, a display 215, a speaker 216 and a transceiver 218, and any other components.

In some implementations, the computer system 212 may be a mobile device, such as a smartphone, a tablet computer, a wristwatch, or others. In some other implementations, the computer system 212 may be a laptop computer or a desktop computer, or any other type or form of computer. In still other implementations, the computer system 212 may be, or may be a part of, a smart speaker, a television, an automobile, a media player, or any other type or form of system having one or more processors, memory or storage components (e.g., databases or other data stores), or other components.

The microphone 214 may be any sensor or system for capturing acoustic energy, including but not limited to piezoelectric sensors, vibration sensors, or other transducers for detecting acoustic energy, and for converting the acoustic energy into electrical energy or one or more electrical signals. The display 215 may be a television system, a monitor or any other like machine having a screen for viewing rendered video content, and may incorporate any number of active or passive display technologies or systems, including but not limited to electronic ink, liquid crystal displays (or "LCD"), light-emitting diode (or "LED") or organic light-emitting diode (or "OLED") displays, cathode ray tubes (or "CRT"), plasma displays, electrophoretic displays, image projectors, or other display mechanisms including but not limited to micro-electromechanical systems (or "MEMS"), spatial light modulators, electroluminescent displays, quantum dot displays, liquid crystal on silicon (or "LCOS") displays, cholesteric displays, interferometric displays or others. The display 215 may be configured to receive content from any number of sources via one or more wired or wireless connections, e.g., the control system 250, the content source 270 or the listener 280, over the networks 290.

In some implementations, the display 215 may be an interactive touchscreen that may not only display information or data but also receive interactions with the information or data by contact with a viewing surface. For example, the display 215 may be a capacitive touchscreen that operates by detecting bioelectricity from a user, or a resistive touchscreen including a touch-sensitive computer display composed of multiple flexible sheets that are coated with a resistive material and separated by an air gap, such that when a user contacts a surface of a resistive touchscreen, at least two flexible sheets are placed in contact with one another.

The speaker 216 may be any physical components that are configured to convert electrical signals into acoustic energy such as electrodynamic speakers, electrostatic speakers, flat-diaphragm speakers, magnetostatic speakers, magnetostrictive speakers, ribbon-driven speakers, planar speakers, plasma arc speakers, or any other sound or vibration emitters.

The transceiver 218 may be configured to enable the computer system 212 to communicate through one or more wired or wireless means, e.g., wired technologies such as Universal Serial Bus (or "USB") or fiber optic cable, or standard wireless protocols such as Bluetooth® or any Wireless Fidelity (or "Wi-Fi") protocol, such as over the network 290 or directly. The transceiver 218 may further include or be in communication with one or more input/output (or "I/O") interfaces, network interfaces and/or input/output devices, and may be configured to allow information or data to be exchanged between one or more of the components of the computer system 212, or to one or more other computer devices or systems (e.g., other aerial vehicles, not shown) via the network 290. The transceiver 218 may perform any necessary protocol, timing or other data transformations in order to convert data signals from a first format suitable for use by one component into a second format suitable for use by another component. In some embodiments, the transceiver 218 may include support for devices attached through various types of peripheral buses, e.g., variants of the Peripheral Component Interconnect (PCI) bus standard or the Universal Serial Bus (USB) standard. In some other embodiments, functions of the transceiver 218 may be split into two or more separate components.

In some implementations, the computer system 212 may include a common frame or housing that accommodates the microphone 214, the display 215, the speaker 216 and/or the transceiver 218. In some implementations, applications or functions or features described as being associated with the computer system 212 may be performed by a single system. In some other implementations, however, such applications, functions or features may be split among multiple systems. For example, an auxiliary system, such as the ear buds 113 of FIG. 1A, may perform one or more of such applications or functions, or include one or more features, of the computer system 212 or other computer systems or devices described herein, and may exchange any information or data that may be associated with such applications, functions or features with the computer system 212, as necessary. Alternatively, or additionally, the computer system 212 may include one or more power supplies, sensors (e.g., visual cameras or depth cameras), feedback devices (e.g., haptic feedback systems), chips, electrodes, clocks, boards, timers or other relevant features (not shown).

In some implementations, the computer system 212 may be programmed or configured to render one or more user interfaces on the display 215 or in any other manner, e.g., by a browser or another application. The computer system 212 may receive one or more gestures or other interactions with such user interfaces, and such gestures or other interactions may be interpreted to generate one or more instructions or commands that may be provided to one or more of the control system 250, the content source 270 or the listener 280. Alternatively, or additionally, the computer system 212 may be configured to present one or more messages or information to the creator 210 in any other manner, e.g., by voice, and to receive one or more instructions or commands from the creator 210, e.g., by voice.

The control system 250 may be any single system, or two or more of such systems, that is configured to establish or terminate channels or connections with or between the creator 210, the content source 270 or the listener 280, to initiate a media program, or to control the receipt and transmission of media content from one or more of the creator 210, the content source 270 or the listener 280 to the creator 210, the content source 270 or the listener 280. The control system 250 may operate or include a networked computer infrastructure, including one or more physical computer servers 252 and data stores 254 (e.g., databases) and one or more transceivers 256, that may be associated with the receipt or transmission of media or other information or data over the network 290. The control system 250 may also be provided in connection with one or more physical or virtual services configured to manage or monitor such files, as well as one or more other functions. The servers 252 may be connected to or otherwise communicate with the data stores 254 and may include one or more processors. The data stores 254 may store any type of information or data, including media files or any like files containing multimedia (e.g., audio and/or video content), for any purpose. The servers 252 and/or the data stores 254 may also connect to or otherwise communicate with the networks 290, through the sending and receiving of digital data.

In some implementations, the control system 250 may be independently provided for the exclusive purpose of managing the monitoring and distribution of media content. Alternatively, the control system 250 may be operated in connection with one or more physical or virtual services configured to manage the monitoring or distribution of media files, as well as one or more other functions. Additionally, the control system 250 may include any type or form of systems or components for receiving media files and associated information, data or metadata, e.g., over the networks 290. For example, the control system 250 may receive one or more media files via any wired or wireless means and store such media files in the one or more data stores 254 for subsequent processing, analysis and distribution. In some embodiments, the control system 250 may process and/or analyze media files, such as to add or assign metadata, e.g., one or more tags, to media files.

The control system 250 may further broadcast, air, stream or otherwise distribute media files maintained in the data stores 254 to one or more listeners, such as the listener 280 or the creator 210, over the networks 290. Accordingly, in addition to the server 252, the data stores 254, and the transceivers 256, the control system 250 may also include any number of components associated with the broadcasting, airing, streaming or distribution of media files, including but not limited to transmitters, receivers, antennas, cabling, satellites, or communications systems of any type or form. Processes for broadcasting, airing, streaming and distribution of media files over various networks are well known to those skilled in the art of communications and thus, need not be described in more detail herein.

The content source 270 may be a source, repository, bank, or other facility for receiving, storing or distributing media content, e.g., in response to one or more instructions or commands from the control system 250. The content source 270 may receive, store or distribute media content of any type or form, including but not limited to advertisements, music, news, sports, weather, or other programming. The content source 270 may include, but need not be limited to, one or more servers 272, data stores 274 or transceivers 276, which may have any of the same attributes or features of the servers 252, data stores 254 or transceivers 256, or one or more different attributes or features.

In some embodiments, the content source 270 may be an Internet-based streaming content and/or media service provider that is configured to distribute media over the network 290 to one or more general purpose computers or computers that are dedicated to a specific purpose.

For example, in some embodiments, the content source 270 may be associated with a television channel, network or provider of any type or form that is configured to transmit media files over the airwaves, via wired cable television systems, by satellite, over the Internet, or in any other manner. The content source 270 may be configured to generate or transmit media content live, e.g., as the media content is captured in real time or in near-real time, such as following a brief or predetermined lag or delay, or in a pre-recorded format, such as where the media content is captured or stored prior to its transmission to one or more other systems. For example, the content source 270 may include or otherwise have access to any number of microphones, cameras or other systems for capturing audio, video or other media content or signals. In some embodiments, the content source 270 may also be configured to broadcast or stream one or more media files for free or for a one-time or recurring fee. In some embodiments, the content source 270 may be associated with any type or form of network site (e.g., a web site), including but not limited to news sites, sports sites, cultural sites, social networks or other sites, that streams one or more media files over a network. In essence, the content source 270 may be any individual or entity that makes media files of any type or form available to any other individuals or entities over one or more networks 290.

The listener 280 may be any individual or entity having access to one or more computer devices 282, e.g., general purpose or special purpose devices, who has requested (e.g., subscribed to) media content associated with one or more media programs over the network 290. For example, the computer devices 282 may be at least a portion of an automobile, a desktop computer, a laptop computer, a media player, a smartphone, a smart speaker, a tablet computer, a television, or a wristwatch, or any other like machine that may operate or access one or more software applications, and may be configured to receive media content, and present the media content to the listener 280 by one or more speakers, displays or other feedback devices. The computer device 282 may include a microphone 284, a display 285, a speaker 286, a transceiver 288, or any other components described herein, which may have any of the same attributes or features of the computer device 212, the microphone 214, the display 215, the speaker 216 or the transceiver 218 described herein, or one or more different attributes or features. In accordance with the present disclosure, a listener 280 that requests to receive media content associated with one or more media programs may also be referred to as a "subscriber" to such media programs or media content.

Those of ordinary skill in the pertinent arts will recognize that the computer devices 212, 282 may include any number of hardware components or operate any number of software applications for playing media content received from the control system 250 and/or the media sources 270, or from any other systems or devices (not shown) connected to the network 290.

Moreover, those of ordinary skill in the pertinent arts will further recognize that, alternatively, in some implementations, the computer device 282 need not be associated with a specific listener 280. For example, the computer device 282 may be provided in a public place, beyond the control of the listener 280, e.g., in a bar, a restaurant, a transit station, a shopping center, or elsewhere, where any individuals may receive one or more media programs.

The networks 290 may be or include any wired network, wireless network, or combination thereof, and may comprise the Internet, intranets, broadcast networks, cellular television networks, cellular telephone networks, satellite networks, or any other networks, for exchanging information or data between and among the computer systems or devices of the creator 210, the control system 250, the media source 270 or the listener 280, or others (not shown). In addition, the network 290 may be or include a personal area network, local area network, wide area network, cable network, satellite network, cellular telephone network, or combination thereof, in whole or in part. The network 290 may also be or include a publicly accessible network of linked networks, possibly operated by various distinct parties, such as the Internet. The network 290 may include one or more wireless networks, such as a Global System for Mobile Communications (GSM) network, a Code Division Multiple Access (CDMA) network, a Long-Term Evolution (LTE) network, or some other type of wireless network. Protocols and components for communicating via the Internet or any of the other aforementioned types of communication networks are well known to those skilled in the art of computer communications and thus, need not be described in more detail herein.

Although the system 200 shown in FIG. 2A shows boxes for one creator 210, one control system 250, one media source 270, one listener 280, and one network 290, those of ordinary skill in the pertinent arts will recognize that any number of creators 210, broadcast systems 250, media sources 270, listeners 280 or networks 290 may be utilized to transmit, receive, access, hear, or view media content provided in accordance with implementations of the present disclosure. Moreover, the computer devices 212, 252, 272, 282 may include all or fewer of the components shown in FIG. 2A or perform all or fewer of the tasks or functions described herein. Tasks or functions described as being executed or performed by a single system or device associated with the creator 210, the control system 250, the media source 270 or the listener 280 may be executed or performed by multiple systems or devices associated with each of the creator 210, the control system 250, the media source 270 or the listener 280. For example, the tasks or functions described herein as being executed or performed by the control system 250 may be performed by a single system, or by separate systems for establishing two-way connections with the creator 210 or any number of media sources 270, or any other systems, e.g., a mixing system, or for establishing one-way connections with any number of media sources 270 or any number of listeners 280 and transmitting data representing media content, e.g., a broadcast system, from such media sources 270 to such listeners 280. Moreover, two or more creators 210 may collaborate on the construction of a media program.

In some implementations, one or more of the tasks or functions described as being executed or performed by the control system 250 may be performed by multiple systems. For example, as is shown in FIG. 2B, the system 200 may include a mixing system 250-1, a conference system 250-2 and a broadcast system 250-3 that may perform one or more of the tasks or functions described herein as being executed or performed by the control system 250.

As is further shown in FIG. 2B, the mixing system 250-1 may be configured to receive data from the conference system 250-2, as well as from one or more content sources 270. For example, in some implementations, the conference system 250-2 may also be configured to establish two-way communications channels with computer devices or systems associated with the creator 210 (or any number of creators) as well as a listener 280-2 (or any number of listeners) or other authorized hosts, guests, or contributors to a media program associated with one or more of the creators 210, and form a "conference" including each of such devices or systems. The conference system 250-2 may receive data representing media content such as audio signals in the form of words spoken or sung by one or more of the creator 210, the listener 280-2, or other entities connected to the conference system 250-2, or music or other media content played by the one or more of the creator 210, the listener 280-2, or such other entities, and transmit data representing the media content or audio signals to each of the other devices or systems connected to the conference system 250-2.

In some implementations, the mixing system 250-1 may also be configured to establish a two-way communications channel with the conference system 250-2, thereby enabling the mixing system 250-1 to receive data representing audio signals from the conference system 250-2, or transmit data representing audio signals to the conference system 250-2. For example, in some implementations, the mixing system 250-1 may act as a virtual participant in a conference including the creator 210 and any listeners 280-2, and may receive data representing audio signals associated with any participants in the conference, or provide data representing audio signals associated with media content of the media program, e.g., media content received from any of the content sources 270, to such participants.

The mixing system 250-1 may also be configured to establish a one-way communications channel with the content source 270 (or with any number of content sources), thereby enabling the mixing system 250-1 to receive data representing audio signals corresponding to advertisements, songs or media files, news programs, sports programs, weather reports or any other media files, which may be live or previously recorded, from the content source 270. The mixing system 250-1 may be further configured to establish a one-way communications channel with the broadcast system 250-3, and to transmit data representing media content received from the creator 210 or the listener 280-2 by way of the conference channel 250-2, or from any content sources 270, to the broadcast system 250-3 for transmission to any number of listeners 280-1.

The mixing system 250-1 may be further configured to receive information or data from one or more devices or systems associated with the creator 210, e.g., one or more instructions for operating the mixing system 250-1. For example, in some implementations, the mixing system 250-1 may be configured to cause any number of connections to be established between devices or systems and one or more of the conference system 250-2 or the broadcast system 250-3, or for causing data representing media content of any type or form to be transmitted to one or more of such devices or systems in response to such instructions. In some implementations, the mixing system 250-1 may also be configured to initiate or modify the playing of media content, such as by playing, pausing or stopping the media content, advancing (e.g., "fast-forwarding") or rewinding the media content, increasing or decreasing levels of volume of the media content, or setting or adjusting any other attributes or parameters (e.g., treble, bass, or others) of the media content, in response to such instructions or automatically.

The broadcast system 250-3 may be configured to establish one-way communications channels with any number of listeners 280-1, and to transmit data representing media content received from the mixing system 250-1 to each of such listeners 280-1.

The computers, servers, devices and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

The computer devices 212, 282 or the servers 252, 272, and any associated components, may use any web-enabled or Internet applications or features, or any other client-server applications or features including E-mail or other messaging techniques, to connect to the networks 290, or to communicate with one another, such as through short or multimedia messaging service (SMS or MMS) text messages. For example, the computer devices 212, 282 or the servers 252, 272 may be configured to transmit information or data in the form of synchronous or asynchronous messages to one another in real time or in near-real time, or in one or more offline processes, via the networks 290. Those of ordinary skill in the pertinent art would recognize that the creator 210, the control system 250 (or the mixing system 250-1, the conference system 250-2, or the broadcast system 250-3), the media source 270 or the listener 280 (or the listeners 280-1, 280-2) may include or operate any of a number of computing devices that are capable of communicating over the networks 290. The protocols and components for providing communication between such devices are well known to those skilled in the art of computer communications and need not be described in more detail herein.

The data and/or computer executable instructions, programs, firmware, software and the like (also referred to herein as "computer executable" components) described herein may be stored on a computer-readable medium that is within or accessible by computers or computer components such as computer devices 212, 282 or the servers 252, 272, or to any other computers or control systems utilized by the creator 210, the control system 250 (or the mixing system 250-1, the conference system 250-2, or the broadcast system 250-3), the media source 270 or the listener 280 (or the listeners 280-1, 280-2), and having sequences of instructions which, when executed by a processor (e.g., a central processing unit, or "CPU"), cause the processor to perform all or a portion of the functions, services and/or methods described herein. Such computer executable instructions, programs, software and the like may be loaded into the memory of one or more computers using a drive mechanism associated with the computer readable medium, such as a floppy drive, CD-ROM drive, DVD-ROM drive, network interface, or the like, or via external connections.

Some embodiments of the systems and methods of the present disclosure may also be provided as a computer-executable program product including a non-transitory machine-readable storage medium having stored thereon instructions (in compressed or uncompressed form) that may be used to program a computer (or other electronic device) to perform processes or methods described herein. The machine-readable storage media of the present disclosure may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, embodiments may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks, e.g., the network 290.

Figure 3:
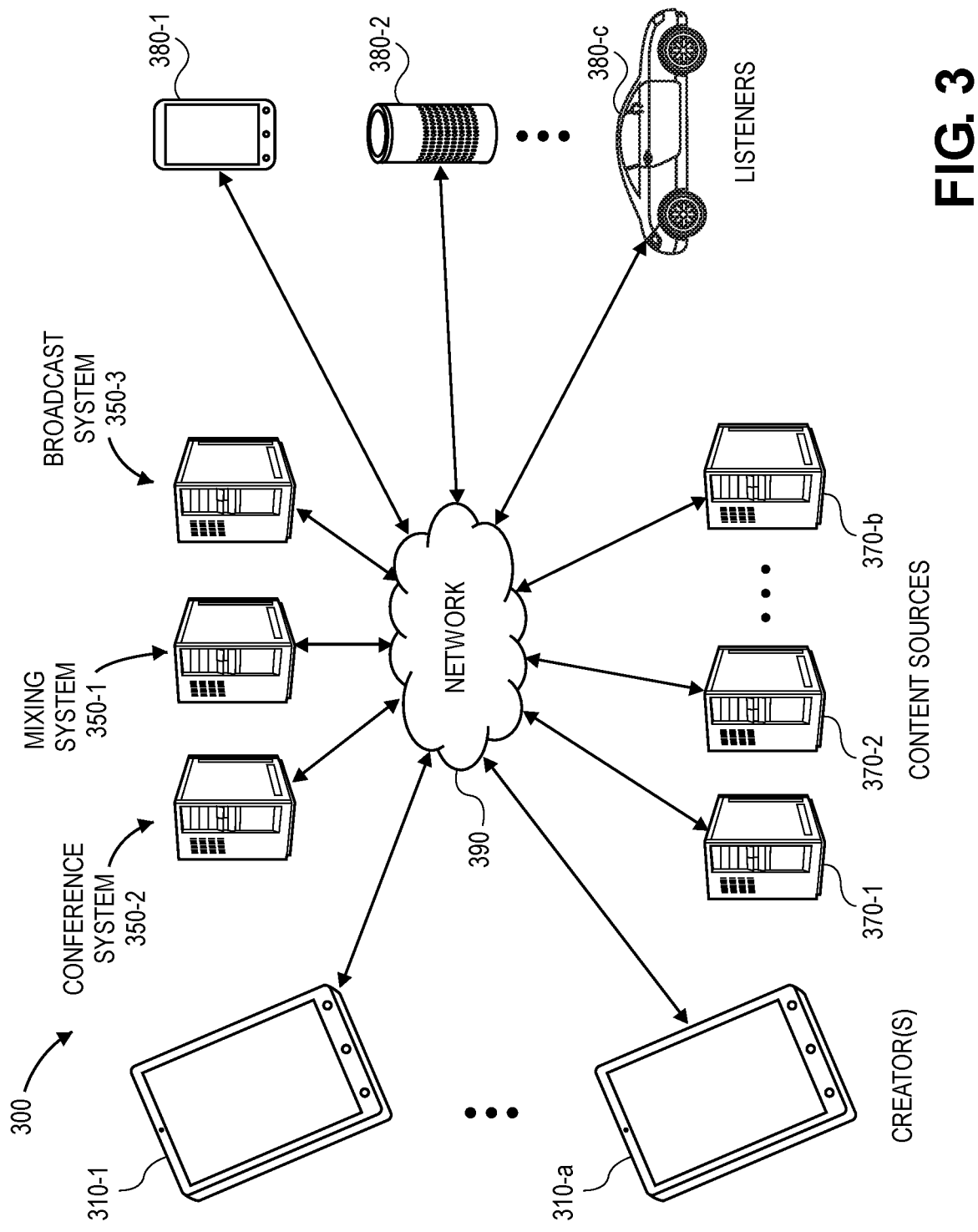
FIG. 3 is a view of aspects of one system for presenting chat messages to listeners in accordance with embodiments of the present disclosure.

Referring to FIG. 3, a view of aspects of one system for presenting chat messages to listeners in accordance with embodiments of the present disclosure is shown. Except where otherwise noted, reference numerals preceded by the number "3" shown in FIG. 3 indicate components or features that are similar to components or features having reference numerals preceded by the number "2" shown in FIG. 2A or FIG. 2B or by the number "1" shown in FIGS. 1A through 1F. As is shown in FIG. 3, the system 300 includes computer systems or devices of a plurality of creators 310-1 . . . 310-a, a mixing system 350-1, a conference system 350-2, a broadcast system 350-3, a plurality of content sources 370-1, 370-2 . . . 370-b and a plurality of listeners 380-1, 380-2 . . . 380-c that are connected to one another over a network 390, which may include the Internet in whole or in part.

The creators 310-1 . . . 310-a may operate a computer system or device having one or more microphones, an interactive display, one or more speakers, one or more processors and one or more transceivers configured to enable communication with one or more other computer systems or devices. In some implementations, the creators 310-1 . . . 310-a may operate a smartphone, a tablet computer or another mobile device, and may execute interactions with one or more user interfaces rendered thereon, e.g., by a mouse, a stylus, a touchscreen, a keyboard, a trackball, or a trackpad, as well as any voice-controlled devices or software (e.g., a personal assistant). Interactions with the user interfaces may be interpreted and transmitted in the form of instructions or commands to the mixing system 350-1, the conference system 350-2 or the broadcast system 350-3. Alternatively, the creators 310-1 . . . 310-*a* may operate any other computer system or device, e.g., a laptop computer, a desktop computer, a smart speaker, a media player, a wristwatch, a television, an automobile, or any other type or form of system having one or more processors, memory or storage components (e.g., databases or other data stores), or other components.

Additionally, the mixing system 350-1 may be any server or other computer system or device configured to receive information or data from the creators 310-1 . . . 310-*a*, or any of the listeners 380-1, 380-2 . . . 380-*c*, e.g., by way of the conference system 350-2, or from any of the media sources 370-1, 370-2 . . . 370-*b* over the network 390. The mixing system 350-1 may be further configured to transmit any information or data to the broadcast system 350-3 over the network 390, and to cause the broadcast system 350-3 to transmit any of the information or data to any of the listeners 380-1, 380-2 . . . 380-*c*, in accordance with a broadcast plan (or a sequence of media content, or another schedule), or at the direction of the creators 310-1 . . . 310-*a*. The mixing system 350-1 may also transmit or receive information or data along such communication channels, or in any other manner. The operation of the mixing system 350-1, e.g., the establishment of connections, or the transmission and receipt of data via such connections, may be subject to the control or discretion of any of the creators 310-1 . . . 310-*a*.

In some implementations, the mixing system 350-1 may receive media content from one or more of the media sources 370-1, 370-2 . . . 370-*b*, and cause the media content to be transmitted to one or more of the creators 310-1 . . . 310-*a* or the listeners 380-1, 380-2 . . . 380-*c* by the broadcast system 350-3. In some other implementations, the mixing system 350-1 may receive media content from one or more of the media sources 370-1, 370-2 . . . 370-*b*, and mix, or combine, the media content with any media content received from the creators 310-1 . . . 310-*a* or any of the listeners 380-1, 380-2 . . . 380-*c*, before causing the media content to be transmitted to one or more of the creators 310-1 . . . 310-*a* or the listeners 380-1, 380-2 . . . 380-*c* by the conference system 350-2 or the broadcast system 350-3. For example, in some implementations, the mixing system 350-1 may receive media content (e.g., audio content and/or video content) captured live by one or more sensors of one or more of the media sources 370-1, 370-2 . . . 370-*b*, e.g., cameras and/or microphones provided at a location of a sporting event, or any other event, and mix that media content with any media content received from any of the creators 310-1 . . . 310-*a* or any of the listeners 380-1, 380-2 . . . 380-*c*. In such embodiments, the creators 310-1 . . . 310-*a* may act as sportscasters, news anchors, weathermen, reporters or others, and may generate a media program that combines audio or video content captured from a sporting event or other event of interest, along with audio or video content received from one or more of the creators 310-1 . . . 310-*a* or any of the listeners 380-1, 380-2 . . . 380-*c* before causing the media program to be transmitted to the listeners 380-1, 380-2 . . . 380-*c* by the conference system 350-2 or the broadcast system 350-3.

In some implementations, the conference system 350-2 may establish two-way communications channels between any of the creators 310-1 . . . 310-*a* and, alternatively, any of the listeners 380-1, 380-2 . . . 380-*c*, who may be invited or authorized to participate in a media program, e.g., by providing media content in the form of spoken or sung words, music, or any media content, subject to the control or discretion of the creators 310-1 . . . 310-*a*. Devices or systems connected to the conference system 350-2 may form a "conference" by transmitting or receiving information or data along such communication channels, or in any other manner. The operation of the mixing system 350-1, e.g., the establishment of connections, or the transmission and receipt of data via such connections, may be subject to the control or discretion of the creators 310-1 . . . 310-*a*. In some implementations, the mixing system 350-1 may effectively act as a virtual participant in such a conference, by transmitting media content received from any of the media sources 370-1, 370-2 . . . 370-*b* to the conference system 350-2 for transmission to any devices or systems connected thereto, and by receiving media content from any of such devices or systems by way of the conference system 350-2 and transmitting the media content to the broadcast system 350-3 for transmission to any of the listeners 380-1, 380-2 . . . 380-*c*.

Likewise, the broadcast system 350-3 may be any server or other computer system or device configured to receive information or data from the mixing system 350-1, or transmit any information or data to any of the listeners 380-1, 380-2 . . . 380-*c* over the network 390. In some implementations, the broadcast system 350-3 may establish one-way communications channels with the mixing system 350-1 or any of the listeners 380-1, 380-2 . . . 380-*c* in accordance with a broadcast plan (or a sequence of media content, or another schedule), or at the direction of the creators 310-1 . . . 310-*a*. The broadcast system 350-3 may also transmit or receive information or data along such communication channels, or in any other manner. The operation of the broadcast system 350-3, e.g., the establishment of connections, or the transmission of data via such connections, may be subject to the control or discretion of the creators 310-1 . . . 310-*a*.

The content sources 370-1, 370-2 . . . 370-*b* may be servers or other computer systems having media content stored thereon, or access to media content, that are configured to transmit media content to the creators 310-1 . . . 310-*a* or any of the listeners 380-1, 380-2 . . . 380-*c* in response to one or more instructions or commands from the creators 310-1 . . . 310-*a* or the mixing system 350-1. The media content stored on or accessible to the content sources 370-1, 370-2 . . . 370-*b* may include one or more advertisements, songs or media files, news programs, sports programs, weather reports or any other media files, which may be live or previously recorded. The number of content sources 370-1, 370-2 . . . 370-*b* that may be accessed by the mixing system 350-1, or the types of media content stored thereon or accessible thereto, is not limited.

The listeners 380-1, 380-2 . . . 380-*c* may also operate any type or form of computer system or device configured to receive and present media content, e.g., at least a portion of an automobile, a desktop computer, a laptop computer, a media player, a smartphone, a smart speaker, a tablet computer, a television, or a wristwatch, or others.

The mixing system 350-1, the conference system 350-2 or the broadcast system 350-3 may establish or terminate connections with the creators 310-1 . . . 310-*a*, with any of the content sources 370-1, 370-2 . . . 370-*b*, or with any of the listeners 380-1, 380-2 . . . 380-*c*, as necessary, to compile and seamlessly transmit media programs over digital channels (e.g., web-based or application-based), to devices of the creators 310-1 . . . 310-*a* or the listeners 380-1, 380-2 . . . 380-*c* in accordance with a broadcast plan, or subject to the control of the creators 310-1 . . . 310-*a*. Furthermore, in some implementations, one or more of the listeners 380-1, 380-2 . . . 380-*c*, e.g., musicians, celebrities, personalities, athletes, politicians, or artists, may also be content sources. For example, where the broadcast system 350-3 has established one-way channels, e.g., broadcast channels, with any of the listeners 380-1, 380-2 . . . 380-c, the mixing system 350-1 may terminate one of the one-way channels with one of the listeners 380-1, 380-2 . . . 380-c, and cause the conference system 350-2 to establish a two-directional channel with that listener, thereby enabling that listener to not only receive but also transmit media content to the creators 310-1 . . . 310-a or any of the other listeners.

Those of ordinary skill in the pertinent arts will recognize that any of the tasks or functions described above with respect to the mixing system 350-1, the conference system 350-2 or the broadcast system 350-3 may be performed by a single device or system, e.g., a control system, or by any number of devices or systems.

Figure 4:
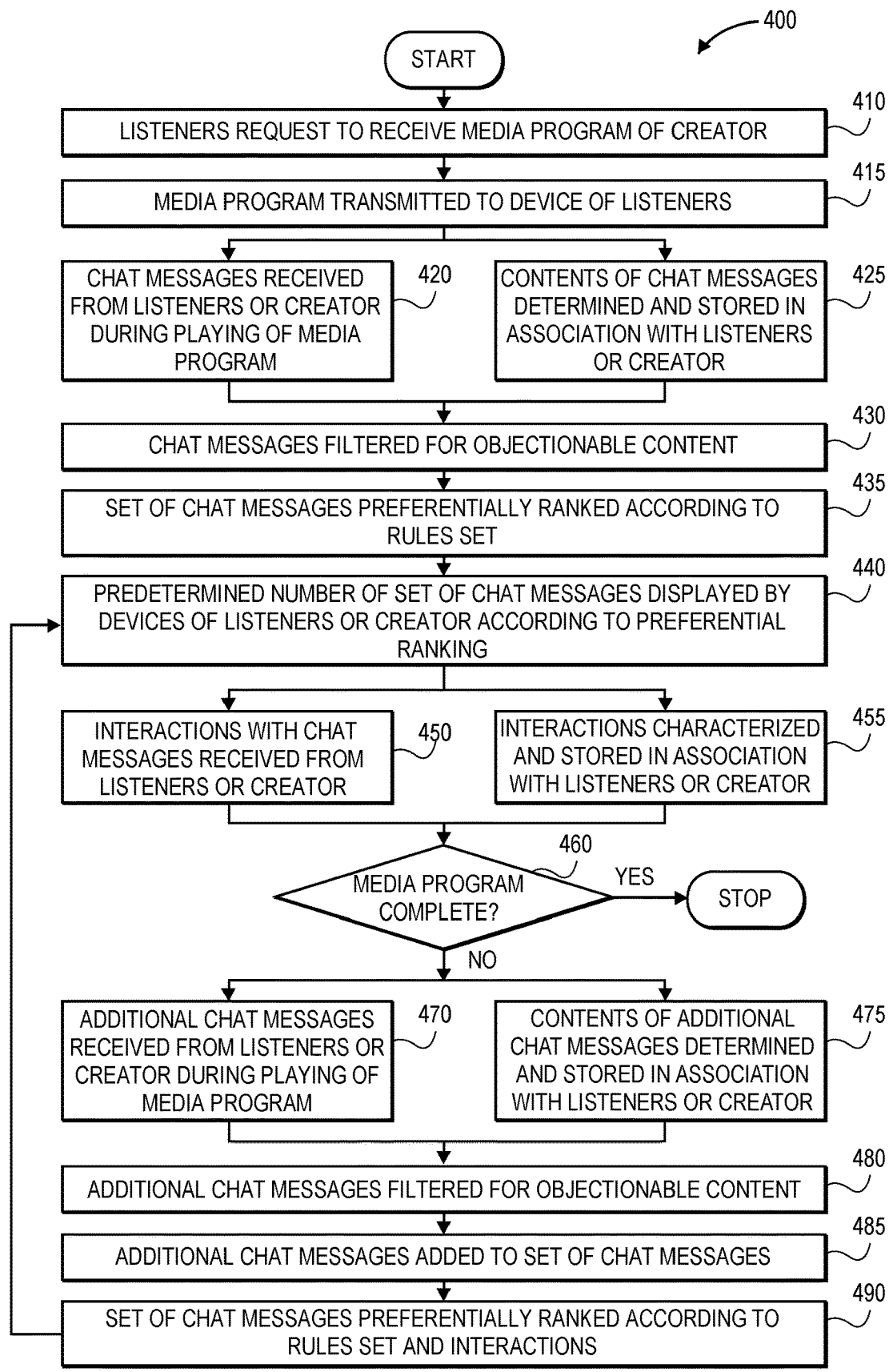
FIG. 4 is a flow chart of one process for presenting chat messages to listeners in accordance with embodiments of the present disclosure.

Referring to FIG. 4, a flow chart of one process for presenting chat messages (or text-based messages) in accordance with embodiments of the present disclosure is shown. At box 410, one or more listeners request to receive a media program associated with a creator. For example, each of the listeners may be associated with a computer device or system, such as a portion of an automobile, a desktop computer, a laptop computer, a media player, a smartphone, a smart speaker, a tablet computer, a television, or a wristwatch. The listeners may have subscribed to a media program, or otherwise requested to receive the media program, by executing one or more gestures or other interactions with a user interface or other input/output device, by providing one or more voice commands, or by taking any other relevant action to communicate an intent to receive the media program to a control system (or a mixing system, a conference system or a broadcast system) associated with the media program.

At box 415, the media program is transmitted to devices of the listeners that subscribed to or otherwise requested the media program. For example, one or more communications channels may be established between a control system, a conference system or a broadcast system and each of the devices of such listeners. Media content associated with the media program in the form of voice samples or other speech by the creator, as well as any other type or form of media content such as advertisements, music, news, sports, weather, or other programming, may be transmitted to such devices by way of such systems. The media program may also be transmitted to devices associated with the creator, or to any other devices that need not be associated with one of the listeners that requested to receive the media program at box 410, in any format. In some implementations, media content of a media program transmitted to the devices of the listeners may include audio files (e.g., music, podcasts, news, or others) of any form or format, such as one or more Advanced Audio Coding ("AAC"), Audio Interchange File Format ("AIFF"), lossless audio codec, lossless encoder, Moving Picture Experts Group (or "MPEG") Audio Layer III (e.g., "MP3"), Vorbis (e.g., Ogg Vorbis), Waveform Audio File ("WAV"), Windows Media Audio ("WMA"), or other forms or formats, and at any bit rate or level of compression (e.g., 128, 192, 256 or 320 kilobits per second).

At box 420, chat messages (or text-based messages) are received from listeners or the creator during the playing of the media program. For example, in some implementations, a user interface may be presented on a display associated with one or more of the devices of listeners, a device of the creator, or any other devices. The user interface may include one or more "widgets," application programming interfaces (e.g., "API"), or other features that are configured to receive chat messages in the form of entries of text, characters or symbols, e.g., in response to gestures or other interactions with an input/output device, or upon receiving one or more spoken commands or utterances. Each of the computer devices or systems may transmit any chat messages authored by listeners or the creator to a control system, a mixing system, a broadcast system, or to any other computer device or system, along with any information, data or metadata regarding the chat messages (e.g., identifiers of one of the listeners or the creator that authored the chat messages, as well as times or dates on which the chat messages were received) by way of the communication channels. The chat messages may be stored separately, e.g., in association with profiles of one of the listeners or the creator that authored the respective chat messages, or collectively, e.g., in one or more files or records of a data store that include information or data regarding the media program in general, or an episode or file of the media program in particular.

In parallel, at box 425, contents of the chat messages received from the listeners or the creator at box 420 are determined and stored in association with the listeners or the creator that provided the respective chat messages during the playing of the media program. For example, the text of the chat messages may be processed to identify an emotion or a sentiment of each of the chat messages, or to determine any other information or data regarding the listeners or the creator that provided the chat messages. Likewise, the times at which the chat messages were received during the playing may be determined and stored in association with the chat messages.

At box 430, the chat messages are filtered for objectionable content. For example, in some implementations, a set of words that has been identified and designated as objectionable in nature, e.g., words that are known to be or are designated as either obscene, indecent, profane or divisive, may be identified and compared to contents of each of the chat messages.

In some implementations, whether contents of a chat message are objectionable may be determined based on a total number of words in the chat message that have been identified and designated as objectionable in nature, and whether the total number exceeds one or more thresholds. Alternatively, or additionally, one or more machine learning algorithms, systems or techniques, or multiple machine learning algorithms, systems or techniques, may be utilized to determine whether any of the chat messages contains objectionable content, or determine any other attributes of the chat messages. Moreover, in some implementations, whether a chat message includes any objectionable content may be determined in any other manner, including but not limited by one or more algorithms, systems or techniques that need not rely on machine learning or like applications.

Additionally, in some implementations, whether contents of a chat message are objectionable may be determined by designation of a creator of a media program, for example, who may designate an amount or a type of content that is to be permitted or restricted in the context of the media program, at his or her discretion. Alternatively, whether contents of a chat message are objectionable may be determined by one or more objective standards that apply to all media programs, including but not limited to one or more standards established by governmental or regulatory bodies, or by one or more operators of a control system, a mixing system or a broadcast system from which the media program is transmitted to devices of listeners.

At box 435, a set of the chat messages that are determined to not contain objectionable content is preferentially ranked according to a rules set. For example, the rules set may include one or more rules that apply qualitative or quantitative scores to each of the chat messages of the set, or otherwise preferentially rank (or score) the set of chat messages with respect to one another. In some implementations, the preferential ranking may be objective in nature, e.g., a ranking or scoring for each of the chat messages of the set and with respect to all listeners. In such implementations, chat messages of the set may be identified as particularly relevant or appropriate for a listener, based on one or more attributes of that listener, and displayed to that listener. In some other implementations, however, the preferential ranking may be subjective in nature, e.g., a discrete ranking or scoring of each of the chat messages of the set with respect to a specific listener, based on one or more attributes of that listener.

In some implementations, one or more rules may assign a high score, or a highest score, to chat messages received from the creator, as compared to scores assigned to chat messages received from listeners, or may preferentially rank chat messages received from or authored by the creator above such chat messages. In some implementations, one or more rules may assign high scores to chat messages received from or authored by one or more designated guests (or participants) appearing on the media program, as compared to scores assigned to chat messages received from or authored by listeners, or may preferentially rank chat messages received from or authored by the creator above such chat messages. In some implementations, one or more rules may rank or assign scores to chat messages received from or authored by listeners (or the creator or any designated guests) based on reactions of listeners to such chat messages. For example, when a chat message is received during a playing of a media program, and presented on displays of computer devices or systems of subscribers to the media program, listeners may execute one or more gestures or other interactions with the displays or provide one or more spoken commands or utterances indicating their pleasure or displeasure with a specific chat message, such as by interacting with or selecting interactive features rendered on the displays in association with the specific chat message or a listener that authored the chat message, or by making one or more spoken commands, e.g., "I like Gavin38's chat!" or "Nicky24 is funny!," in response to the specific chat message. A rank or a score may be assigned to a chat message based on a number of reactions received from other listeners in response to the chat message, as well as a quality of the reactions, including but not limited to whether such reactions are positive, neutral or negative in nature. The rules set may include any number of rules of any type or form for assigning scores or ranking chat messages.

In some implementations, the rules set may be applied under certain conditions and not others. For example, one or more of the rules of the rules set may apply only where a number of chat messages have been received over a designated period of time, or where a number of interactions with such chat messages have been received over the designated period of time.

Additionally, in some implementations, the set of chat messages may also be ranked based on the relevance or appropriateness of each of the chat messages for a given listener. For example, in some implementations, one or more attributes of each of the listeners may be determined, e.g., from profiles or other records of each of the listeners maintained in one or more data stores by a control system, by an electronic marketplace, or any other entity. The attributes may include, for example, ages, genders or locations of the respective listeners, as well as histories of items purchased by the listeners (e.g., from an electronic marketplace), media content requested by the listeners (e.g., artists, genres, moods, playlists, podcasts, songs, videos or others), or any other relevant factors regarding the listeners.

Where a chat message references a topic that is known or believed to be of interest to a listener based on such attributes, a rank or a score may be assigned to the chat message for that listener based on a level of interest of the listener in the topic. Where a chat message references an item that is known or believed to have been purchased, rented or used by a listener, or otherwise of interest to the listener, a rank or a score may be assigned to the chat message for that listener based on a level of interest of the listener in the item. Where a chat message references a location associated with a listener, e.g., a location where the listener has lived or visited recently, or a location in which the listener has expressed an interest, a rank or a score may be assigned to the chat message for that listener based on a level of interest of the listener in the location.

At box 440, a predetermined number of the chat messages of the set is displayed according to the preferential ranking by devices of listeners that requested to receive the media program at box 410 or a device of the creator. For example, a user interface rendered by a computer device or system of a listener or the creator may include a widget or another application or feature that is configured to display one or more of the chat messages of the set. The predetermined number may be one, e.g., a highest-ranking chat message, or any positive number other than one. In some implementations, the predetermined number of chat messages may be selected based on one or more attributes of the display, such as a size or one or more other dimensions of a viewing area on the display that may accommodate chat messages. In some implementations, the predetermined number of chat messages displayed on a device of a listener or the creator may be selected by the listener or the creator. The widget, application or feature may be generated by code programmed in HTML, or any other language (e.g., Java or JavaScript).

In some implementations, the predetermined number of the chat messages may be displayed in or by the same widget, application or feature that is configured to receive chat messages entered by a listener, e.g., above, below or alongside one or more text boxes or other features for receiving such messages. In some other implementations, the predetermined number of the chat messages may be displayed in or by a widget, application or feature that is different from a widget, application or feature that is configured to receive chat messages entered by a listener.

Alternatively, in some implementations, a predetermined number of chat messages may be read aloud, e.g., by a computer device or system of a listener. For example, data for presenting the predetermined number of chat messages in an audible manner to the listener may be transmitted to the computer device or system, and aspects of the playing of media content (e.g., a volume level) by the computer device or system may be manipulated or controlled accordingly, such as by increasing or decreasing a level of volume of the media content or the chat messages, or pausing other media content to allow one or more of the chat messages to be audibly presented to the listener.

At box 450, one or more interactions with chat messages by listeners of the media program or the creator on their respective devices are received. For example, each of the chat messages may be displayed along with one or more interactive features including icons or symbols that enable a listener or the creator to visually express an opinion or a sentiment regarding the chat messages. Selections of one or more of the interactive features may be used to confirm that the listener or the creator approves of the chat message, disapproves of the chat message, or has some emotion other than approval or disapproval of the chat message.

In parallel, at box 455, the interactions are characterized and stored in association with the listeners or the creator that provided the interactions. For example, an emotion or a sentiment associated with an interaction with a chat message may be determined based on the interactive feature that was selected to express the interaction, or based on contents of the chat message. Characterizations of the interactions by each of the listeners and any associated emotions or sentiments of chat messages that were subjects of the interactions may be stored in one or more data stores. Alternatively, interactions with chat messages need not be received from or authored by any listeners.

At box 460, whether the playing of the media program is complete is determined. For example, a media program may be planned or constructed in accordance with a broadcast plan, with a predetermined start time, a predetermined end time, or a predetermined duration. The completion of the playing of the media program may, therefore, be determined at the predetermined end time or after the predetermined duration. Alternatively, or additionally, a creator may extend, shorten or otherwise modify a broadcast plan for a media program, e.g., by one or more gestures or other interactions with a user interface provided on a computer device or system operated by the creator.

If the playing of the media program is determined to be not complete at box 460, then the process advances to box 470, where additional chat messages are received from or authored by listeners or the creator during the playing of the media program, such as in the same manner discussed above with respect to box 420, or in a different manner. In parallel, at box 475, the contents of the additional chat messages received from the listeners or the creator at box 470 are determined and stored in associated with the listeners or the creator that transmitted the respective chat messages during the playing of the media program, such as in the same manner discussed above with respect to box 425, or in a different manner.

At box 480, the additional chat messages received at box 470 may be filtered for objective content, such as in the same manner described above with respect to box 430, or in a different manner.

At box 485, the additional chat messages that are determined to not contain objectionable content are added to the set of chat messages, and at box 490, the set of chat messages is preferentially ranked according to the rules set and based on the interactions with the chat messages received from or authored by the listeners or the creator. For example, ranks or scores of each of the set of chat messages may be determined, objectively or subjectively, in the same manner described above with respect to box 435, or in any different manner. The ranks or scores may consider not only one or more rules of the rules set but also the attributes of the various listeners and any interactions with the set of messages received from or authored by such listeners. The process then returns to box 440, where a predetermined number of the set of chat messages is displayed by devices of listeners according to the preferential ranking determined at box 490.

In some implementations, chat messages that are received from the creator or listeners during a "live," or initial, playing of a media program may be received and stored in association with the media program. In some other implementations, chat messages that are received during a subsequent playing of the media program may also be received and stored in association with the media program, and preferentially ranked or scored and displayed to the listeners.

As is discussed above, chat messages (or text-based messages) received from a creator of a media program, or listeners to the media program, may be filtered for objectionable content and ranked or scored according to one or more rules or based on attributes of the listeners. One or more of such chat messages may be transmitted to devices of the listeners for display in one or more user interfaces, and the listeners may interact with the chat messages to express their opinions regarding the chat messages, or for any other reason. Referring to FIGS. 5A through 5H, views of aspects of one system for presenting chat messages to listeners in accordance with embodiments of the present disclosure are shown. Except where otherwise noted, reference numerals preceded by the number "5" shown in FIGS. 5A through 5H indicate components or features that are similar to components or features having reference numerals preceded by the number "3" shown in FIG. 3, by the number "2" shown in FIG. 2A or 2B or by the number "1" shown in FIGS. 1A through 1F.

Figure 5A:
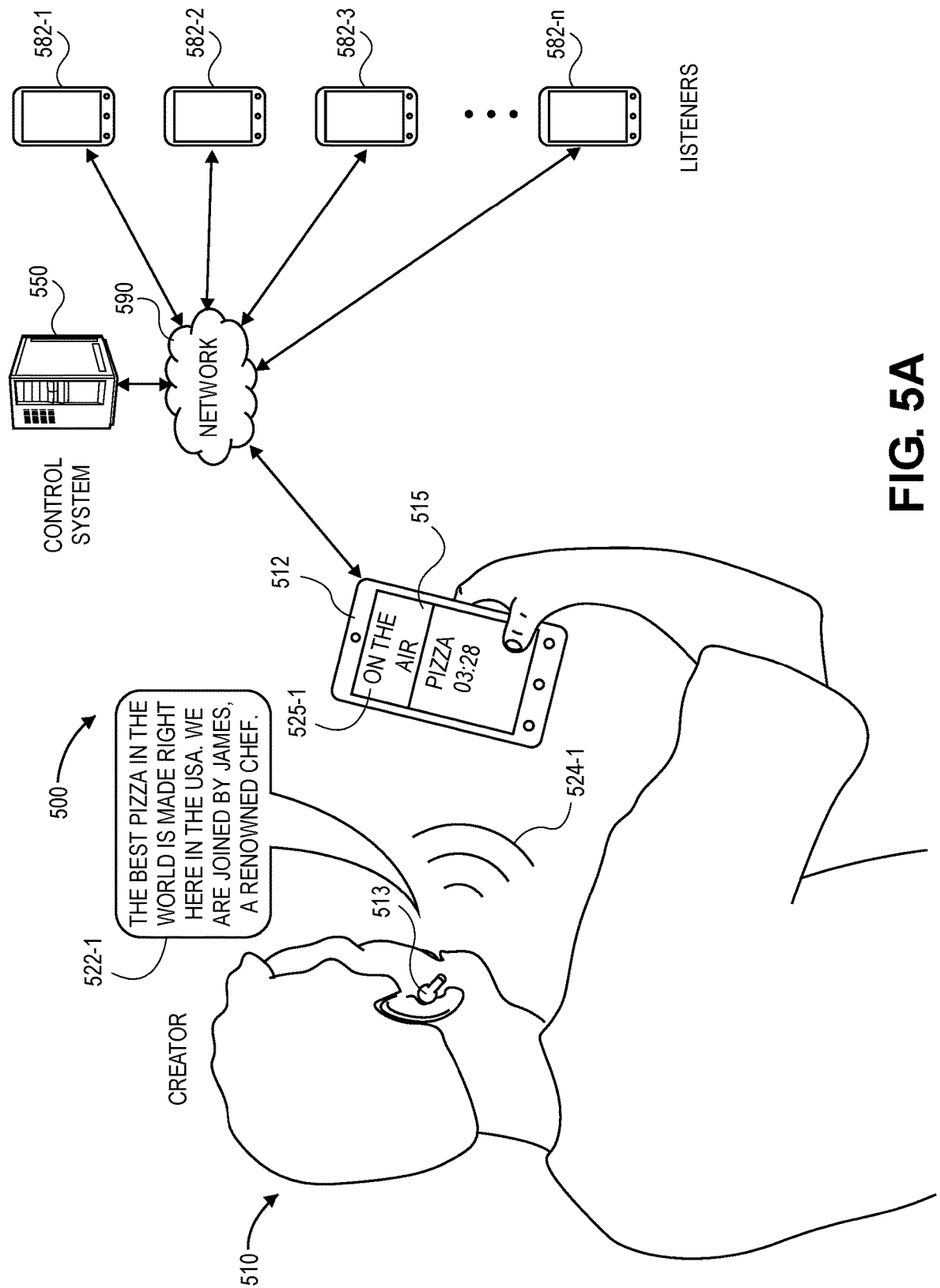

As is shown in FIG. 5A, a creator 510 of a media program provides an utterance 522-1 to a mobile device 512 (e.g., a tablet computer, a smartphone, or any other computer device or system) having one or more user interfaces 525-1 rendered on a display 515. The user interfaces 525-1 may be rendered on the display 515 by a dedicated application associated with the playing of media content or media programs, or by a general application such as a browser, e.g., by interpreting code received from a control system 550 or from any other source. Data 524-1 captured by the mobile device 512 may be transmitted to the control system 550 or to one or more devices 582-1, 582-2, 582-3 . . . 582-*n* of any number n of listeners over one or more networks 590. For example, the utterance 522-1 states that at least a portion of the media program will discuss pizza, viz., "The best pizza in the world is made right here in the USA. We are joined by James, a renowned chef" Upon receiving the data 524-1, the devices 582-1, 582-2, 582-3 . . . 582-*n* may cause one or more words of the utterance 522-1 to be played to listeners within a vicinity of the devices 582-1, 582-2, 582-3 . . . 582-*n*.

Figure 5B:
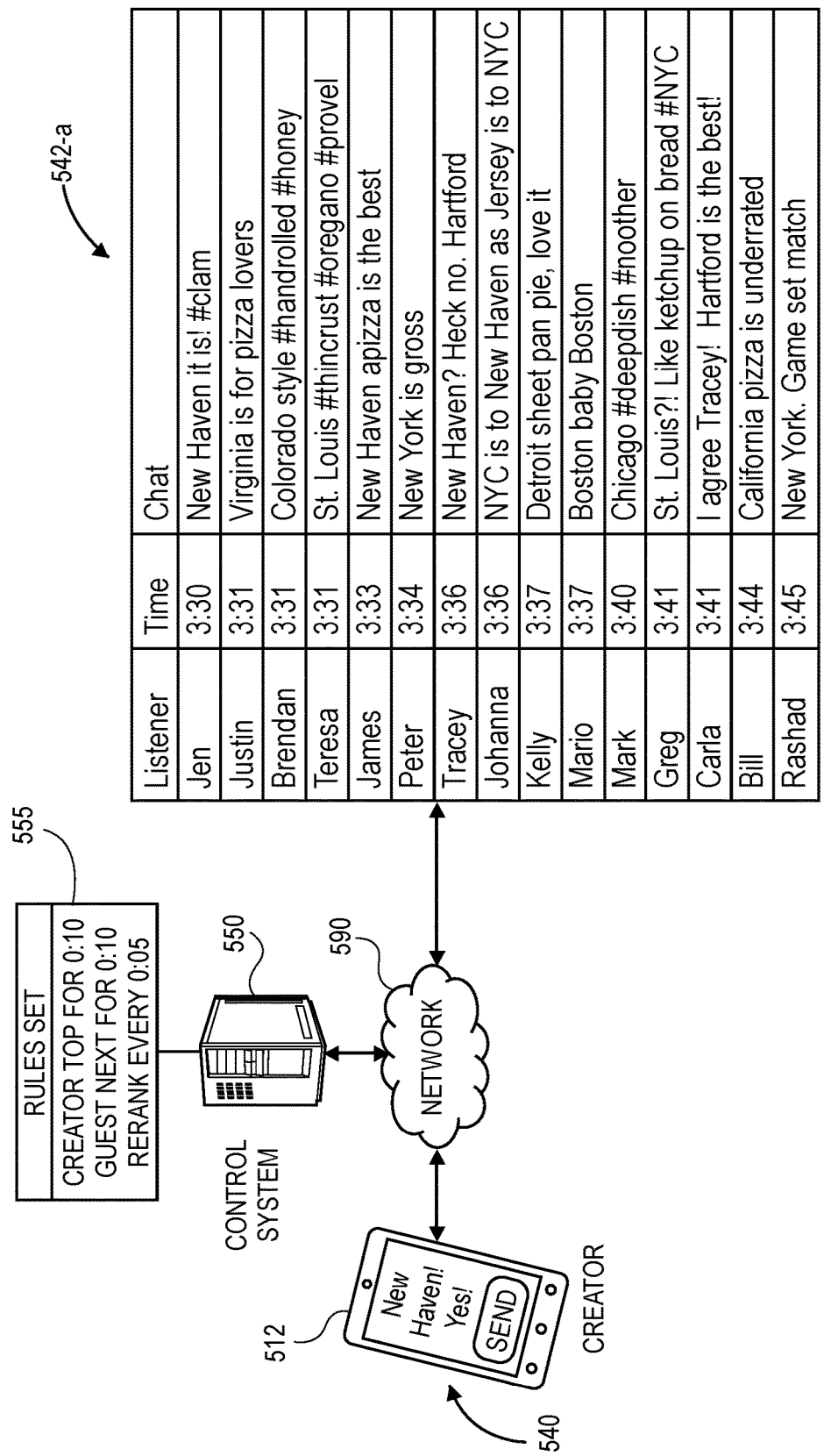

As is shown in FIG. 5B, the creator 510 or the listeners associated with the devices 582-1, 582-2, 582-3 . . . 582-*n* may provide feedback regarding the media program in general, or in response to the utterance 522-1 of the creator 510 in particular. For example, as is shown in FIG. 5B, a plurality of chat messages 542-*a* may be received from any of the devices 582-1, 582-2, 582-3 . . . 582-*n* of listeners shown in FIG. 5A. Likewise, as is also shown in FIG. 5B, a chat message (e.g., a text-based message) 540 entered by the creator 510 into one or more user interfaces provided on the mobile device 512 may be received by the control system 550 over the one or more networks 590. Information, data or metadata regarding the chat message 540 or the chat messages 542-*a*, including not only contents of the respective chat messages 540, 542-*a* but also identifiers of the creator 510 or the listeners that provided each of the chat messages 540, 542-*a*, and times at which each of the chat messages 540, 542-*a* was provided, may be stored in one or more data stores associated with the control system 550. Additionally, as is further shown in FIG. 5B, the control system 550 may be programmed with one or more sets of rules 555 for ranking or scoring chat messages received from the creator 510 or any listeners, e.g., the chat messages 540, 542-*a*. One or more of the rules 555 may require ranking chat messages received from the creator 510 or any listeners in a specific place or location in a list, or assigning a specific score to any of such messages, for any period of time. One or more of the rules 555 may also require re-ranking or re-scoring chat messages at any time or interval of time.

Figure 5C:
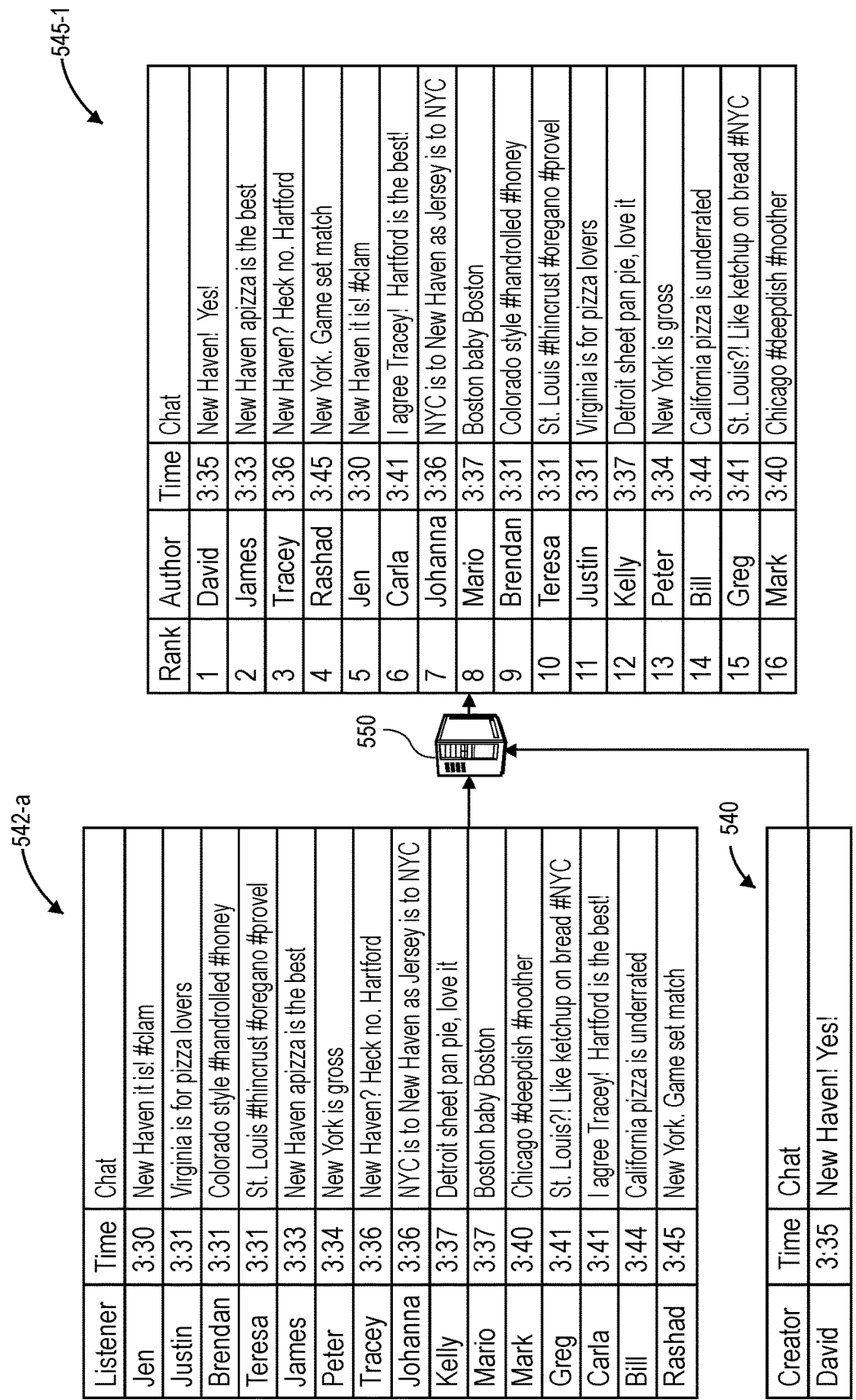

For example, as is shown in FIG. 5C, the control system 550 may process the chat message 540 received from the creator 510 and the chat messages 542-*a* received from the listeners according to the rules 555. In particular, and as is shown in FIG. 5C, the control system 550 may generate a ranked set (or a list) 545-1 of chat messages received from the creator 510 or any listeners over a period of time, including not only contents of each of the chat messages, but also a number or a ranking of each of such chat messages, as well as identifiers of authors (e.g., the creator 510 or a listener) of each of such chat messages, and times at which each of such chat messages was received. The ranked set 545-1 may be defined to include each of the chat messages 540, 542-*a*, or a subset of the chat messages 540, 542-*a*, in accordance with the rules 555. For example, as is shown in FIG. 5C, the chat message 540 received from the creator 510 is first in the ranked set 545-1, while a chat message received from a designated guest, viz., "James," is second in the ranked set 545-1, and chat messages received from listeners other than the designated guest follow thereafter in ranks defined by the rules 555.

Figure 5D:
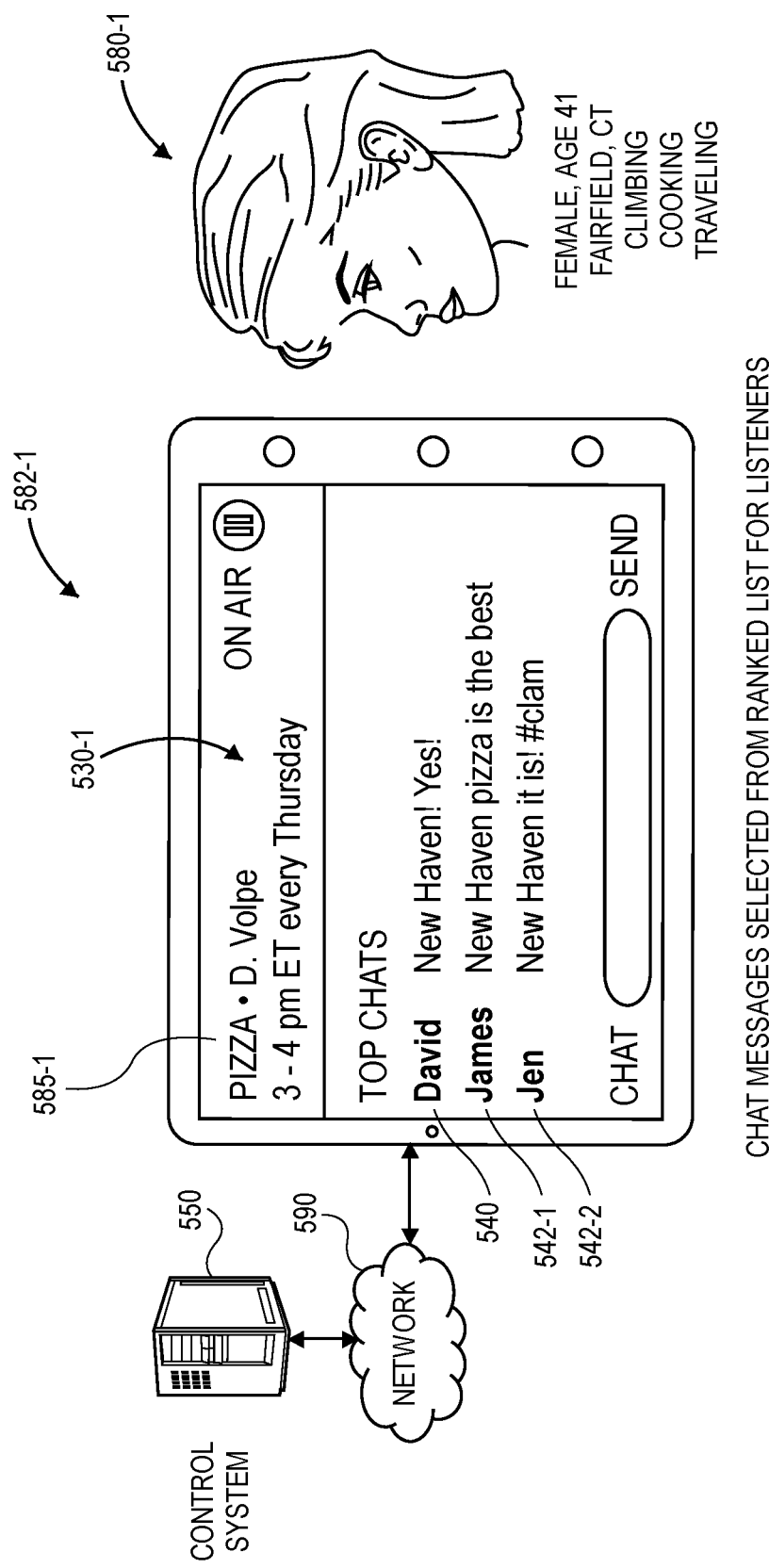

As is shown in FIG. 5D, the control system 550 transmits one or more of the chat messages in the ranked set 545-1 to a device 582-1 of a listener 580-1 over the network 590. A user interface 530-1 is rendered on a display 585-1 of the mobile device 582-1. The user interface 530-1 includes one or more identifiers or information regarding the media program, including but not limited to a title or subject of the media program, a name of the creator 510 of the media program and a time or a schedule at which the media program is typically aired, broadcast, streamed or otherwise transmitted to devices of listeners. The user interface 530-1 further includes one or more elements or features for playing, pausing, stopping, rewinding or fast-forwarding media content.

Additionally, as is also shown in FIG. 5D, the user interface 530-1 also includes a section or portion for displaying highly ranked or relevant chat messages (viz., "Top Chats") selected from the ranked set 545-1. For example, the user interface 530-1 includes the chat message 540 received from the creator 510, followed by a pair of chat messages 542-1, 542-2 selected from the ranked list 545-1 of FIG. 5C that are shown below the chat message 540. The chat messages 542-1, 542-2 may be selected based on one or more of the rules 555, as well as their respective similarity to any attributes of the listener 580-1, which may include but need not be limited to an age, a gender, a location and one or more hobbies or interests of the listener 580-1. For example, because each of the chat messages 540, 542-1, 542-2 describes or represents a geographic area or location, viz., New Haven, Conn., that is both renowned for pizza and proximate a geographic area or location of the listener 580-1, viz., Fairfield, Conn., each of such messages 540, 542-1, 542-2 may be preferentially identified or selected from the ranked set 545-1. Alternatively, chat messages may be selected for display to the listener 580-1 based on a similarity or relationship with any attribute of the listener 580-1, or on any other basis.

Figure 5E:
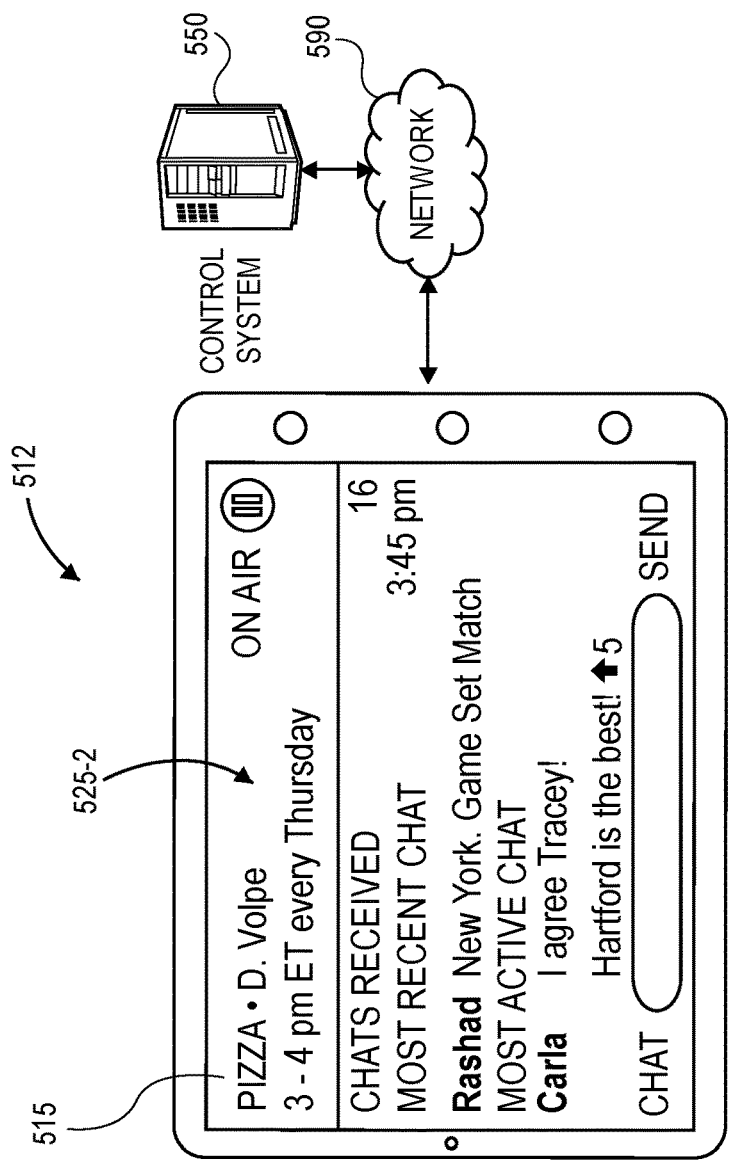
Figure 5E:
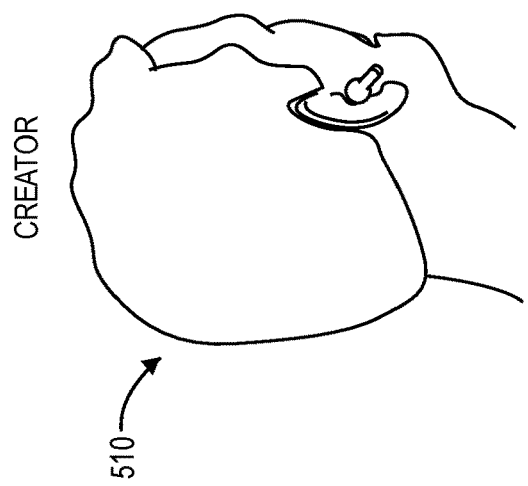

Likewise, as is shown in FIG. 5E, the control system 550 also transmits one or more of the chat messages in the ranked set 545-1 to the mobile device 512 of the creator 510 over the network 590. A user interface 525-2 is rendered on the display 515 of the mobile device 512. The user interface 525-2 also includes one or more identifiers or information regarding the media program, including but not limited to the title or subject of the media program, the name of the creator 510 of the media program and a time of day. The user interface 525-2 further includes one or more elements or features for playing, pausing, stopping, rewinding or fast-forwarding media content.

Additionally, as is shown in FIG. 5E, the user interface 525-2 also includes a summary of the chat messages included in the ranked set 545-1 and interactions received from the listeners or the creator 510. For example, the user interface 525-2 identifies a number of chat messages received (viz., sixteen), a chat message that was most recently received from listeners or the creator 510, as well as the chat message that received the greatest number of interactions from listeners or the creator 510. The summary of the user interface 525-2 may further include any other information or data regarding the chat messages or the interactions received from the listeners or the creator 510, or any other information or data.

Figure 5F:
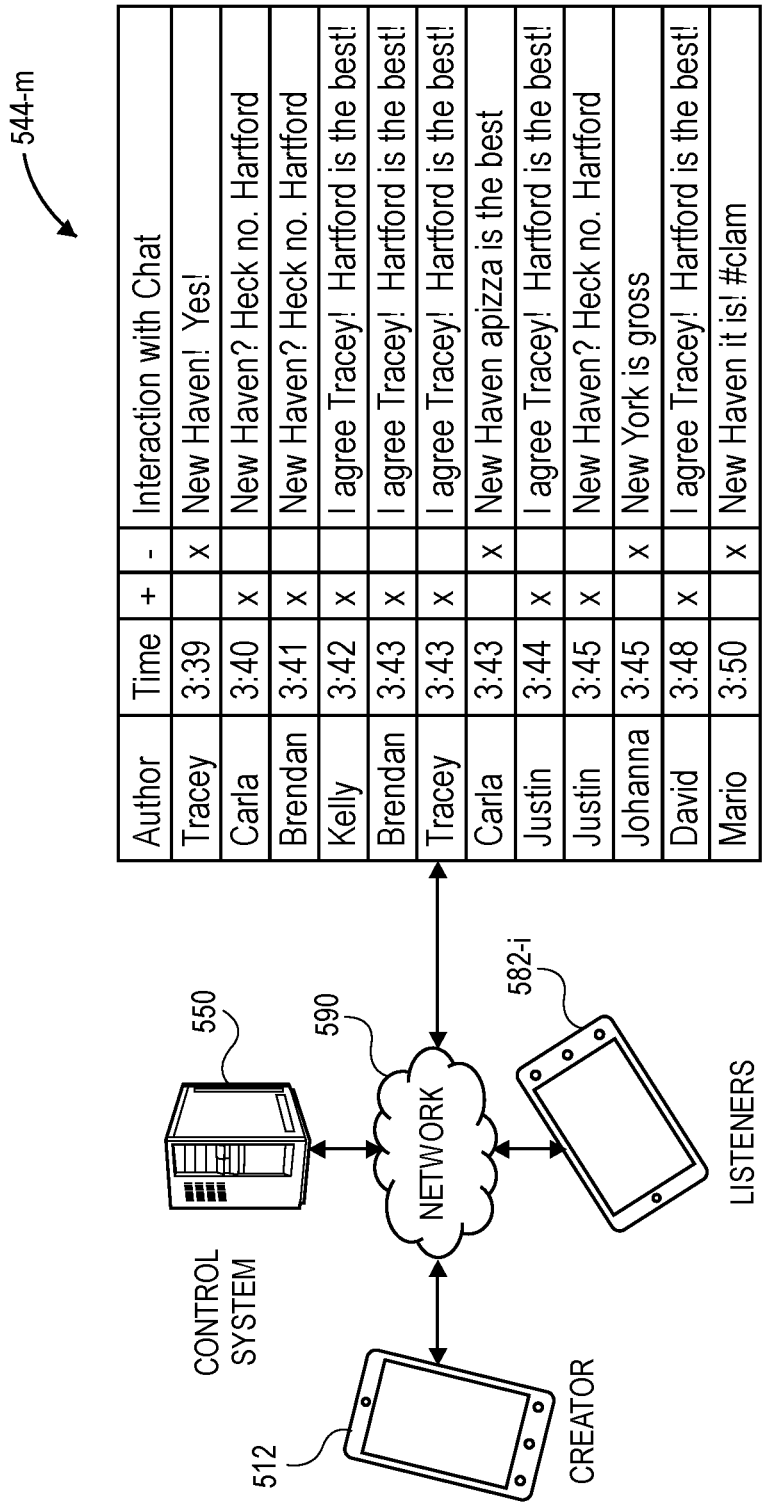

The identification and selection of chat messages to be transmitted and displayed in user interfaces rendered on devices of listeners or the creator 510, such as is shown in FIGS. 5C through 5E, may be repeated for any number of listeners or creators, and for any number of chat messages received from the creator 510 or from one or more of such listeners. Additionally, one or more interactions of any type or form may be received from the creator 510 or the listeners, such as by one or more gestures or other interactions with interactive features including icons or symbols that enable a listener or the creator to visually express an opinion regarding a given chat message. Such interactive features may be used to confirm that the listener approves of a chat message, disapproves of the chat message, or has some emotion or opinion other than approval or disapproval of the chat message, and also to display a number of interactions received from the listeners or the creator 510. As is shown in FIG. 5F, a plurality of interactions 544-*m* with one or more of the chat messages 542-*a* may be received from any of the devices 582-1, 582-2, 582-3 . . . 582-*n* of listeners shown in FIG. 5A or the mobile device 512 of the creator 510. Information, data or metadata regarding each of the interactions 544-*m*, including an identifier of an author (e.g., the creator 510 or a listener) that executed an interaction with one of the chat messages 540, 542-*a*, as well as a time at which the interaction was received, an indicator as to whether the interaction was positive or negative in nature, and an identifier (or at least a portion) of the one of the chat messages associated with the interaction may be received by the control system 550 from one or more of the devices 582-1, 582-2, 582-3 . . . 582-*n*.

As is also discussed above, chat messages that are received from a creator of a media program or one or more listeners to a media program may be ranked or scored according to a set of rules, and re-ranked or re-scored in response to interactions with such chat messages that are received from the creator or listeners. As is shown in FIG. 5G, the control system 550 receives the interactions 544-*m* with one or more of the chat messages 540, 542-*a* from any of the devices 582-1, 582-2, 582-3 . . . 582-*n* of listeners, and generates another ranked set (or a list) 545-2 of the chat messages 540, 542-*a* based on the interactions 544-*m*. For example, as is shown in FIG. 5G, the interactions 544-*m* include generally negative interactions with chat messages that endorse pizza from the geographic area or location referenced in the chat messages 540, 542-1, 542-2 shown on the user interface 530-1 of the listener 580-1, and generally positive interactions with chat messages that endorse pizza from one or more other geographic areas or locations, specifically, Hartford, Conn. Therefore, as is also shown in FIG. 5G, the control system 550 generates the ranked set 545-2 of the chat messages 540, 542-*a* in an order that upgrades or elevates ranks or scores of chat messages for which generally negative interactions were received, as compared to the ranked list 545-1, and downgrades or lowers ranks or scores chat messages for which generally positive interactions were received, as compared to the ranked list 545-2. In some implementations, the ranked set 545-2 may include chat messages other than the chat messages 540, 542-*a*, including but not limited to chat messages that are received from the devices 582-1, 582-2, 582-3 . . . 582-*n* or the mobile device 512 at a later period of time.

Figure 5H:
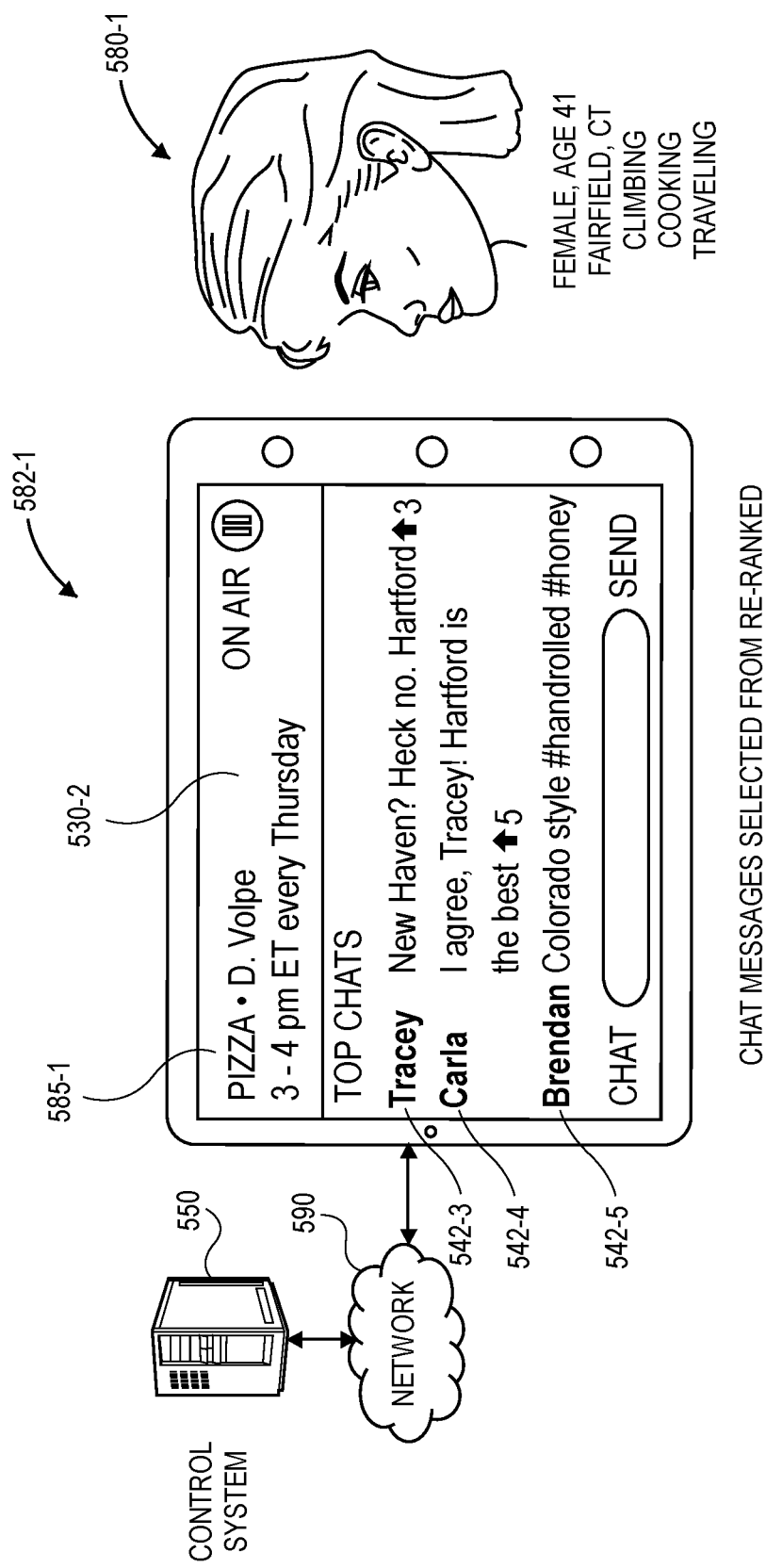

As is shown in FIG. 5H, the control system 550 transmits one or more of the chat messages in the ranked set 545-2 to the device 582-1 of the listener 580-1 over the network 590. A user interface 530-2 is rendered on the display 585-1 and includes three chat messages 542-3, 542-4, 542-5 selected from the ranked set 545-2 based on one or more attributes of the listener 580-1. For example, the chat messages 542-3, 542-4 describe or represent a geographic area or location, viz., Hartford, Conn., that is also renowned for pizza and is also proximate the geographic area or location of the listener 580-1, viz., Fairfield, Conn., while the chat message 542-5 describes or represents a geographic area or location, viz., Colorado, that is both mountainous and remote from the listener 580-1, and is thus consistent with interests of the listener 580-1 in traveling and climbing.

Figure 6A:
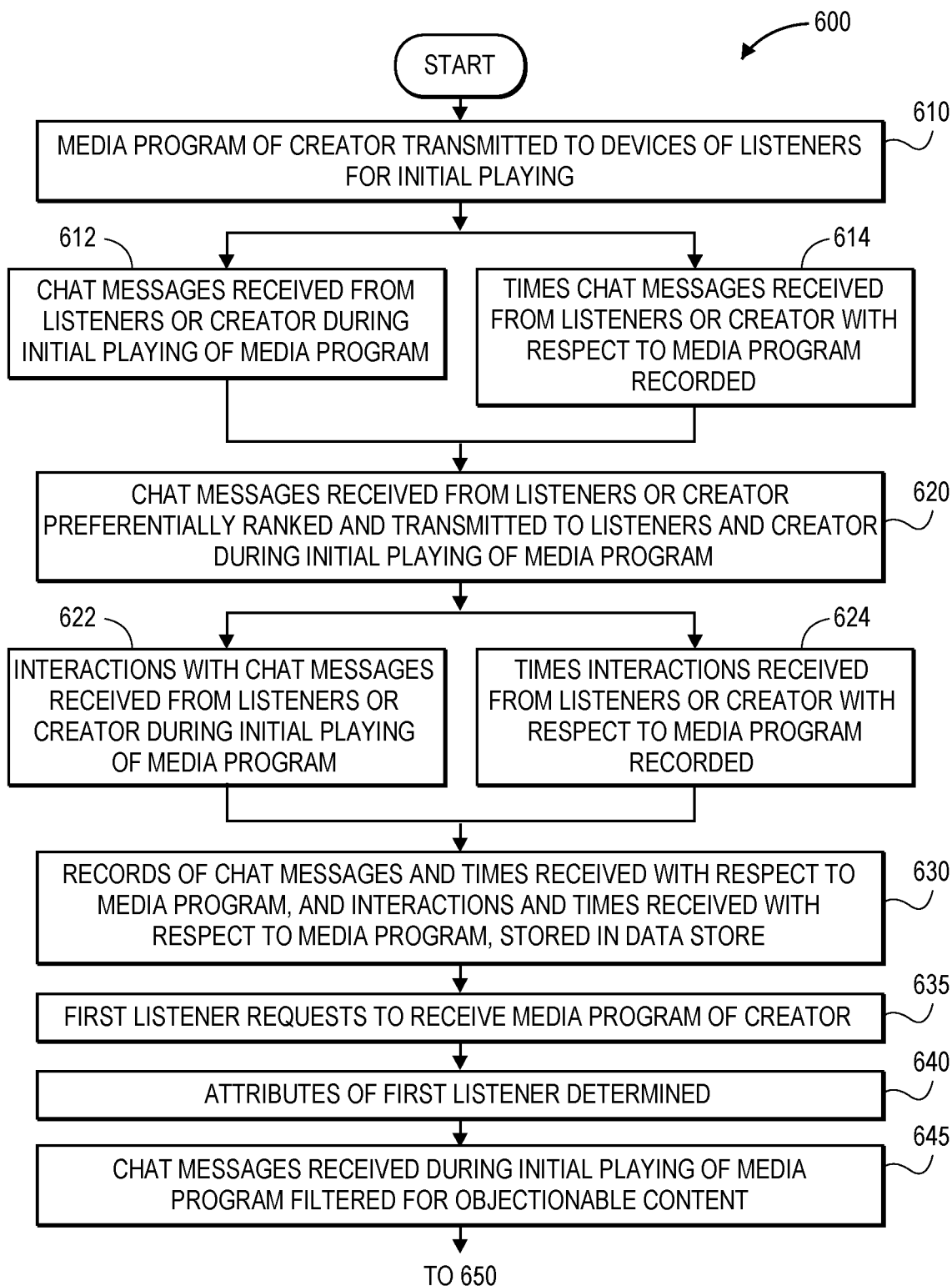
FIGS. 6A and 6B are a flow chart of one process for presenting chat messages to listeners in accordance with embodiments of the present disclosure.
Figure 6B:
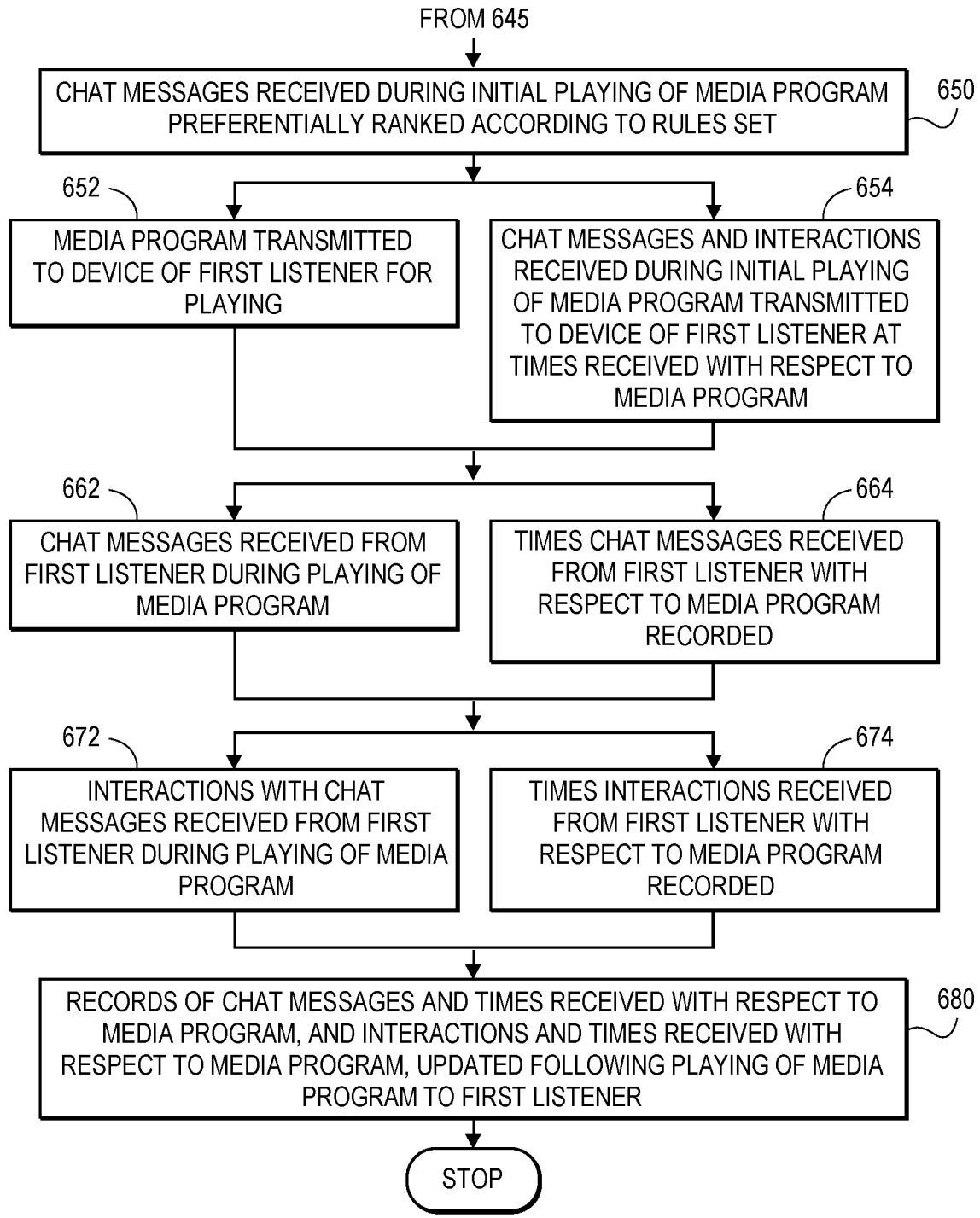

Referring to FIG. 6, a flow chart of one process 600 for presenting chat messages in accordance with embodiments of the present disclosure is shown. At box 610, a media program is transmitted to devices of one or more listeners, who may have subscribed to or otherwise requested the media program, for an initial playing. Communications channels may be established between a broadcast system and each of the devices of such listeners, and media content associated with the media program such as speech by the creator, or any advertisements, music, news, sports, weather, or other programming, may be transmitted to such devices. The media program may be transmitted to the devices of the listeners for a "live," or first-time, playing in accordance with a broadcast plan or other schedule. The media program may also be transmitted to devices associated with the creator, or to any other devices that need not be associated with listeners that requested to receive the media program, including but not limited to devices that are provided in bars, restaurants, transit stations, shopping centers, or elsewhere, and configured to play media content to any number of individuals, such as in a public or unrestricted setting.

At box 612, chat messages are received from listeners or the creator during the initial playing of the media program. For example, in some implementations, user interfaces may be presented on displays of one or more of the devices of listeners, a device of the creator, or any other devices. Such user interfaces may include one or more widgets, APIs or other features that are configured to receive chat messages in the form of entries of text, characters or symbols, e.g., in response to gestures or other interactions with an input/output device, or upon receiving one or more spoken commands or utterances. Such devices may transmit any chat messages entered by listeners to the broadcast system, or to any other computer device or system, by way of the communication channels. Chat messages received from devices of listeners during a media program may be stored separately, e.g., in association with profiles of each of the listeners, or collectively, e.g., in one or more files or records of a data store that include information or data regarding the media program in general, or information or data regarding an episode or file of the media program in particular.

In parallel, at box 614, times at which the chat messages were received from the listeners or the creator are recorded with respect to the media program. For example, when a chat message is received from a listener or the creator five minutes after the media program began, a time (e.g., a time stamp) of five minutes is recorded with respect to the media program for that chat message.

At box 620, chat messages received from listeners or the creator are preferentially ranked and transmitted to devices of the listeners and the creator during the initial playing of the media program. For example, the chat messages may be preferentially ranked (or scored) according to a rules set or in any other manner, e.g., qualitatively or quantitatively, and on any basis, such as one objective ranking for all listeners to the media program, or subjective rankings for each listener to the media program based on one or more attributes of the respective listeners. In some implementations, chat messages received from a creator, a designated guest (or participant), or a listener may be ranked or scored according to one or more rules, which may define how a chat message is to be ranked or scored based on an identity of an author of the chat message; one or more attributes of the author of the chat message; a time or a date on which the chat message was received; content (e.g., one or more words) of the chat message; or any other factor. Additionally, in some implementations, the chat messages may be filtered for objectionable content.

At box 622, one or more interactions with the chat messages are received from the listeners or the creator during the initial playing of the media program. The interactions may be gestures or other interactions with a chat message displayed on a user interface via a touchscreen, a mouse, a trackpad or another pointing device, e.g., by contacting the chat message on the user interface, or by selecting one or more icons or other selectable features associated with the chat message. Alternatively, the interactions may be one or more spoken utterances or commands identifying a chat message that are captured by one or more microphones or other acoustic sensors. The interactions may be one or more expressions of approval, disapproval, or any other opinion or emotion regarding one or more of the chat messages.

In parallel, at box 624, times at which each of the interactions is received from the listeners or the creator are recorded with respect to the initial playing of the media program. For example, when an interaction with a chat message is received from a listener or the creator thirty seconds after the chat message is displayed to the user two minutes into the media program, a time (e.g., a time stamp) of two minutes, thirty seconds, is recorded with respect to the media program for that interaction.

At box 630, records of the chat messages and the times with respect to the media program at which the chat messages were received, and interactions with chat messages and the times with respect to the media program at which the interactions were received, are stored in one or more data stores. The records may include any information, data or metadata regarding the chat messages or the interactions, including but not limited to identities of a listener (or the creator) that authored each of the chat messages or an emotion or sentiment associated with each of the interactions, e.g., "positive," "negative" or "neutral," or in any qualitative or quantitative manner, including existing or recognized terms or variables for defining a sentiment such as "happy" or "sad," as well as any custom-defined terms or variables. The media program may be stored in the one or more data stores in a manner that enables the media program to be requested or retrieved therefrom and transmitted to one or more devices of listeners, e.g., "on demand," over one or more networks.

At box 635, a first listener requests to receive the media program of the creator. The first listener may request to receive the media program in any manner, and by any type or form of computer device or system. In some implementations, the first listener may request to receive the media program by visiting one or more network sites associated with the creator, the broadcast system or the media program, or by executing a dedicated application associated with the creator, the broadcast system or the media program, and selecting the media program by one or more gestures or other interactions. Alternatively, the first listener may request to receive the media program in any other manner.

At box 640, one or more attributes of the first listener are determined. The attributes of the first listener may be retrieved from one or more records or files (e.g., a profile) maintained by the broadcast system, by an electronic marketplace, or any other entity. The attributes may include, but need not be limited to, an age of the first listener, a gender of the first listener, a location of the first listener, a record of one or more items purchased by the first listener (e.g., from an electronic marketplace), a history of media content (e.g., descriptors of such media content) requested or played by the first listener, or any other relevant factor regarding the first listener.

At box 645, the chat messages received during the initial playing of the media program are filtered for objectionable content. For example, in some implementations, each of the chat messages may be compared to one or more sets of words that have been identified and designated as objectionable, provided to a machine learning system trained to identify objectionable words or sentiments, or otherwise processed in any manner to determine whether any of the chat messages is objectionable in nature. Alternatively, in some implementations, the chat messages need not be filtered for objectionable content, such as where the media program is intended for or dedicated to one or more adults or other persons of sufficient age. At box 650, the chat messages received during the initial playing that have been determined to not contain objectionable content are preferentially ranked according to the rules set.

At box 652, the media program is transmitted to the device of the first listener for playing, e.g., over one or more communications channels established between the broadcast system and the device of the first listener. In parallel, at box 654, the chat messages and the interactions with such chat messages that were received during the initial playing of the media program are transmitted to the device of the first listener at the times at which each was received with respect to the media program. For example, as the media program is being streamed or otherwise transmitted to the device of the first listener, a chat message that is ranked, scored or otherwise identified as relevant to the first listener may be transmitted to the device of the first listener at a time with respect to the media program at which the chat message was received during the initial playing of the media program, e.g., a time following a beginning of the media program, which may be maintained in one or more of the records stored in the one or more data stores at box 630, and displayed to the first listener in one or more user interfaces, such as the user interface 130-2 shown in FIG. 1F, or any other user interface. Likewise, information or data regarding any interactions with chat messages transmitted to the device of the first listener may also be transmitted to the device of the first listener at times with respect to the media program at which such interactions were received during the initial playing of the media program, e.g., times following the beginning of the media program, which may be maintained in one or more of the records stored in the one or more data stores at box 630, and displayed to the first listener in one or more user interfaces.

At box 662, one or more chat messages are received from the first listener during the playing of the media program. For example, the first listener may provide one or more chat messages in response to media content of the media program, or in response to one or more chat messages or interactions with such chat messages provided by other listeners, e.g., during the initial playing of the media program. In parallel, at box 664, the times at which the chat messages were received from the first listener, with respect to the media program, are recorded. Alternatively, in some implementations, the first listener need not provide any chat messages during the playing of the media program.

At box 672, one or more interactions with chat messages are received from the first listener during the playing of the media program. For example, the first listener may provide one or more interactions with chat messages provided by the creator, or other listeners, or a designated guest, in response to media content of the media program, or in response to one or more chat messages or interactions with such chat messages provided by other listeners, e.g., during the initial playing of the media program. In parallel, at box 674, the times at which the interactions with the chat messages were received from the first listener, with respect to the media program, are recorded. Alternatively, in some implementations, the first listener need not provide any interactions with chat messages during the playing of the media program.

At box 680, records of chat messages and times at which chat messages were received with respect to the media program, and interactions with the chat messages and times at which such interactions were received with respect to the media program, are updated following the playing of the media program to the first listener, based on the chat messages and the times at which chat messages were received with respect to the media program at box 662 and box 664, and interactions with the chat messages and the times at which such interactions were received with respect to the media program at box 672 and box 674, and the process ends.

Referring to FIGS. 7A through 7I, views of aspects of one system 700 for presenting chat messages to listeners in accordance with embodiments of the present disclosure are shown. Except where otherwise noted, reference numerals preceded by the number "7" shown in FIGS. 7A through 7I indicate components or features that are similar to components or features having reference numerals preceded by the number "5" shown in FIGS. 5A through 5H, by the number "3" shown in FIG. 3, by the number "2" shown in FIG. 2A or 2B or by the number "1" shown in FIGS. 1A through 1E.

Figure 7A:
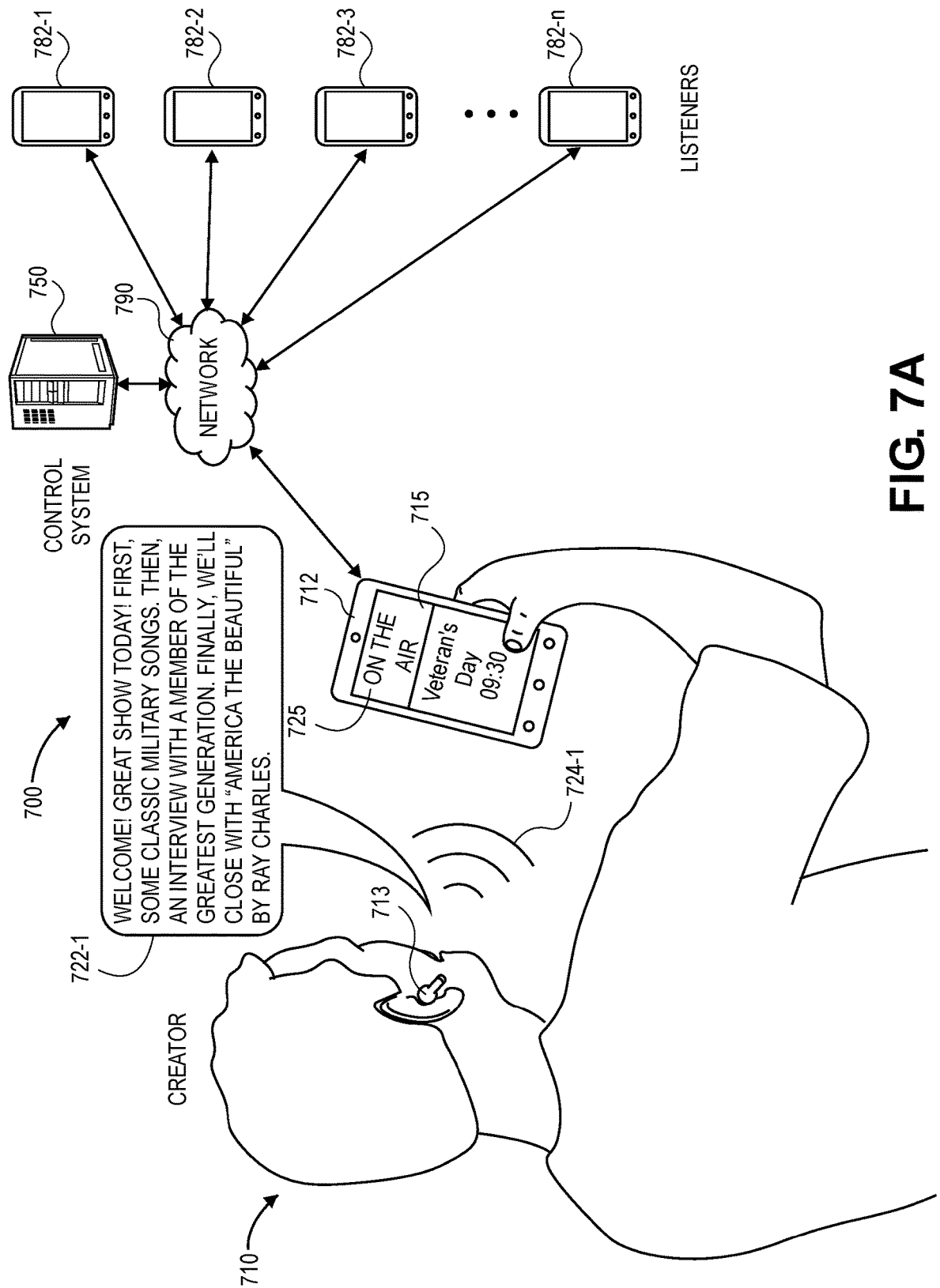
FIGS. 7A through 7I are views of aspects of one system for presenting chat messages to listeners in accordance with embodiments of the present disclosure.

As is shown in FIG. 7A, a creator 710 of a media program provides an utterance 722-1 to a mobile device 712 (e.g., a tablet computer, a smartphone, or any other computer device or system) having one or more user interfaces 725 rendered on a display 715. Data 724-1 captured by the mobile device 712 may be transmitted to a control system 750 or to one or more devices 782-1, 782-2, 782-3 . . . 782-*n* of any number n of listeners over one or more networks 790. As is shown in FIG. 7A, the utterance 722-1 welcomes the listeners to the media program, and describes a broadcast plan or a theme of at least a portion of the media program, viz., "Welcome! Great show today! First, some classic military songs. Then, an interview with a member of the Greatest Generation. Finally, we'll close with 'America, the Beautiful,' by Ray Charles." Upon receiving the data 724-1, the devices 782-1, 782-2, 782-3 . . . 782-*n* may cause one or more words of the utterance 722-1 to be played, e.g., to listeners within a vicinity of the devices 782-1, 782-2, 782-3 . . . 782-*n*.

Figure 7B:
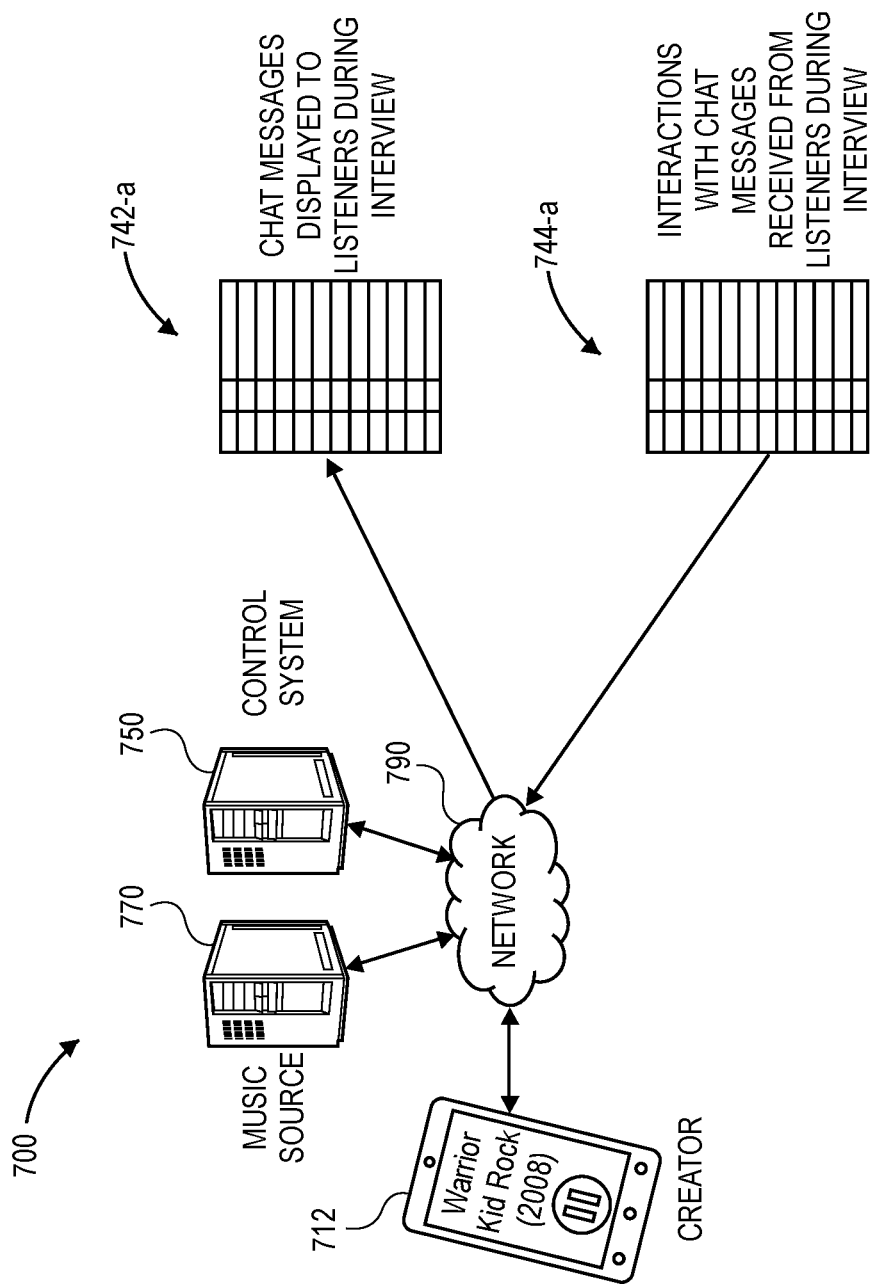

As is discussed above, during the media program, the creator 710 or one or more listeners to the devices 782-1, 782-2, 782-3 . . . 782-*n* may provide chat messages, or text-based messages, by entering one or more sets of texts into sections or portions of user interfaces rendered on the devices 782-1, 782-2, 782-3 . . . 782-*n* at various times during the media program. For example, as is shown in FIG. 7B, as the control system 750 causes media content (e.g., songs or other forms of music) to be transmitted to the mobile device 712 or the devices 782-1, 782-2, 782-3 . . . 782-*n* by a music source 770, or a repository, which may be one or more computer systems or devices containing music files stored thereon, a set of chat messages 742-*a* is received from one or more authors (e.g., the creator 710 or any listeners) during the playing of music, and a set of interactions 744-*a* with one or more of the chat messages 742-*a* are also received.

Figure 7C:
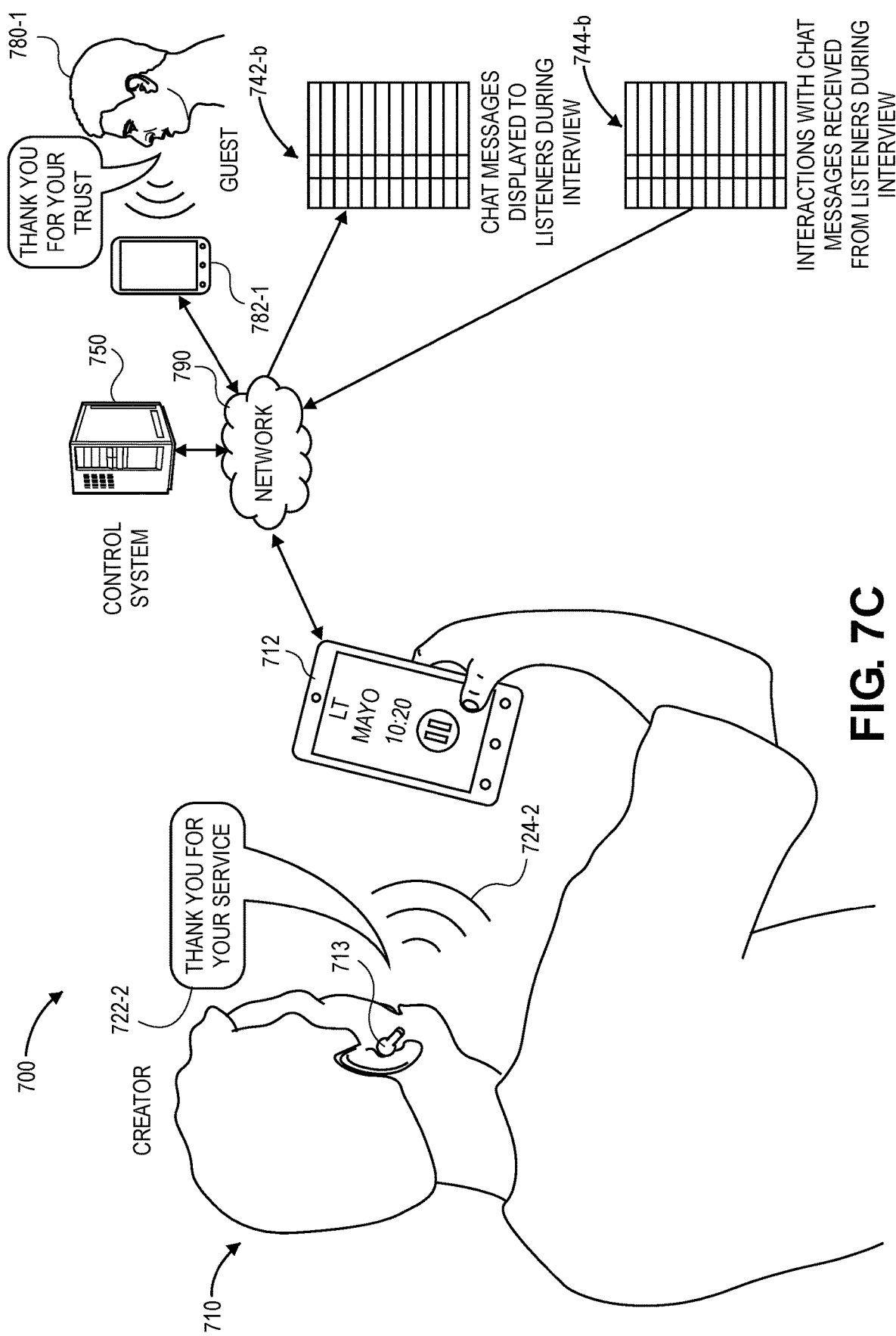
Figure 7D:
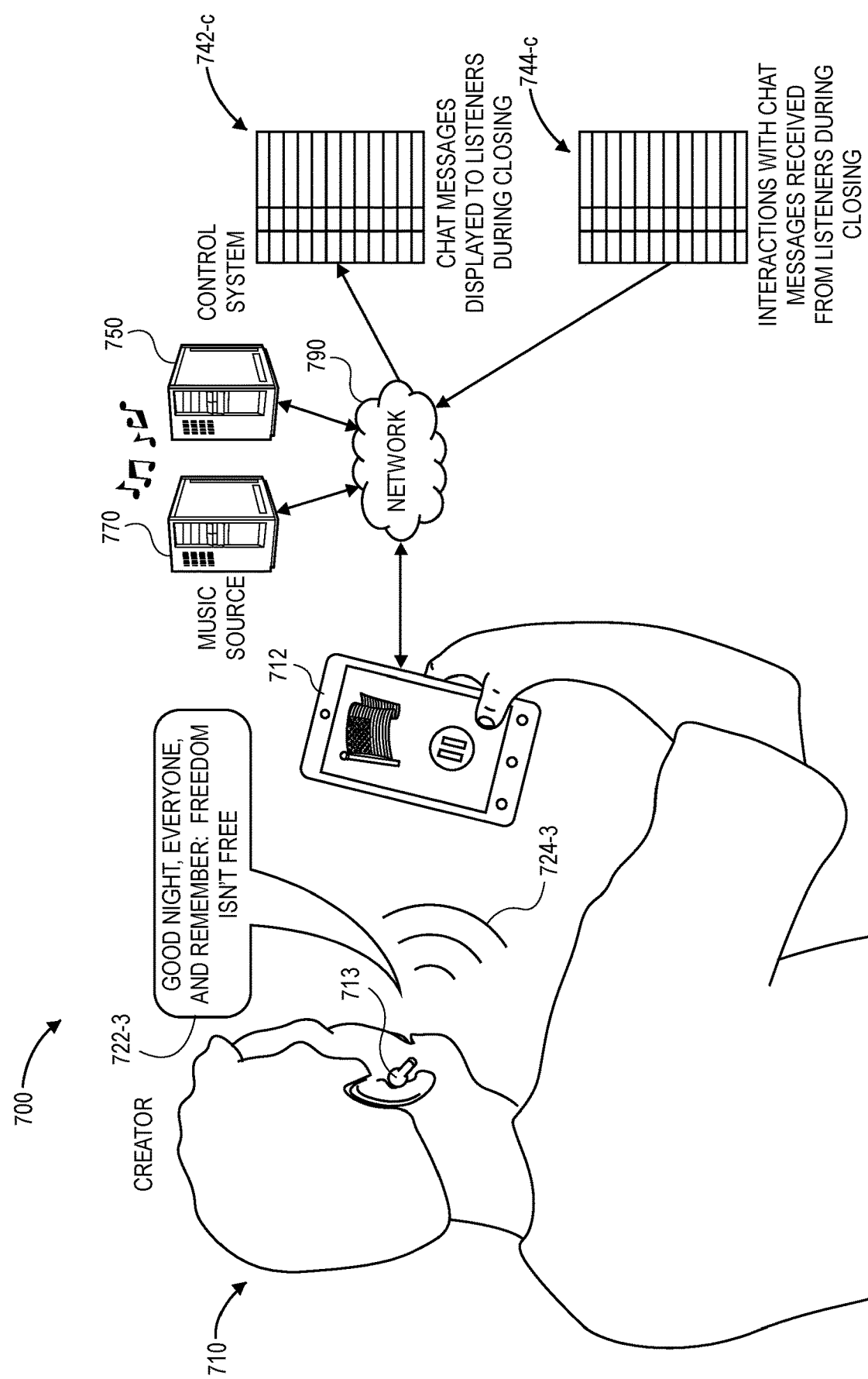

Similarly, as is shown in FIG. 7C, as the control system 750 manages an interview between the creator 710 and a listener 780-1, by way of the mobile device 712 and the device 782-1, a set of chat messages 742-*b* is received from one or more authors during the interview, and a set of interactions 744-*b* with one or more of the set of chat messages 742-*b* are also received. Likewise, as is shown in FIG. 7D, as the control system 750 presents media content from both the mobile device 712 (e.g., spoken utterances of the creator 710) and the media source 770 (e.g., songs or other forms of music), a set of chat messages 742-*c* is received from one or more authors as the creator 710 is speaking or as music is streamed or otherwise transmitted from the music source 770 to devices of the listeners, and a set of interactions 744-*c* with one or more of the set of chat messages 742-*c* is also received.

Figure 7E:
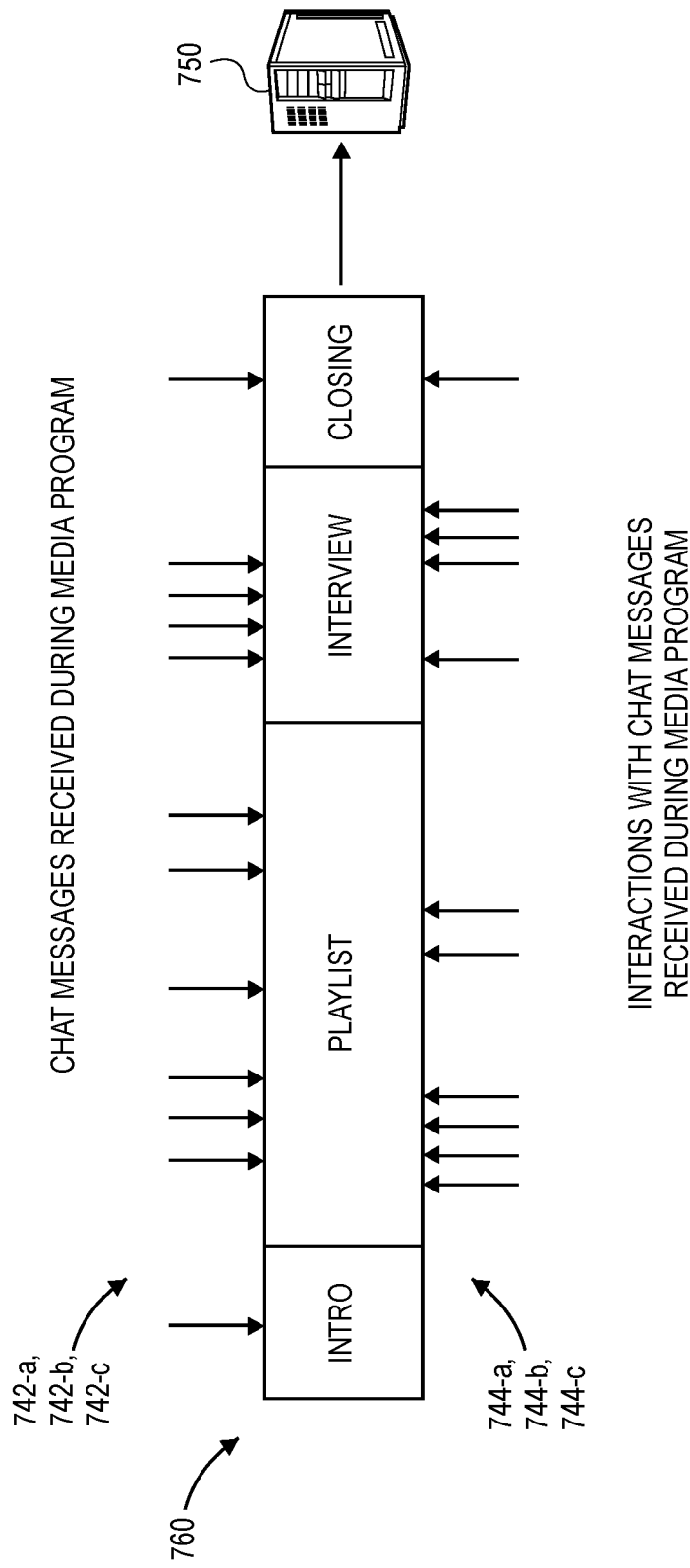

As is shown in FIG. 7E, after the media program is complete, one or more records of the chat messages 742-*a*, 742-*b*, 742-*c* are received and stored by the control system 750. Likewise, one or more records of the interactions 744-*a*, 744-*b*, 744-*c* with the chat messages 742-*a*, 742-*b*, 742-*c* are also received and stored by the control system 750. For example, each of the chat messages 742-*a*, 742-*b*, 742-*c* and the interactions 744-*a*, 744-*b*, 744-*c* may be stored in association with the times with respect to the media program 760 at which such chat messages and interactions were received, e.g., times following a beginning of the media program 760, or a time at which a playing of the media program 760 began. In some implementations, the records of the chat messages 742-*a*, 742-*b*, 742-*c* and the interactions 744-*a*, 744-*b*, 744-*c* may be stored as metadata, or in one or more layers or other aspects of files including media content of the media program 760.

Subsequently, one or more chat messages or interactions received during a prior playing of the media program 760, e.g., a "live" or an initial playing of the media program 760, may be selected and transmitted to a device during a later playing of the media program 760, e.g., a prerecorded or "on demand" playing of the media program 760, at the times with respect to the media program at which such chat messages and interactions were received. The chat messages that are displayed on devices of listeners may be ranked or scored and selected on any basis in accordance with implementations of the present disclosure.

Figure 7F:
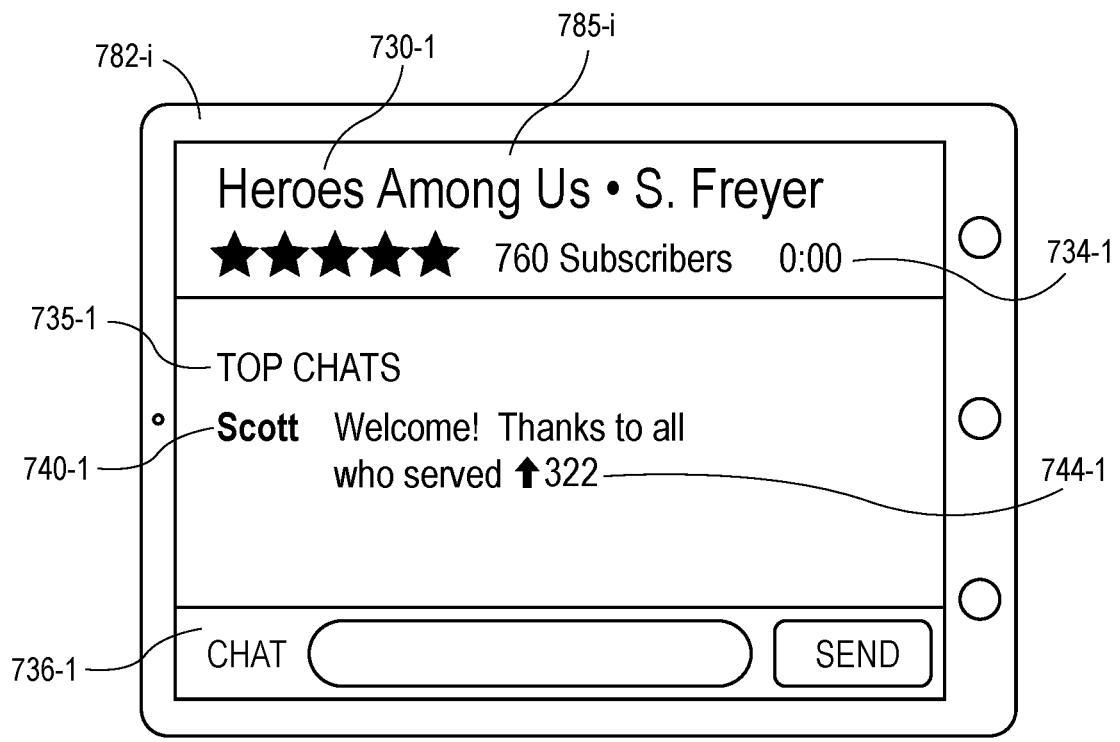

As is shown in FIG. 7F, during the playing of the media program 760, a representative mobile device 782-*i* of the devices 782-1, 782-2, 782-3 . . . 782-*n* displays a user interface 730-1 including a plurality of sections 734-1, 735-1, 736-1 on a display 785-*i*. The section 734-1 of the user interface 730-1 is provided at an upper edge or area of the display 785-*i*, and includes one or more identifiers or information regarding the media program 760, e.g., a title, a name of the creator 710, a rating, a number of subscribers and a time with respect to the beginning of the media program 760. The section 735-1 is provided in a substantially central area of the display 785-*i*, and includes a space for displaying highly ranked or relevant chat messages (viz., "Top Chats") received from the creator 710 or any listeners. In particular, as is shown in FIG. 7F, the section 735-1 includes a chat message 740-1 received from the creator 710, viz., "Scott," that includes text or commentary opening the media program 760, viz., "Welcome! Thanks to all who served." The chat message 740-1 is displayed within the section 735-1 at a time with respect to the beginning of the media program 760 at which the chat message 740-1 was received, and is accompanied by an interactive feature 744-1 for interacting with the chat message 740-1. The interactive feature 744-1 visually indicates that three hundred twenty-two interactions with the chat message 740-1 have been received from listeners or the creator 710. The section 736-1 is provided at a lower edge or area of the user interface 730-1, and includes one or more text boxes for receiving text entered by the listener 780-1 and a selectable feature for transmitting a text-based message including such text to the control system 750.

Figure 7G:
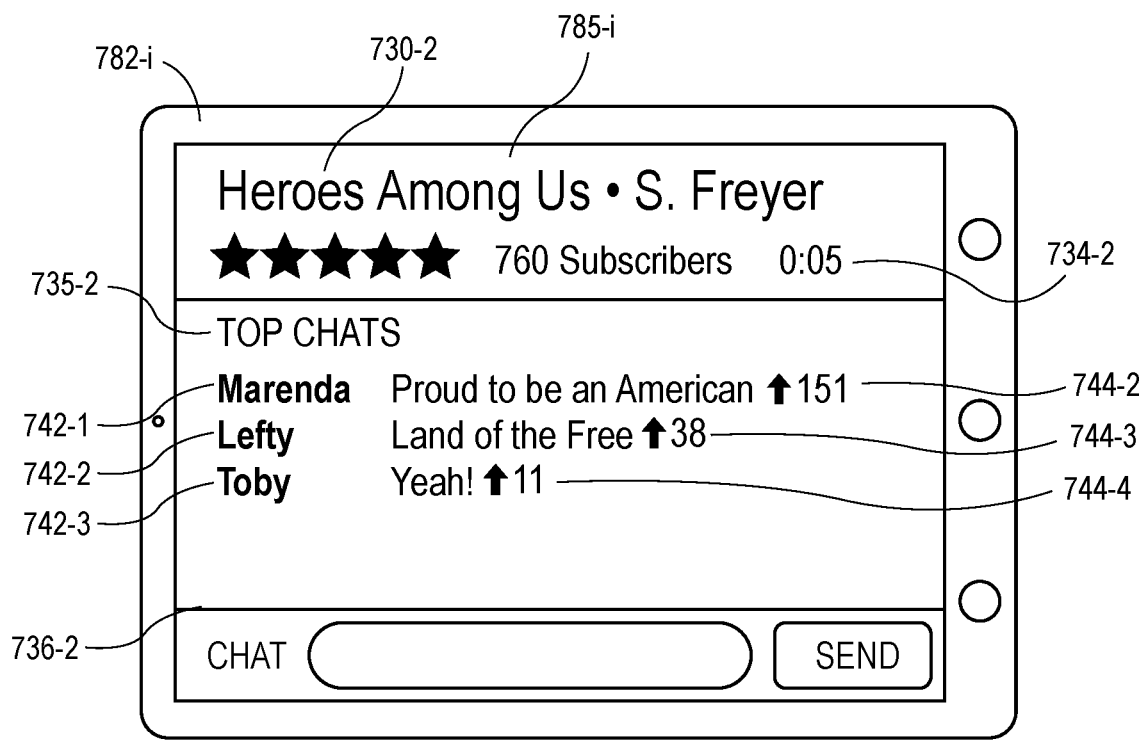

As is shown in FIG. 7G, after at least a portion of the media program 760 has played, a user interface 730-2 including sections 734-2, 735-2, 736-2 is rendered on the display 785-*i* during the playing of music in accordance with a broadcast plan of the media program 760. The section 734-2 includes the same or similar information or data as the section 734-1 of the user interface 730-1, except that the time with respect to the beginning of the media program 760 has changed. The section 735-2 includes a set of chat messages 742-1, 742-2, 742-3 that were not previously displayed on the user interface 730-1, including messages provided by listeners in response to selections of music. The chat messages 742-1, 742-2, 742-3 may be displayed within the section 735-2 at times with respect to the beginning of the media program 760 at which the chat messages 742-1, 742-2, 742-3 were received, and are accompanied by interactive features 744-2, 744-3, 744-4, which visually indicate that one hundred fifty-one interactions with the chat message 742-1, thirty-eight interactions with the chat message 742-2 and eleven interactions with the chat message 742-3 have been received from listeners or the creator 710. The section 736-2 is provided at a lower edge or area of the user interface 730-2, and includes one or more text boxes for receiving text entered by the listener 780-1 and a selectable feature for transmitting a text-based message including such text to the control system 750.

Figure 7H:
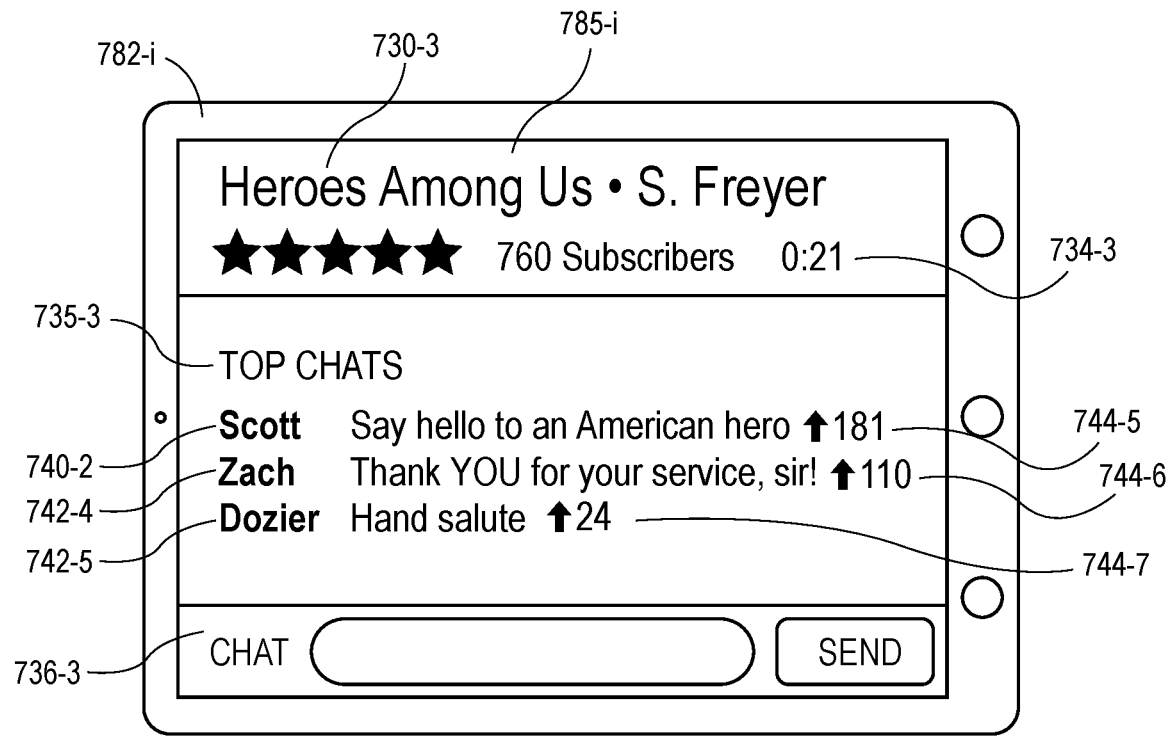

As is shown in FIG. 7H, after one or more other portions of the media program 760 have played, a user interface 730-3 including sections 734-3, 735-3, 736-3 is rendered on the display 785-*i* during the interview between the creator 710 and the listener 780-1 in accordance with a broadcast plan of the media program 760. The section 734-3 includes the same or similar information or data as the section 734-2 of the user interface 730-2, except that the time with respect to the beginning of the media program 760 has changed. The section 735-3 includes a set of chat messages 740-2, 742-4, 742-5 that were not previously displayed on the user interface 730-2, but includes a message provided by the creator 710 (viz., the chat message 740-2) and the one or more listeners (viz., the chat messages 742-4, 742-5) in response to the interview. The chat messages 740-2, 742-4, 742-5 may be displayed within the section 735-3 at times with respect to the beginning of the media program 760 at which the chat messages 740-2, 742-4, 742-5 were received, and are accompanied by interactive features 744-5, 744-6, 744-7, which visually indicate that one hundred eighty-one interactions with the chat message 740-2, one hundred ten interactions with the chat message 742-4 and twenty-four interactions with the chat message 742-5 have been received from listeners or the creator 710. The section 736-3 is provided at a lower edge or area of the user interface 730-3, and includes one or more text boxes for receiving text entered by the listener 780-1 and a selectable feature for transmitting a text-based message including such text to the control system 750.

Figure 7I:
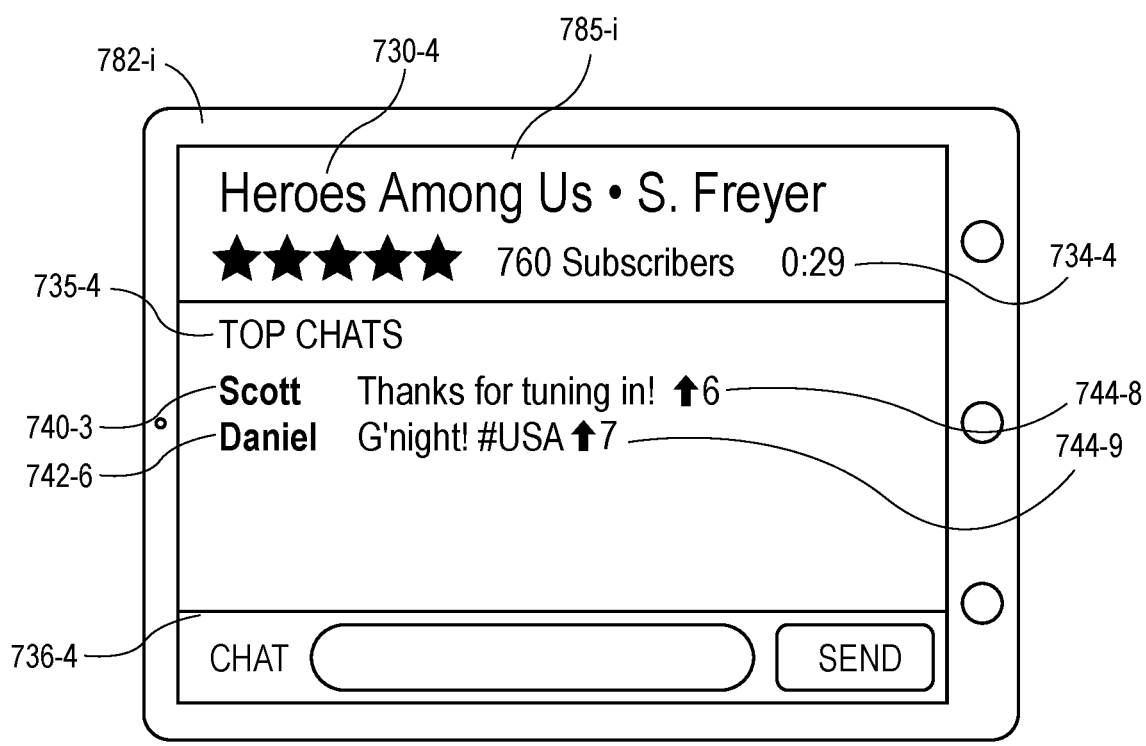

As is shown in FIG. 7I, as the media program 760 is nearing its conclusion, a user interface 730-4 including sections 734-4, 735-4, 736-4 is rendered on the display 785-i. The section 734-4 includes the same or similar information or data as the section 734-3 of the user interface 730-3, except that the time with respect to the beginning of the media program 760 has changed. The section 735-4 includes a pair of chat messages 740-3, 742-6 from the creator 710 and the listener 780-1, respectively, in response to the conclusion. The chat messages 740-3, 742-6 may be displayed within the section 735-4 at times with respect to the beginning of the media program 760 at which the chat messages 740-3, 742-6 were received, and are accompanied by interactive features 744-8, 744-9, which visually indicate that six interactions with the chat message 740-3, and seven interactions with the chat message 742-6 have been received from listeners or the creator 710. The section 736-4 is provided at a lower edge or area of the user interface 730-4, and includes one or more text boxes for receiving text entered by the listener 780-1 and a selectable feature for transmitting a text-based message including such text to the control system 750.

Figure 8A:
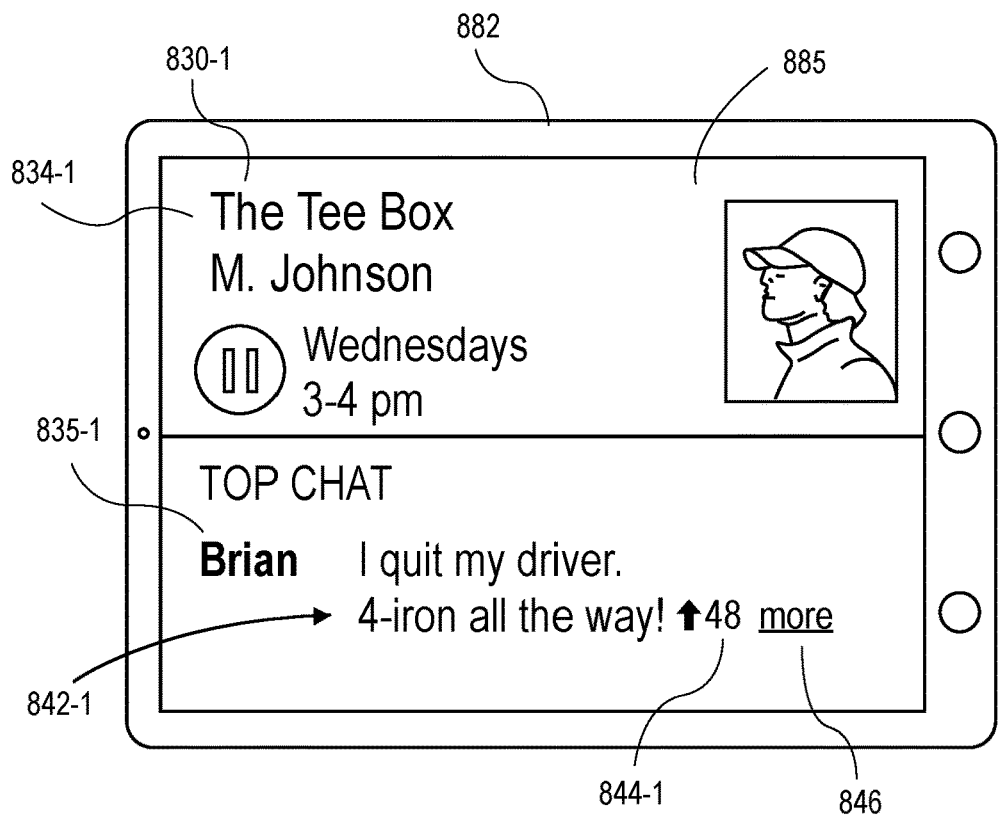
FIGS. 8A and 8B are views of aspects of one system for presenting chat messages to listeners in accordance with embodiments of the present disclosure.
Figure 8B:
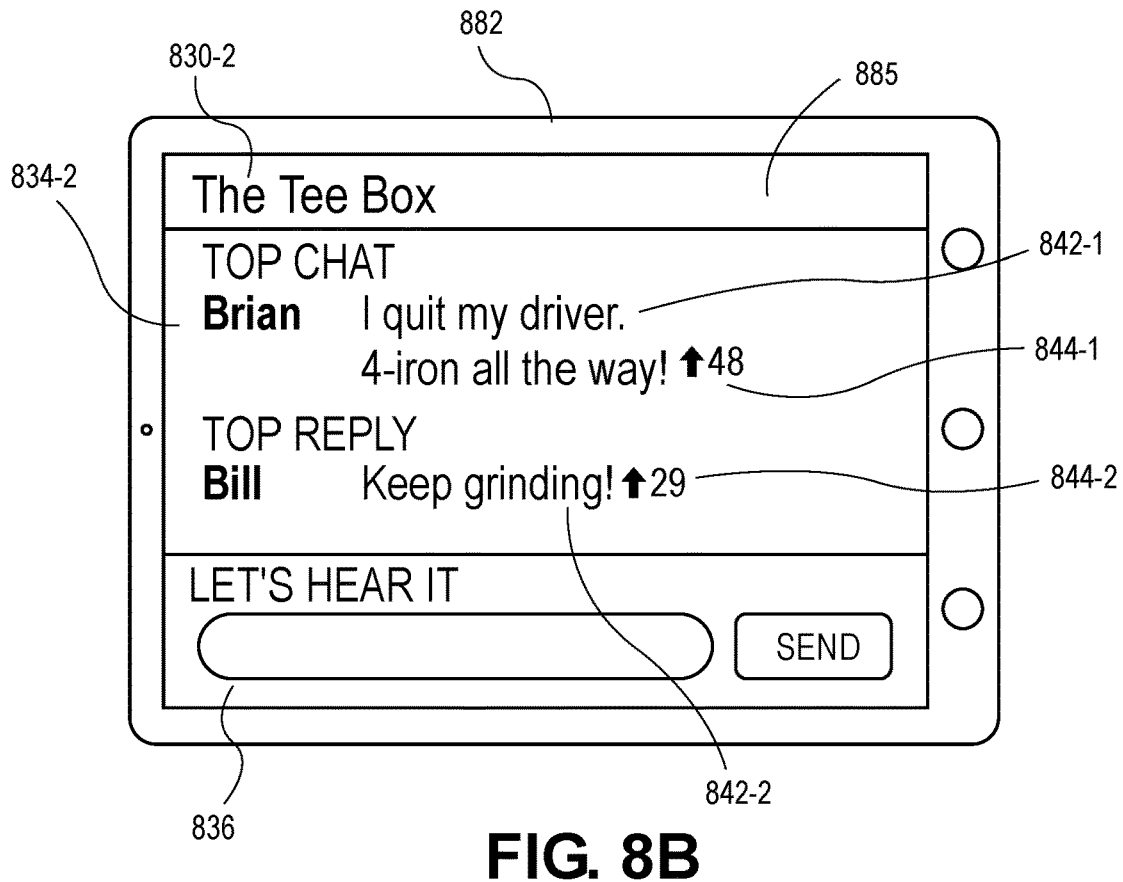

As is discussed above, chat messages may be selected for display to listeners or creators during a playing of a media program in a manner that economizes, and does not dominate or overwhelm, the available display areas on the devices or systems operated by the listeners or the creators. Referring to FIGS. 8A and 8B, views of aspects of one system for presenting chat messages to listeners in accordance with embodiments of the present disclosure are shown. Except where otherwise noted, reference numerals preceded by the number "8" shown in FIG. 8A or FIG. 8B indicate components or features that are similar to components or features having reference numerals preceded by the number "7" shown in FIGS. 7A through 7I, by the number "5" shown in FIGS. 5A through 5H, by the number "3" shown in FIG. 3, by the number "2" shown in FIG. 2A or 2B or by the number "1" shown in FIGS. 1A through 1F.

As is shown in FIG. 8A, a mobile device 882 of a listener includes a user interface 830-1 including a plurality of sections 834-1, 835-1 rendered on a display 885. The mobile device 882 is a smartphone or other device having a display area that is limited in size.

The section 834-1 of the user interface 830-1 is provided at an upper edge or area of the display 885, e.g., above the section 835-1, and includes one or more identifiers or information regarding a media program, including but not limited to a title of the media program (viz., "The Tee Box"), a name of a creator of the media program (viz., "M. Johnson"), as well as a representative image for the media program (e.g., a photograph of the creator) and a day or a time on which the media program is typically made available to listeners. The section 834-1 further includes one or more elements or features for playing, pausing, stopping, rewinding or fast-forwarding media content of the media program. Alternatively, the section 834-1 may include any other information or data regarding the media program.

The section 835-1 is provided at a lower edge of the display 885, e.g., below the section 834-1, and includes a portion for including a highly ranked or relevant chat message (viz., "Top Chat") received during the media program from the creator or any listeners. For example, as is shown in FIG. 8A, the section 835-1 includes a chat message 842-1 received from a listener, viz., "Brian," that is consistent with a theme of the media program, and states, "I quit my driver. 4-iron all the way!" The chat message 842-1 is accompanied by an interactive feature 844-1 identifying a number of interactions, viz., forty-eight, with the chat message 842-1 by the creator of the media program or any listeners to the media program. The interactive feature 844-1 may be a selectable element that, when rendered on a display of a device of a listener or the creator, not only provides a visual indication of the number of interactions with the chat message 842-1 but also enables the listener or the creator to record an interaction with the chat message 842-1, or to cancel (or otherwise withdraw or remove) an interaction with the chat message 842-1, e.g., by toggling selections of the interactive feature 844-1. In some implementations, the interactive feature 844-1 may be shown as an icon or a symbol visually suggestive of an emotion of a sentiment associated with the chat message 842-1, as interpreted by a listener or the creator. In some other implementations, multiple interactive features 844-1 for receiving interactions may be provided, and each of such features may be associated with a different emotion or sentiment.

The section 835-1 further includes an interactive feature 846 (e.g., a linked element, such as a set of text, an icon or a symbol) that may be selected to enable a listener to review additional chat messages or feedback regarding the chat message 842-1 received from other listeners or the creator, or to provide other chat messages or feedback regarding the chat message 842-1. The interactive feature 846 may be selected in any manner, such as by contact with the user interface 830-1 or the display 885.

As is shown in FIG. 8B, the mobile device 882 includes a user interface 830-2 including a plurality of sections 834-2, 835-2, 836 rendered on the display 885, e.g., following a selection of the interactive feature 846. The section 834-2 is provided at an upper edge or area of the display 885, e.g., above the section 835-2, and extends across an entire width of the display 885 but has a height or depth that is less than a height or depth of the section 834-1 of the user interface 830-1. The section 834-2 includes less information or data than the section 834-1, and, as is shown in FIG. 8B, includes only the title of the media program.

The section 835-2 is provided in a substantially central portion of the user interface 830-2, e.g., below the section 834-2 and above the section 836. The section 835-2 also extends across the entire width of the display 885 but has a height or depth that is greater than a height or depth of the section 835-1 of the user interface 830-1, and may include more information or data than the section 835-1. For example, the section 835-2 includes not only a portion featuring the chat message 842-1 and the interactive feature 844-1 but also another portion including a chat message that is relevant to the chat message 842-1, e.g., a chat message 842-2 received from another listener, viz., "Bill," in reply to the chat message 842-1 that encourages, "Keep grinding!" The chat message 842-2 is accompanied by an interactive feature 844-2 identifying a number of interactions, viz., twenty-nine, with the chat message 842-2 by the creator of the media program or any listeners to the media program.

The section 836 is provided at a lower edge of the display 885, e.g., below the section 835-2, and includes a text box or a like feature that enables a listener or any other user of the mobile device 882 to provide a chat message to the creator or other listeners, e.g., by executing one or more gestures or other interactions with a physical keyboard in communication with the device 882 (not shown), a virtual keyboard rendered on the display 885 (not shown), or any other input/output device, as well as a button or another selectable feature for transmitting the chat message provided within the text box to the creator or a control system. Alternatively, a listener may provide a chat message or other information to the mobile device 882 for transmission to the creator or a control system in any other manner, e.g., by one or more voice commands or utterances, or by gestures or interactions with a drop-down menu.

Although the disclosure has been described herein using exemplary techniques, components, and/or processes for implementing the systems and methods of the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure.

Likewise, although some of the embodiments described herein or shown in the accompanying figures refer to media programs including audio files, the systems and methods disclosed herein are not so limited, and the media programs described herein may include any type or form of media content, including not only audio but also video, which may be transmitted to and played on any number of devices of any type or form.

It should be understood that, unless otherwise explicitly or implicitly indicated herein, any of the features, characteristics, alternatives or modifications described regarding a particular embodiment herein may also be applied, used, or incorporated with any other embodiment described herein, and that the drawings and detailed description of the present disclosure are intended to cover all modifications, equivalents and alternatives to the various embodiments as defined by the appended claims. Moreover, with respect to the one or more methods or processes of the present disclosure described herein, including but not limited to the flow charts shown in FIG. 4 or 6A and 6B, orders in which such methods or processes are presented are not intended to be construed as any limitation on the claimed inventions, and any number of the method or process steps or boxes described herein can be combined in any order and/or in parallel to implement the methods or processes described herein.

Additionally, it should be appreciated that the detailed description is set forth with reference to the accompanying drawings, which are not drawn to scale. In the drawings, the use of the same or similar reference numbers in different figures indicates the same or similar items or features. Except where otherwise noted, one or more left-most digit(s) of a reference number identify a figure or figures in which the reference number first appears, while two right-most digits of a reference number in a figure indicate a component or a feature that is similar to components or features having reference numbers with the same two right-most digits in other figures.

Conditional language, such as, among others, "can," "could," "might," or "may," unless specifically stated otherwise, or otherwise understood within the context as used, is generally intended to convey in a permissive manner that certain embodiments could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The elements of a method, process, or algorithm described in connection with the embodiments disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD-ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative embodiments thereof, the foregoing and various other additions and omissions may be made therein and thereto without departing from the spirit and scope of the present disclosure.

What is claimed is:

1. A system comprising:
 a first computer system having at least a first data store and at least a first computer processor, wherein the first computer system is connected to one or more networks, and
 wherein the first data store has one or more sets of instructions stored thereon that, when executed by at least the first computer processor, cause the first computer system to perform a method comprising:
  transmitting media content of a media program to each of a plurality of computer systems over the one or more networks, wherein each of the plurality of computer systems is associated with one of a plurality of listeners to the media program;
  causing a playing of at least some of the media content of the media program by at least some of the plurality of computer systems;
  receiving a first plurality of text-based messages over the one or more networks, wherein each of the first plurality of text-based messages comprises text entered via a user interface presented on a display of one of the plurality of computer systems during the playing of the at least some of the media content by the one of the plurality of computer systems;
  identifying at least a subset of the first plurality of text-based messages that do not include objectionable content;
  determining a first ranking of at least the subset of the first plurality of text-based messages according to at least one rule;
  determining at least one attribute of a first listener to the media program, wherein the first listener is one of the plurality of listeners;
  selecting a first text-based message of the subset of the first plurality of text-based messages based at least in part on the first ranking and the at least one attribute of the first listener to the media program;
  transmitting code for causing a display of at least the first text-based message on a display of a computer system associated with the first listener; and
  causing the display of at least the first text-based message on the display of the computer system associated with the first listener during a playing of the at least some of the media content by the computer system associated with the first listener.

2. The system of claim 1, wherein the at least one rule ranks or assigns a score to one of the first plurality of text-based messages based at least in part on at least one of:
 an author of the one of the first plurality of text-based messages, wherein the author is a creator of the first media program or one of the plurality of listeners;
 a time at which the one of the first plurality of messages was received;
 an emotion or a sentiment associated with the one of the first plurality of messages; or
 a number of interactions with the one of the first plurality of messages received from the plurality of listeners or the creator, and
 wherein the method further comprises determining, by the first computer system, at least one of:
  authors of each of the first plurality of text-based messages;
  times at which each of the first plurality of text-based messages were received;
  emotions or sentiments associated with each of the first plurality of text-based messages; or
  numbers of interactions with each of the first plurality of text-based messages received from the plurality of listeners or the creator.

3. The system of claim 1, wherein the code, when executed by the computer system associated with the first listener, causes a display of a user interface by the computer system associated with the first listener,
 wherein the user interface comprises a first section including:
  a title of the media program;
  an identifier of a creator of the media program; and
  at least one selectable feature for playing, pausing, or stopping the media program,
 wherein the user interface further comprises a second section including:
  at least the first text-based message;
  an interactive feature for receiving an interaction with the first text-based message; and
 wherein the user interface further comprises a third section including:
  a text box configured to receive a text-based message from the first listener; and
  a selectable feature for transmitting the text-based message received from the first listener to the first computer system.

4. The system of claim 1, wherein each of the first plurality of text-based messages is received during a first period of time, and
 wherein the method further comprises:
  receiving a second plurality of text-based messages over the one or more networks, wherein each of the second plurality of text-based messages comprises text entered via a user interface presented on a display of one of the plurality of computer systems, wherein each of the second plurality of text-based messages is received during the playing of the at least some of the media content by the one of the plurality of computer systems during a second period of time, and wherein the second period of time follows the first period of time;
  identifying at least a subset of the second plurality of text-based messages that do not include objectionable content;
  determining a second ranking of at least the subset of the first plurality of text-based messages and the subset of the second plurality of text-based messages according to the at least one rule;
  selecting a second text-based message of one of the first plurality of text-based messages or the second plurality of text-based messages based at least in part on the second ranking and the at least one attribute;

transmitting code for causing a display of at least the second text-based message on the display of the computer system associated with the first listener; and causing the display of at least the second text-based message on the display of the computer system associated with the first listener during the playing of the at least some of the media content by the computer system associated with the first listener.

5. A computer-implemented method comprising:
transmitting, by a first computer system to a plurality of computer systems over at least one network, first media content of a first media program;
causing, by the first computer system, a display of a user interface by each of the plurality of computer systems, wherein the user interface comprises a first section including:
at least one selectable feature for playing, pausing, or stopping the media program,
wherein the user interface further comprises a second section including:
a space for displaying one or more text-based messages; and
at least one interactive feature for receiving an interaction with the one or more text-based messages; and
wherein the user interface further comprises a third section including:
a text box configured to receive a text-based message; and
a selectable feature for transmitting the text-based message received in the text box to the first computer system;
receiving, by the first computer system, a first plurality of sets of data, wherein each of the first plurality of sets of data represents at least one text-based message entered into the text box of the user interface displayed by one of the plurality of computer systems during a playing of at least a portion of the first media content by the one of the plurality of computer systems;
determining, by the first computer system, a first ranking of a first plurality of text-based messages according to at least one rule, wherein each of the first plurality of text-based messages is represented in one of the first plurality of sets of data;
determining, by the first computer system, at least one attribute of a user of a second computer system, wherein the second computer system is one of the plurality of computer systems, and wherein the user of the second computer system is a listener to at least the first media content of the first media program;
selecting, by the first computer system, at least a first text-based message based at least in part on the first ranking and the at least one attribute of the user of the second computer system, wherein the first text-based message is one of the first plurality of text-based messages; and
transmitting, by the first computer system to the second computer system over the at least one network, a first set of data for causing at least the first text-based message to be displayed on at least one display of the second computer system,
wherein the first set of data is transmitted to the second computer system during a playing of at least the first media content of the first media program by at least the second computer system.

6. The computer-implemented method of claim 5, wherein selecting at least the first text-based message comprises:
selecting, by the first computer system, at least the first text-based message and a second text-based message based at least in part on the first ranking, wherein the first text-based message is ranked above the second text-based message in the first ranking, and
wherein the first set of data, when executed by the second computer system, causes the first text-based message to be displayed above the second text-based message on the at least one display.

7. The computer-implemented method of claim 5, further comprising:
identifying, by the first computer system, authors of each of the first plurality of text-based messages, wherein each of the authors is one of a creator of the first media program or a user of one of the plurality of computer systems,
wherein the at least one rule ranks a text-based message or assigns a score to the text-based message based at least in part on an author of the text-based message, and
wherein the first ranking is determined based at least in part on the authors of each of the first plurality of text-based messages.

8. The computer-implemented method of claim 7, wherein an author of the first text-based message is the creator, and
wherein the first text-based message is first in the first ranking according to the at least one rule.

9. The computer-implemented method of claim 5, further comprising:
identifying, by the first computer system, numbers of interactions with at least some of the first plurality of text-based messages, wherein each of the interactions is executed by one of a creator of the first media program or a user of one of the plurality of computer systems,
wherein at least one of the users of each of the plurality of computer systems is a listener to the first media program,
wherein the at least one rule ranks or assigns a score to a text-based message based at least in part on a number of interactions with the text-based message, and
wherein the first ranking is determined based at least in part on the numbers of interactions with the at least some of the first plurality of text-based messages.

10. The computer-implemented method of claim 5, further comprising:
determining, by the first computer system, similarities of each of the portion of the first plurality of text-based messages to the user of the second computer system based at least in part on the at least one attribute,
wherein the first text-based message is selected based at least in part on a similarity of the first text-based message to the user of the second computer system.

11. The computer-implemented method of claim 10, wherein the at least one attribute comprises at least one of:
an age of the user of the second computer system;
a gender of the user of the second computer system;
a location associated with the user of the second computer system;
at least one item previously purchased by the user of the second computer system;
at least one media program previously played by the user of the second computer system; or
content of at least one chat message previously received from the user of the second computer system.

12. The computer-implemented method of claim 5, further comprising:
  identifying, by the first computer system, a set of words, wherein each of the set of words has been designated as objectionable; and
  determining, by the first computer system, that each of the first plurality of text-based messages does not include any of the set of words,
  wherein the first ranking is determined in response to determining that each of the first plurality of text-based messages does not include any of the second set of words.

13. The computer-implemented method of claim 5, wherein each of the first plurality of sets of data is received over a first period of time, and
  wherein the computer-implemented method further comprises:
  receiving, by the first computer system, a second plurality of sets of data, wherein each of the second plurality of sets of data represents at least one text-based message entered into the user interface displayed by one of the plurality of computer systems, wherein each of the second plurality of sets of data is received during a playing of at least a portion of the first media content by the one of the plurality of computer systems over a second period of time, and wherein the second period of time follows the first period of time;
  determining, by the first computer system, a second ranking of at least the first plurality of text-based messages and a second plurality of text-based messages according to the at least one rule, wherein each of the second plurality of text-based messages is represented in one of the second plurality of sets of data;
  selecting, by the first computer system, at least a second text-based message based at least in part on the second ranking, wherein the second text-based message is one of the second plurality of text-based messages; and
  transmitting, by the first computer system to the second computer system over the at least one network, a second set of data for causing at least the second text-based message to be displayed on the at least one display of the second computer system,
  wherein the second set of data is transmitted to the second computer system during a playing of at least the portion of the first media content of the first media program by at least the second computer system.

14. The computer-implemented method of claim 5, wherein the first media content comprises a request for feedback from at least one user of at least one of the plurality of computer systems,
  wherein the at least one user of the at least one of the plurality of computer systems is a listener to at least the first media content of the first media program, and
  wherein at least one of the first plurality of sets of data is received in response to the request.

15. The computer-implemented method of claim 5, wherein the first media content comprises at least one of:
  a movie;
  a song;
  a podcast;
  a television show;
  at least one utterance of a creator of the media program; or
  at least one utterance of one of the plurality of listeners to the media program.

16. The computer-implemented method of claim 5, wherein the second computer device is at least a portion of one of:
  an automobile;
  a desktop computer;
  a laptop computer;
  a media player;
  a smartphone;
  a smart speaker;
  a tablet computer; or
  a wristwatch.

17. A first computer system having at least a first data store and at least a first computer processor, wherein the first computer system is connected to one or more networks, and
  wherein the first data store has one or more sets of instructions stored thereon that, when executed by at least the first computer processor, cause the first computer system to perform a method comprising:
  transmitting a first set of data to each of a plurality of computer systems over the one or more networks, wherein the first set of data represents first media content of a media program, and wherein each of the plurality of computer systems is associated with one of a plurality of subscribers to the media program;
  causing a display of a user interface by each of the plurality of computer systems, wherein the user interface comprises a first section including:
    at least one selectable feature for playing, pausing, or stopping the media program,
  wherein the user interface further comprises a second section including:
    a space for displaying one or more text-based messages; and
    at least one interactive feature for receiving an interaction with the one or more text-based messages; and
  wherein the user interface further comprises a third section including:
    a text box configured to receive a text-based message; and
    a selectable feature for transmitting the text-based message received in the text box to the first computer system;
  receiving a plurality of sets of data from at least some of the plurality of computer systems over the one or more networks, wherein each of the plurality of sets of data represents at least one text-based message provided by:
    a creator of the media program; or
    one of the plurality of subscribers to the media program;
  determining a ranking of the plurality of text-based messages according to at least one rule;
  determining at least one attribute of a first subscriber to the media program, wherein the first subscriber is one of the plurality of subscribers;
  selecting a subset of the plurality of text-based messages based at least in part on the ranking and the at least one attribute of the first subscriber;
  transmitting a second set of data to at least a second computer system, wherein the second computer system is one of the plurality of computer systems associated with the first subscriber, and wherein the second set of data comprises code for causing at least some of the subset of the plurality of text-based messages to be displayed by the second computer system; and causing the at least some of the subset of the plurality of text-based messages to be displayed in the space of the second section of the user interface displayed by the second computer system.

18. The first computer system of claim 17, wherein the at least one attribute of the first subscriber is at least one of:
an age of the first subscriber;
a gender of the first subscriber;
a location associated with the first subscriber;
at least one item previously purchased by the first subscriber; or
at least one media program previously played by the first subscriber.

19. The first computer system of claim 17, wherein the second computer system is at least a portion of one of:
an automobile;
a desktop computer;
a laptop computer;
a media player;
a smartphone;
a smart speaker;
a tablet computer; or
a wristwatch.

20. The first computer system of claim 17, wherein selecting the subset of the plurality of text messages comprises:
determining that at least the subset of the first plurality of text-based messages do not include objectionable content.

* * * * *